US010805930B2

(12) United States Patent
Kimura et al.

(10) Patent No.: US 10,805,930 B2
(45) Date of Patent: *Oct. 13, 2020

(54) DEVICE, METHOD, AND PROGRAM

(71) Applicant: Sony Corporation, Tokyo (JP)

(72) Inventors: Ryota Kimura, Tokyo (JP); Ryo Sawai, Tokyo (JP); Yukitoshi Sanada, Kanagawa (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,293

(22) Filed: Apr. 30, 2019

(65) Prior Publication Data
US 2019/0261373 A1 Aug. 22, 2019

Related U.S. Application Data

(63) Continuation of application No. 15/529,683, filed as application No. PCT/JP2016/074676 on Aug. 24, 2016, now Pat. No. 10,314,040.

(30) Foreign Application Priority Data

Oct. 1, 2015 (JP) ................................ 2015-195903
May 12, 2016 (JP) ................................ 2016-096351

(51) Int. Cl.
H04W 72/04 (2009.01)
H04L 27/26 (2006.01)
H04L 5/00 (2006.01)

(52) U.S. Cl.
CPC ......... H04W 72/0453 (2013.01); H04L 5/001 (2013.01); H04L 5/0092 (2013.01); H04L 27/2602 (2013.01)

(58) Field of Classification Search
CPC ..... H04W 72/0453; H04L 5/001; H04L 27/01
See application file for complete search history.

(56) References Cited

U.S. PATENT DOCUMENTS 6,393,002 B1 * 5/2002 Paneth ...................... H04L 1/06
370/330
9,596,106 B2 3/2017 Muralidhar et al.
2002/0021679 A1 * 2/2002 Paneth ................. H04L 1/0007
370/330

(Continued)

FOREIGN PATENT DOCUMENTS

| EP | 2913953 A1 | 2/2014 |
| JP | 2014-526201 A | 10/2014 |
| WO | 2015131827 A1 | 9/2015 |

OTHER PUBLICATIONS

Notification of First Office Action dated May 27, 2019, issued in corresponding Chinese Application No. 201680003788.9, 19 pages (with English Translation).

(Continued)

Primary Examiner — Jay P Patel
(74) Attorney, Agent, or Firm — Xsensus LLP

(57) ABSTRACT

[Object] To provide a mechanism capable of accommodating legacy terminals not supporting GFDM in addition to terminals supporting GFDM when GFDM is introduced.
[Solution] A device includes: a setting unit configured to variably set at least one of an interval between subcarriers and a time length of a subsymbol included in a unit resource constituted by one or more subcarriers or one or more subsymbols; and a transmission processing unit configured to perform filtering for every predetermined number of subcarriers.

31 Claims, 39 Drawing Sheets

(56) References Cited

U.S. PATENT DOCUMENTS

| | | |
|---|---|---|
| 2010/0189132 A1 | 7/2010 | Fettweis et al. |
| 2010/0226458 A1 | 9/2010 | Dent et al. |
| 2012/0045008 A1 | 2/2012 | Karthik et al. |
| 2012/0114053 A1 | 5/2012 | Karthik et al. |
| 2012/0114069 A1 | 5/2012 | Karthik et al. |
| 2012/0114080 A1 | 5/2012 | Karthik et al. |
| 2012/0119841 A1* | 5/2012 | Kitamura .............. H03F 1/3223 332/103 |
| 2012/0166119 A1 | 6/2012 | Nentwig et al. |
| 2014/0140423 A1 | 5/2014 | Muralidhar et al. |
| 2014/0192925 A1 | 7/2014 | Li |
| 2015/0256308 A1 | 9/2015 | Ma et al. |
| 2018/0034671 A1 | 2/2018 | Hasegawa |

OTHER PUBLICATIONS

Partial Supplementary European Search Report dated May 8, 2019, issued in corresponding European Application No. 16850972.7, 16 pages.

Fuhrwerk et al., On the Design of an FBMC Based Air Interface Enabling Channel Adaptive Pulse Shaping Per Sub-Band, 2015, 23rd European Signal Processing Conference, 5 pages.

T Mobile, Deutsche Telekom & T-Mobile USA View on 5G—3GPP RAN 5G Workshop, RWS 150033, 3rd Generation Partnership Project, Mobile Competence Center; Sep. 17-18, 2015, Phoenix, USA, 10 pages.

International Search Report and Written Opinion dated Nov. 15, 2016 in PCT/JP2016/074676, 1 page.

Ivan Gasper et al., "Synchronization Using a Pseudo-Circular Preamble for Generalized Frequency Division Multiplexing in Vehicular Communication", Vehicular Technology Conference (VTC Fall), 2015 IEEE 82nd, Sep. 3, 2015, 5 pages.

Ivan Gasper et al., "Frequency-Shift Offset-QAM for GFDM", IEEE Communications Letters, vol. 19, Issue: 8, Jun. 15, 2015, pp. 1-4.

Michailow et al., "Generalized Frequency Division Multiplexing for 5th Generation Cellular Networks", IEEE Transactions on communications, vol. 62, No. 9, Sep. 2014, pp. 3045-3061.

\* cited by examiner

DEVICE, METHOD, AND PROGRAM

CROSS-REFERENCE TO RELATED APPLICATIONS

The present application is a continuation of U.S. application Ser. No. 15/529,683, filed May 25, 2017, which is based on PCT filing PCT/JP2016/074676, filed Aug. 24, 2016, and claims priority to JP 2015-195903, filed Oct. 1, 2015, and JP 2016-096351, filed May 12, 2016, the entire contents of each are incorporated herein by reference.

TECHNICAL FIELD

The present disclosure relates to a device, a method, and a program.

BACKGROUND ART

In recent years, as a representative of multicarrier modulation techniques (that is, multiplexing techniques or multiple access technologies), orthogonal frequency division multiplexing (OFDM) and orthogonal frequency division multiple access (OFDMA) have been put to practical use in various wireless systems. Application examples include digital broadcasting, a wireless LAN, and a cellular system. OFDM has resistance with respect to a multipath propagation path and can prevent the occurrence of inter-symbol interference caused by a multipath delay wave by employing a cyclic prefix (CP). On the other hand, OFDM has a disadvantage in that a level of out-of-band radiation is large. Further, a peak-to-average power ratio (PAPR) tends to increase, and there is also a disadvantage in which it is vulnerable to distortion occurring in transmission and reception devices.

SC-FDE, in which single-carrier (SC) modulation and frequency domain equalization (FDE) are combined, is used as a method of reducing the PAPR which is a disadvantage of OFDM and providing resistance to the multipath propagation path.

Besides, new modulation techniques capable of suppressing the out-of-band radiation which is a disadvantage of OFDM have been developed. The present modulation technique aims to suppress the out-of-band radiation by applying a pulse shape filter to symbols that have undergone serial-to-parallel (S/P) conversion in OFDM. The entire band, a predetermined number of subcarrier units (for example, resource block units in LTE), each subcarrier, or the like is considered as a target of filtering. The present modulation technique can be called various names such as universal filtered-OFDM (UF-OFDM), universal filtered multi-carrier (UFMC), filter bank multi-carrier (FBMC), generalized OFDM (GOFDM), and generalized frequency division multiplexing (GFDM). In this specification, the present modulation technique is referred to as a "GFDM," but, of course, this term has no narrow meaning. A basic technique related to GFDM is disclosed, for example, in the following Patent Document 1 and Non-Patent Document 1.

CITATION LIST

Patent Literature

Patent Literature 1: US Patent Publication No. 2010/0189132

Non-Patent Literature

Non-Patent Literature 1: N. Michailow, et al., "Generalized Frequency Division Multiplexing for 5th Generation Cellular Networks," IEEE Trans. Commun., Vol. 62, no. 9, September 2014.

DISCLOSURE OF INVENTION

Technical Problem

However, in a transition period in which GFDM is introduced, there may be legacy terminals not supporting GFDM in addition to terminals supporting GFDM. In this regard, it is desirable to provide a mechanism capable of accommodating legacy terminals not supporting GFDM in addition to terminals supporting GFDM when GFDM is introduced.

Solution to Problem

According to the present disclosure, there is provided a device including: a setting unit configured to variably set at least one of an interval between subcarriers and a time length of a subsymbol included in a unit resource constituted by one or more subcarriers or one or more subsymbols; and a transmission processing unit configured to perform filtering for every predetermined number of subcarriers.

In addition, according to the present disclosure, there is provided a method including: variably setting at least one of an interval between subcarriers and a time length of a subsymbol included in a unit resource constituted by one or more subcarriers or one or more subsymbols; and performing, by a processor, filtering for every predetermined number of subcarriers.

In addition, according to the present disclosure, there is provided a program causing a computer to function as: a setting unit configured to variably set at least one of an interval between subcarriers and a time length of a subsymbol included in a unit resource constituted by one or more subcarriers or one or more subsymbols; and a transmission processing unit configured to perform filtering for every predetermined number of subcarriers.

Advantageous Effects of Invention

As described above, according to the present disclosure, a mechanism capable of accommodate legacy terminals not supporting GFDM in addition to terminals supporting GFDM when GFDM is introduced is provided. Note that the effects described above are not necessarily limitative. With or in the place of the above effects, there may be achieved any one of the effects described in this specification or other effects that may be grasped from this specification.

Further, in this specification and the drawings, there are cases in which elements having substantially the same functional configuration are distinguished by adding different letters after the same reference numeral. For example, a plurality of elements having substantially the same functional configuration are distinguished as terminal devices 200A, 200B, and 200C as necessary. However, when it is not necessary to particularly distinguish a plurality of elements having substantially the same functional configuration, only the same reference numeral is attached. For example, when it is not necessary to particularly distinguish terminal devices 200A, 200B and 200C, they are referred to simply as a "terminal device 200."

MODE(S) FOR CARRYING OUT THE INVENTION

Figure 1:
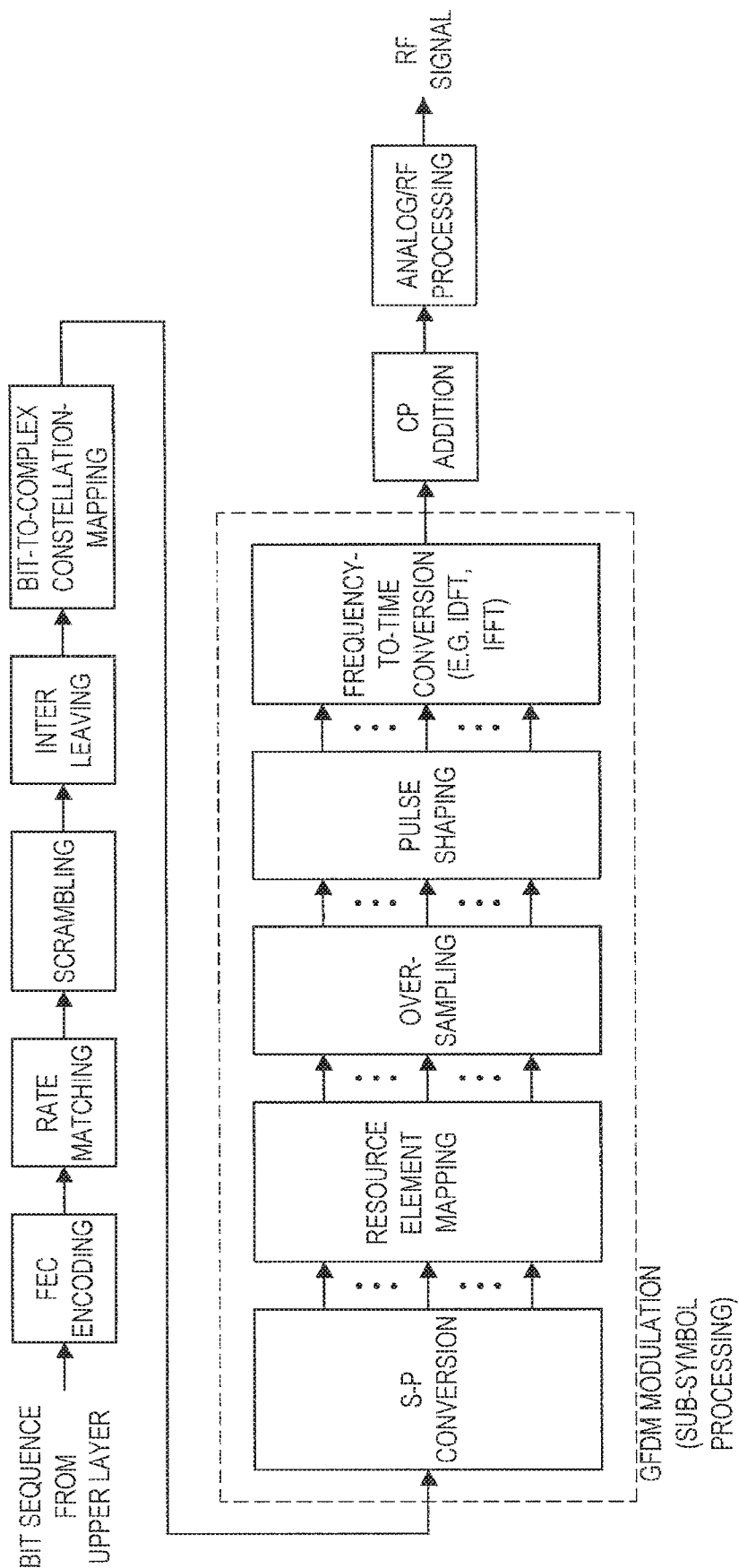
FIG. 1 is an explanatory diagram for describing an example of a configuration of a transmission device supporting GFDM.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Modulation schemes
2. Schematic configuration of system
3. Configuration of devices
3.1. Configuration of base station
3.2. Configuration of terminal device
4. Technical features
5. Application examples
6. Conclusion

1. MODULATION SCHEMES

First, GFDM, OFDM, and SC-FDE will be described with reference to FIGS. 1 to 3.
(GFDM)

FIG. 1 is an explanatory diagram for describing an example of a configuration of a transmission device supporting GFDM. Referring to FIG. 1, a bit sequence (for example, a transport block) from an upper layer is processed, and a radio frequency (RF) signal is output. The bit sequence undergoes forward error correction (FEC) coding, rate matching, scrambling, interleaving, and mapping bit sequences to symbols (which may be a complex symbols or are also referred to as "signal points") (bit-to-complex constellation mapping) and then undergoes modulation as illustrated in FIG. 1. Various constellations such as BPSK, QPSK, 8PSK, 16QAM, 64QAM, 256QAM, or the like may be used for mapping the bit sequence to symbols. In the modulation, first, S/P conversion is performed, resource element mapping, over-sampling, and pulse shaping are performed on each of a plurality of divided signals, and the plurality of divided signals are combined into one signal in a time domain (that is, a time waveform) by frequency to time conversion (for example, inverse discrete Fourier transform (IDFT) or inverse fast Fourier transform (IFFT)) which is subsequently performed. After the modulation, cyclic prefix (CP) addition, analog processing, and RF processing are performed.

In GFDM, over-sampling is performed on symbols on a subcarrier in order to perform filtering (that is, pulse shaping) in predetermined units. Then, filtering is performed on the symbols that have undergone the over-sampling. The frequency to time conversion will be performed on these filtered symbols. In GFDM, it is possible to suppress the out-of-band radiation which is a disadvantage of OFDM through the filtering. Further, in GFDM, even when it is combined with multiple-input and multiple-output (MIMO) or the like, it is possible to enable a reception device side to perform all processes in a frequency domain. However, since inter-symbol interference occurs for each element due to influence of filtering, an interference canceller is used on the reception device side. Regarding this point, in OFDM and SC-FDE, interference suppression is implemented by simple FDE.

As described above, GFDM has a problem in that the reception device is complicated in return for overcoming the disadvantage of the out-of-band radiation. In devices in which low-cost low power consumption communication is desirable such as machine type communication (MTC) devices and Internet of things (IoT) devices, this problem can be fatal.

(OFDM)

Figure 2:
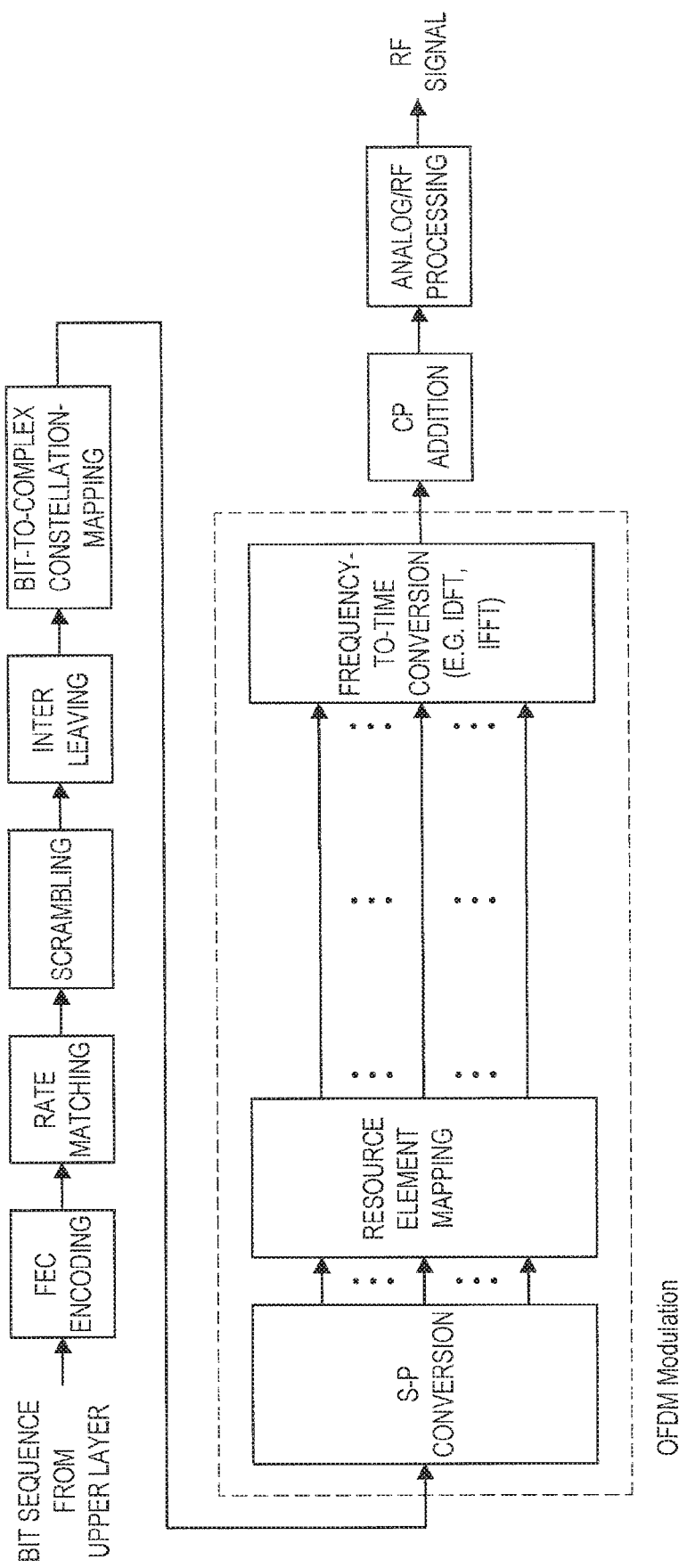
FIG. 2 is an explanatory diagram for describing an example of a configuration of a transmission device supporting OFDM.

FIG. 2 is an explanatory diagram for describing an example of a configuration of a transmission device supporting OFDM. Referring to FIG. 2, a difference with the transmission device supporting GFDM described with reference to FIG. 1 lies in a modulation portion surrounded by a broken line. In description of this difference, first, S/P conversion is performed, and resource element mapping is performed for each of a plurality of divided signals. As a result, symbols are allocated to a predetermined subcarrier. Then, frequency to time conversion (for example, IDFT or IFFT) is performed on a predetermined number of subcarriers, so that the signals are combined into one signal in the time domain.

As described above, OFDM has resistance with respect to the multipath propagation path, and can prevent the occurrence of inter-symbol interference caused by the multipath delay wave. On the other hand, OFDM has a disadvantage in that a level of out-of-band radiation is large. Further, the PAPR tends to increase, and there is also a disadvantage in which it is vulnerable to distortion occurring in transmission and reception devices.

(SC-FDE)

Figure 3:
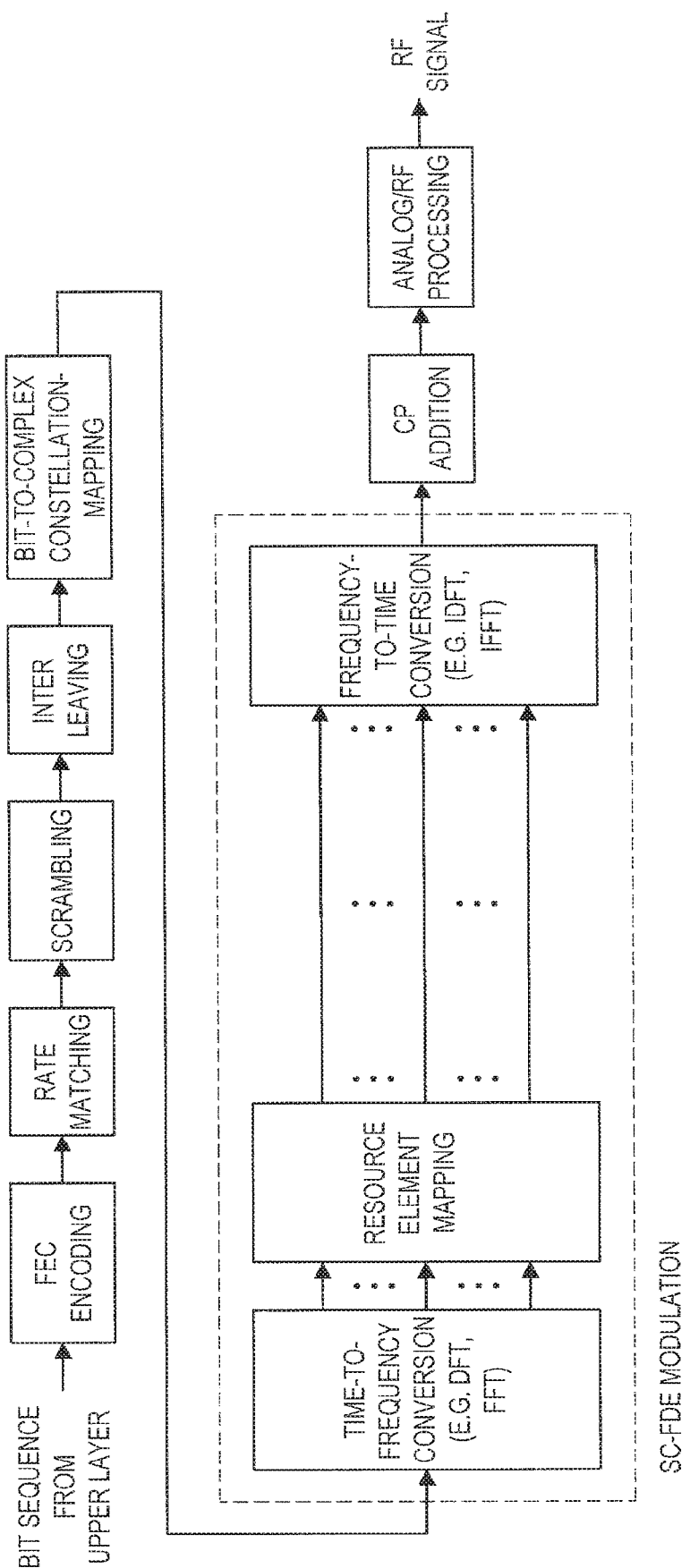
FIG. 3 is an explanatory diagram for describing an example of a configuration of a transmission device supporting SC-FDE.

FIG. 3 is an explanatory diagram for describing an example of a configuration of a transmission device supporting SC-FDE. Referring to FIG. 3, a difference with the transmission device supporting GFDM described with reference to FIG. 1 lies in a modulation portion surrounded by a broken line. In description of this difference, first, time to frequency conversion (for example, discrete Fourier transform (DFT) or inverse fast Fourier transform (FFT)) is performed. Thereafter, resource element mapping is performed in the frequency domain, and combination into one signal in the time domain is performed by frequency to time conversion. Thereafter, since the CP is added, the reception device can easily implement FDE.

As described above, SC-FDE can have resistance with respect to the multipath propagation path while reducing the PAPR. On the other hand, when it is combined with MIMO, SC-FDE has a disadvantage in that a decoding process on the reception device side is complicated (for example, turbo equalization and repeated interference cancellation are performed).

2. SCHEMATIC CONFIGURATION OF SYSTEM

Figure 4:
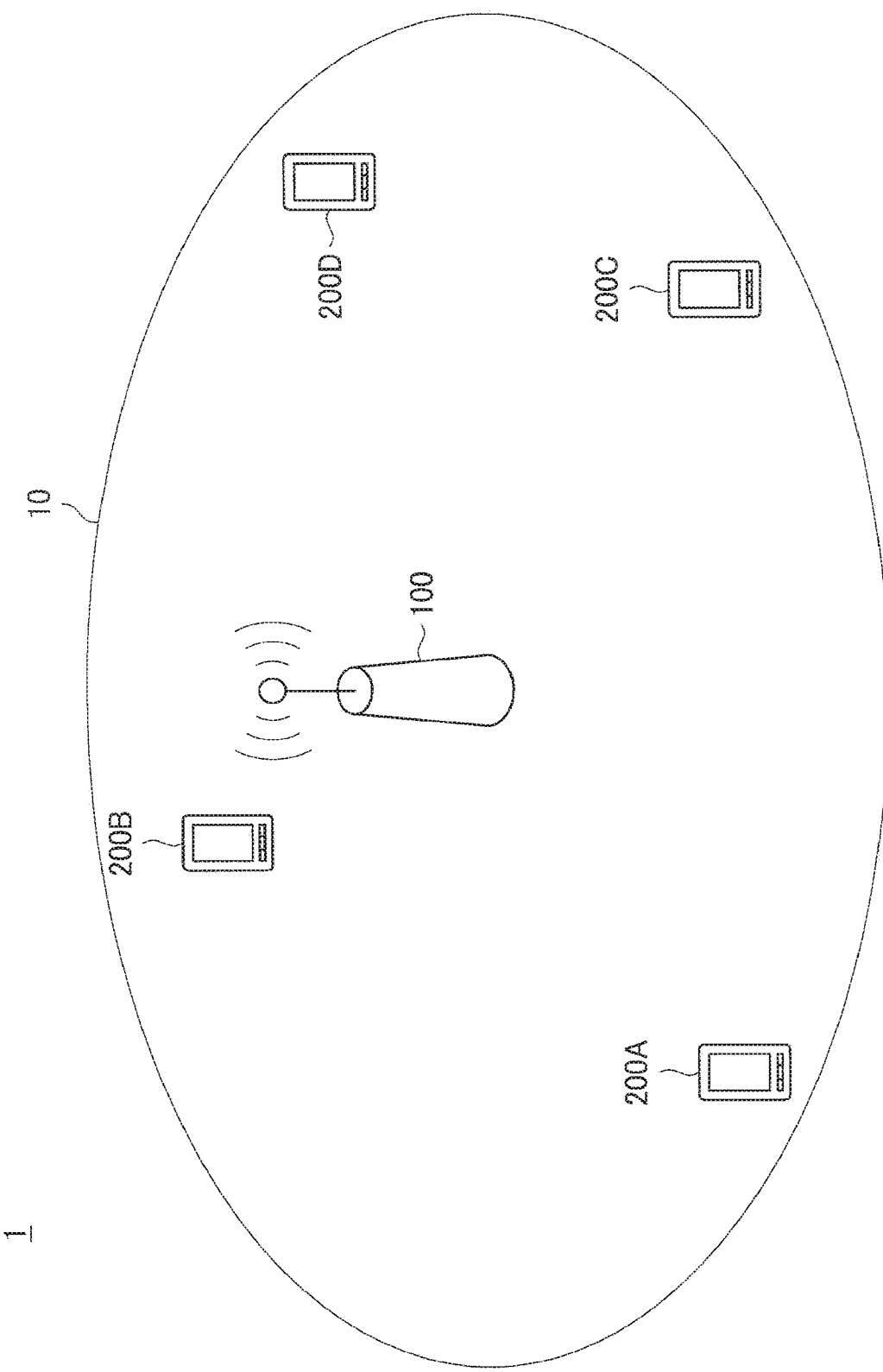
FIG. 4 is an explanatory diagram illustrating an example of a schematic configuration of a system according to an embodiment of the present disclosure.

Next, a schematic configuration of a system 1 according to an embodiment of the present disclosure will be described with reference to FIG. 4. FIG. 4 is an explanatory diagram illustrating an example of a schematic configuration of the system 1 according to an embodiment of the present disclosure. Referring to FIG. 4, the system 1 includes a base station 100 and a terminal device 200. Here, the terminal device 200 is also referred to as a "user." The user may also be referred to as "user equipment (UE)." Here, the UE may be UE defined in LTE or LTE-A or may mean a communication device more generally.

(1) Base Station 100

The base station 100 is a base station of a cellular system (or a mobile communication system). The base station 100 performs radio communication with a terminal device (for example, the terminal device 200) located within a cell 10 of the base station 100. For example, the base station 100 transmits a downlink signal to the terminal device and receives an uplink signal from the terminal device.

(2) Terminal Device 200

The terminal device 200 can perform communication in the cellular system (or the mobile communication system). The terminal device 200 performs radio communication with the base station of the cellular system (for example, the base station 100). For example, the terminal device 200 receives a downlink signal from the base station and transmits an uplink signal to the base station.

(3) Multiplexing/Multiple Access

Particularly, in an embodiment of the present disclosure, the base station 100 performs radio communication with a plurality of terminal devices via orthogonal multiple access/non-orthogonal multiple access. More specifically, the base station 100 performs radio communication with a plurality of terminal devices 200 through multiplexing/multiple access using GFDM.

For example, the base station 100 performs radio communication with a plurality of terminal devices 200 by multiplexing/multiple access using GFDM in the downlink. More specifically, for example, the base station 100 multiplexes signals destined for a plurality of terminal devices 200 using GFDM. In this case, for example, the terminal device 200 removes one or more other signals serving as interference from a multiplexed signal including a desired signal (that is, a signal destined for the terminal device 200), and decodes the desired signal.

The base station 100 may perform radio communication with a plurality of terminal devices by multiplexing/multiple access using GFDM in the uplink instead of the downlink or together with the downlink. In this case, the base station 100 may decode each of signals from the multiplexed signal including the signals transmitted from a plurality of terminal devices.

(4) Supplement

The present technology can also be applied to multi-cell systems such as heterogeneous networks (HetNet) or small cell enhancement (SCE). Further, the present technology can also be applied to MTC devices and IoT devices.

3. CONFIGURATION OF DEVICES

Next, configurations of the base station 100 and the terminal device 200 according to the present disclosure will be described with reference to FIGS. 5 and 6.

<3.1. Configuration of Base Station>

First, an example of a configuration of the base station 100 according to an embodiment of the present disclosure will be described with reference to FIG. 5. FIG. 5 is a block diagram illustrating an example of a configuration of the base station 100 according to an embodiment of the present disclosure. Referring to FIG. 5, the base station 100 includes an antenna unit 110, a radio communication unit 120, a network communication unit 130, a storage unit 140, and a processing unit 150.

(1) Antenna Unit 110

The antenna unit 110 radiates signals outputted from the radio communication unit 120 into space as radio waves. Further, the antenna unit 110 converts radio waves in space into signals, and outputs the signals to the radio communication unit 120.

(2) Radio Communication Unit 120

The radio communication unit 120 transmits and receives signals. For example, the radio communication unit 120 transmits a downlink signal to the terminal device, and receives an uplink signal from the terminal device.

(3) Network Communication Unit 130

The network communication unit 130 transmits and receives information. For example, the network communication unit 130 transmits information to other nodes and receives information from the other nodes. Examples of other nodes include other base stations and core network nodes.

(4) Storage Unit 140

The storage unit 140 temporarily or permanently stores programs and various types of data for an operation of the base station 100.

(5) Processing Unit 150

The processing unit 150 provides various functions of the base station 100. The processing unit 150 includes a setting unit 151 and a transmission processing unit 153. Further, the processing unit 150 may further include components other than these components. In other words, the processing unit 150 may also perform operations other than the operations of these components.

Operations of the setting unit 151 and the transmission processing unit 153 will be described below in detail.

<3.2. Configuration of Terminal Device>

First, an example of the configuration of the terminal device 200 according to an embodiment of the present disclosure will be described with reference to FIG. 6. FIG. 6 is a block diagram illustrating an example of a configuration of a terminal device 200 according to an embodiment of the present disclosure. Referring to FIG. 6, the terminal device 200 includes an antenna unit 210, a radio communication unit 220, a storage unit 230, and a processing unit 240.

(1) Antenna Unit 210

The antenna unit 210 radiates signals outputted from the radio communication unit 220 into space as radio waves. Further, the antenna unit 210 converts radio waves in space into signals, and outputs the signals to the radio communication unit 220.

(2) Radio Communication Unit 220

The radio communication unit 220 transmits and receives signals. For example, the radio communication unit 220 receives a downlink signal from the base station and transmits an uplink signal to the base station.

(3) Storage Unit 230

The storage unit 230 temporarily or permanently stores programs and various types of data for an operation of the terminal device 200.

(4) Processing Unit 240

The processing unit 240 provides various functions of the terminal device 200. The processing unit 240 includes a reception processing unit 241. The processing unit 240 may further include components other than these components. In other words, the processing unit 240 may also perform operations other than the operations of these components.

An operation of the reception processing unit 241 will be described below in detail.

4. TECHNICAL FEATURES

Next, technical features of the system 1 will be described. Specifically, technical features of the transmission device and the reception device included in the system 1 will be described. In the following description, under the assumption of the downlink, the base station 100 will be described as the transmission device, and the terminal device 200 will be described as the reception device, and a similar description applies to the uplink.

(1) Overview

Figure 7:
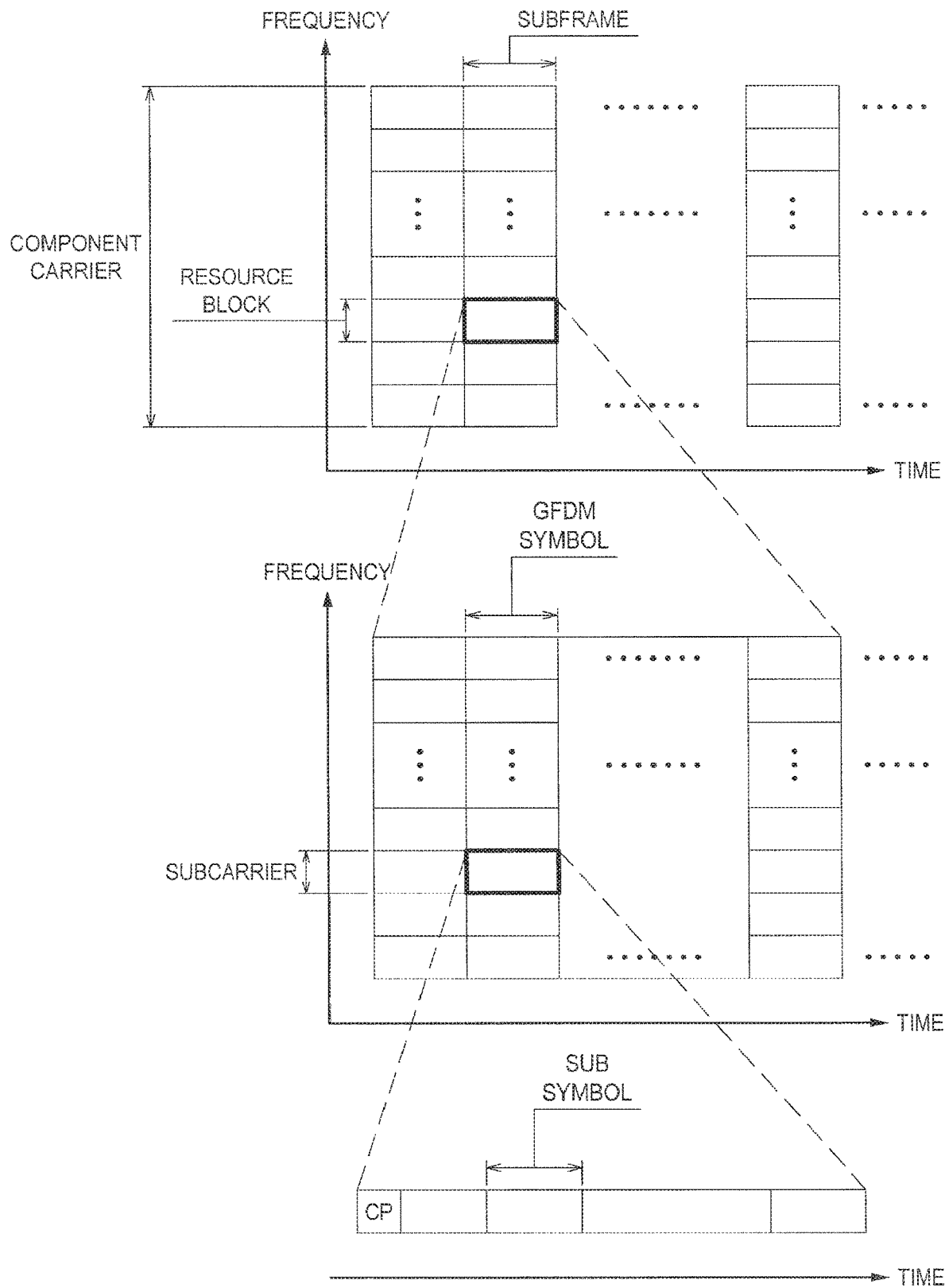
FIG. 7 is an explanatory diagram for describing technical features of a system according to the embodiment.

FIG. 7 is an explanatory diagram for describing an example of a configuration of frequency resources and time resources in GFDM according to the present embodiment. Component carriers (CCs) illustrated in FIG. 7 are allocated to the system 1 according to the present embodiment. A bandwidth of the component carrier is indicated by Bcc. Here, the component carrier may be a component carrier defined in LTE or LTE-A or may mean a unit frequency band more generally. In the component carrier, frequency resources are further divided into blocks having a predetermined bandwidth $B_{RB}$ called $N_{RB}$ resource blocks (RBs). In the case of implementing the multiple access, it is desirable that frequency resources be allocated to the users in units of resource blocks. The resource block is further divided into units called subcarriers.

Here, in general GFDM (or OFDM), a fixed value is set as intervals of the subcarriers (hereinafter, also referred to as "subcarrier intervals (subcarrier spacing)") within a target system. For example, in OFDM of LTE, 15 kHz is permanently set as the subcarrier interval. A subcarrier bandwidth may be regarded as the subcarrier interval. A detailed definition will be described in detail below.

In the present embodiment, this point is one of the features that enable the transmission device (for example, the setting unit 151) to variably set the subcarrier interval. Furthermore, in the present embodiment, as one of the features, as the subcarrier interval, a different value may be set for each resource block in the component carrier, or further different values may be set within the resource block. As a result, it is possible to set a subcarrier interval appropriate for a propagation path state. Further, when communicating with a plurality of reception devices, the transmission device can set an appropriate subcarrier interval in accordance with performance and a request of each reception device. Therefore, the system 1 can accommodate various types of reception devices.

Regarding resources in the time direction, there is a unit called a subframe as a unit serving as a reference. Here, the subframe may be a subframe defined in LTE or LTE-A or may mean a unit time more generally. Basically, it is desirable that a subframe length be fixedly set. The subframe is further divided into units called GFDM symbols. A CP is added to each GFDM symbol. Basically, it is desirable that a GFDM symbol length be fixedly set. Then, the GFDM symbol is further divided into units called subsymbols. A time length of the subsymbol (hereinafter, also referred to as a subsymbol length (a subsymbol period)) is fixedly set in the general GFDM.

In the present embodiment, this point is one of the features that enable the transmission device (for example, the setting unit 151) to variably set the subsymbol length. Similarly to the case of the subcarrier, in the present embodiment, as a subsymbol length, a different value may be set for each resource block, or further different values may be set within the resource block.

The following table shows a list of parameters related to frequency resources and time resources of GFDM according to the present embodiment. Hatched parts in the table indicate differences from the general GFDM, which are one of the features of the GFDM related to the present embodiment.

TABLE 1

| Parameters | Values | Remarks |
|---|---|---|
| $B_{CC}$ component carrier bandwidth | 1.4, 3, 5, 10, 15, 20 MHz | |
| $N_{RB}$ number of resource blocks per component carrier | 6, 15, 25, 50, 75, 100 | fixed number for component carrier bandwidth |
| $B_{RB}$ resource block bandwidth | 180 KHz | fixed |
| $N_{SC}$ Number of subcarriers per resource block | variable | positive integer |
| $B_{SC}$ subcarrier interval | variable | $B_{RB}/N_{SC}$ |
| $T_{SF}$ subframe (SF) length | 1 msec | fixed |
| $T_{GFDM}$ GFDM symbol length | 66.7 microseconds | not including CP length |
| $N_{GFDM}$ number of GFDM symbols per subframe | 12, 14 | positive integer |
| $T_{SS}$ subsymbol length | variable | $T_{GFDM}/N_{SS}$ |
| $N_{SS}$ number of subsymbols per GFDM symbol | variable | Positive integer |
| $T_{CP}$ CP length | 4.7, 16.67 microseconds | common in certain subframe section in component carrier |

Here, the transmission device (for example, the setting unit 151) can set the parameters so that compatibility with OFDM or SC-FDE is secured. For example, the transmission device can secure backward compatibility by setting the subcarrier interval and the subsymbol length to be the same as those in OFDM or to be the same as those in SC-FDE. Accordingly, the system 1 can accommodate the legacy terminals not supporting GFDM.

Figure 8:
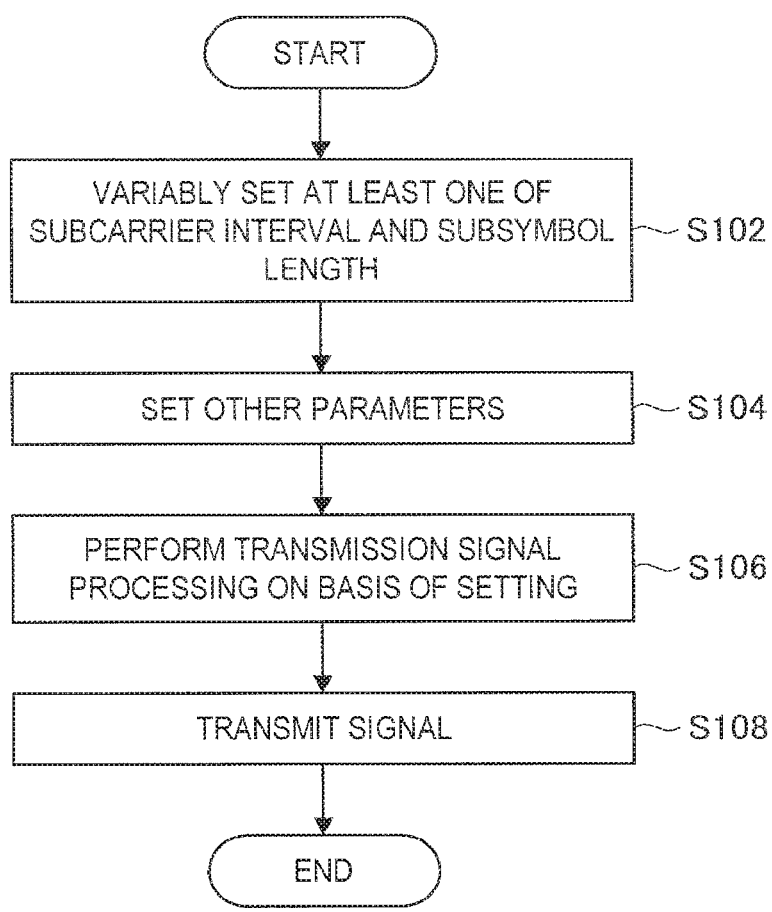
FIG. 8 is an explanatory diagram for describing technical features of a system according to the embodiment.

FIG. 8 illustrates an example of a flow of a process performed by the transmission device that transmits a signal through such a resource configuration. FIG. 8 is a flowchart illustrating an example of the flow of signal processing performed in the transmission device according to the present embodiment.

As illustrated in FIG. 8, the transmission device (for example, the setting unit 151) first variably sets at least one of the subcarrier interval and the subsymbol length (step S102). Next, the transmission device (for example setting unit 151) sets other parameters (step S104). Examples of other parameters include a filter coefficient, an over-sampling parameter, the number of subcarriers, the number of subsymbols, and the like. The setting of the parameters will be described in detail below. Next, the transmission device (for example, the transmission processing unit 153 and the radio communication unit 120) performs transmission signal processing on the basis of the above setting, and generates the RF signal (step S106). Examples of the transmission signal processing to be performed include filtering, over-sampling, and the like. The transmission signal processing will be described below in detail. Then, the transmission device (for example, the antenna unit 110) transmits the generated RF signal (step S108). Then, the process ends.

The transmission signal processing (corresponding to step S106) will be first described below in detail, and then the parameter setting (corresponding to steps S102 and S104) will be described in detail.

(2) Transmission Signal Processing

The transmission signal processing when the subcarrier interval and the subsymbol time length are variably set will be described. Here, the transmission device refers to, for example, the radio communication unit 120 that operates under the control of the transmission processing unit 153. Further, here, the reception device refers to, for example, the radio communication unit 220 that operates under the control of the reception processing unit 241. Furthermore, here, the multi-cell system such as HetNet or SCE is assumed.

In the following description, it should be noted that an index corresponding to a subframe is omitted unless otherwise stated. Further, indices i and u of a transmission device i and a reception device u may indicate IDs of cells to which the devices belong or IDs of cells managed by the devices.

A bit sequence to be transmitted from the transmission device i to the reception device u in a subframe t is indicated by $b_{i,u}$. The bit sequence $b_{i,u}$ may constitute one transport block. The following description will proceed with an example in which the transmission device i transmits one bit sequence to the reception device u, but the transmission device i may transmit a plurality of bit sequences to the reception device u, and in this case, the bit sequence may constitute a plurality of transport blocks.

(2.1) First Example

Figure 9:
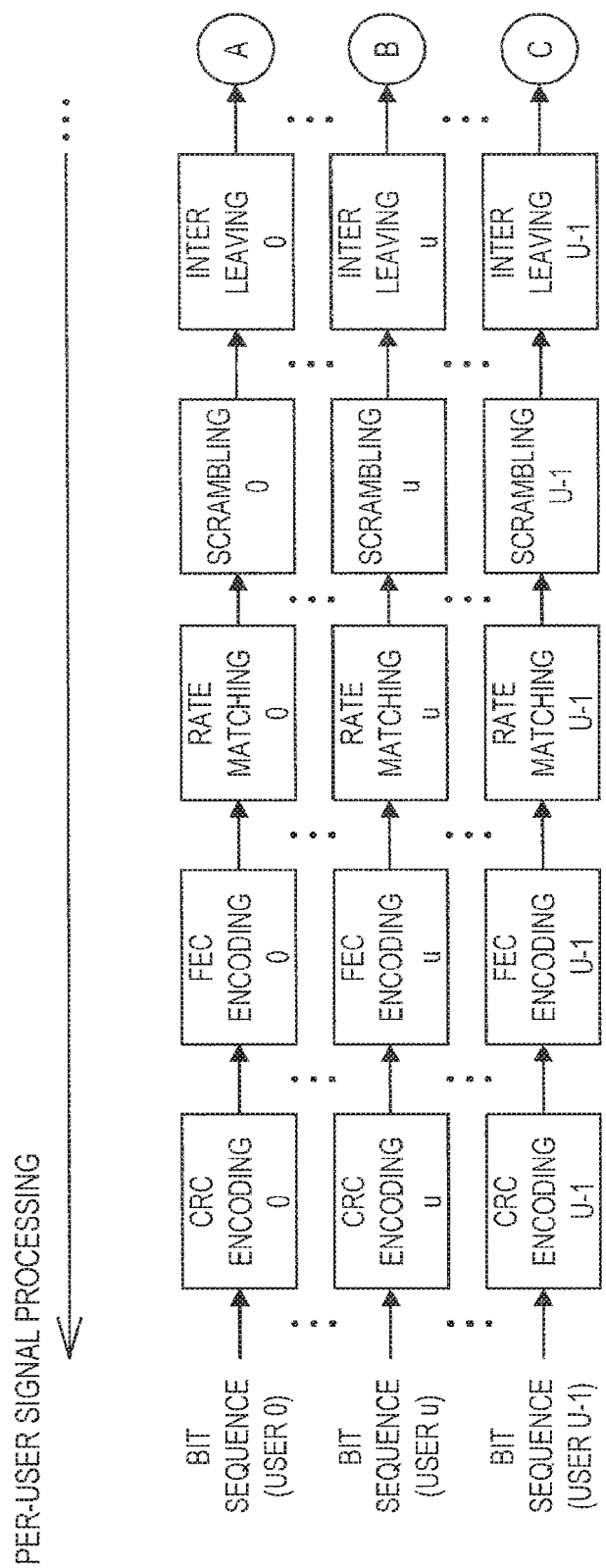
FIG. 9 is an explanatory diagram for describing technical features of a system according to the embodiment.
Figure 10:
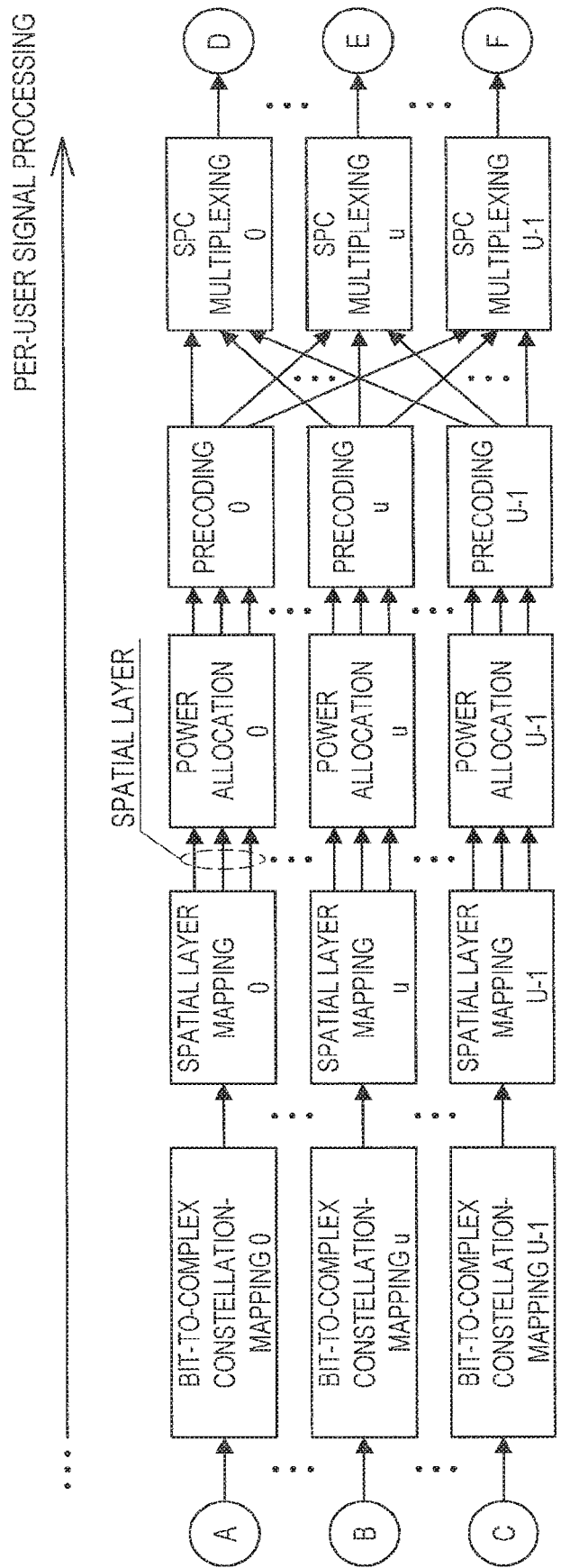
FIG. 10 is an explanatory diagram for describing technical features of a system according to the embodiment.
Figure 11:
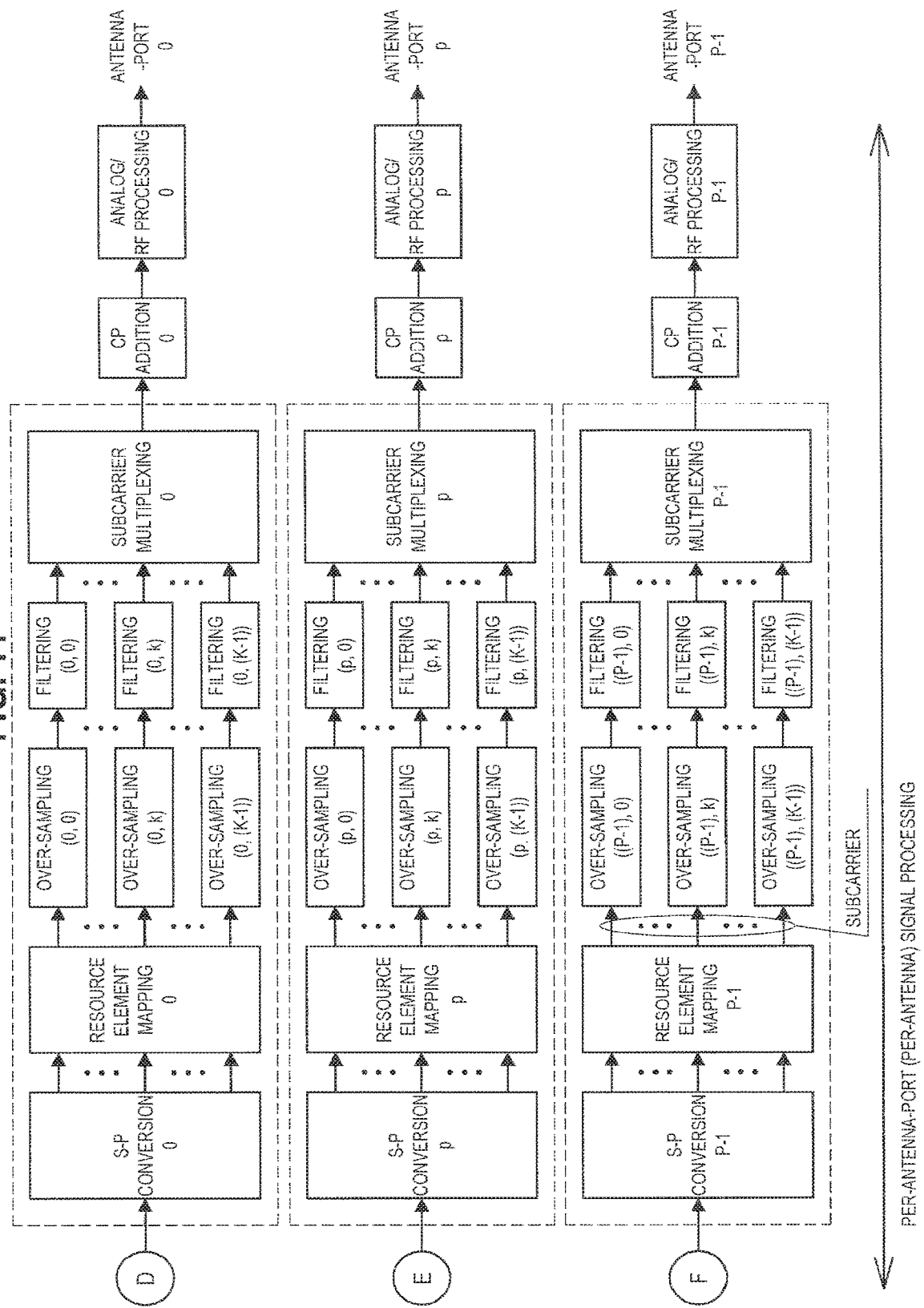
FIG. 11 is an explanatory diagram for describing technical features of a system according to the embodiment.

FIGS. 9 to 11 are explanatory diagrams for describing an example of a configuration of a first transmission device supporting GFDM according to the present embodiment. First, the transmission device performs processing illustrated in FIG. 9 and then performs processing illustrated in FIG. 10 for each user. Thereafter, the transmission device performs processing illustrated in FIG. 11 for each transmitting antenna port. FIGS. 9 to 11 illustrate an exemplary configuration when a GFDM signal is transmitted to one or more users through multiple antennas. In other words, the number of users (or the number of reception devices) $N_U \geq 1$, and the number of transmitting antenna ports (or the number of transmitting antennas) $N_{AP} \geq 1$. In the drawings, the number of users is indicated by U, and the number of transmitting antenna ports is indicated by P.

In the first example, the transmission signal processing of OFDM illustrated in FIG. 2 is extended to implement transmission signal processing of GFDM. The transmission process will be described below with reference to FIGS. 9 to 11.

As illustrated in FIG. 9, first, the transmission device performs CRC coding, FEC coding (for example, a convolutional code, a turbo code, an LDPC code, or the like), rate matching for adjusting a code rate, bit scrambling, bit interleaving, and the like. These processes are expressed as follows.

[Math. 1]

$$b_{CRC,i,u} = CRC_{ENC}(b_{i,u}, u, i, t)$$

$$b_{FEC,i,u} = FEC_{ENC}(b_{CRC,i,u}, u, i, t)$$

$$b_{RM,i,u} = RM(b_{FEC,i,u}, u, i, t)$$

$$b_{SCR,i,u} = SCR(b_{RM,i,u}, u, i, t)$$

$$b_{INT,i,u} = \pi(b_{SCR,i,u}, u, i, t) \quad (1)$$

In each process, a processing configuration may change for each reception device u, each transmission device i, or each subframe t. In Formula (1), the process is regarded as a function, and a processing result of a preceding stage is dealt as a parameter of a process at a subsequent stage.

Subsequently, as illustrated in FIG. 10, the transmission device maps (that is, converts) a bit sequence to a complex symbol after the above bit processing, and further maps it to a spatial layer 1. These processes are expressed as follows.

[Math. 2]

$$s_{i,u} = \begin{bmatrix} s_{i,u,0} \\ \vdots \\ s_{i,u,N_{SL,i,u}-1} \end{bmatrix} \quad (2)$$

$$s_{i,u,l} = [\, s_{i,u,l,0} \; \cdots \; s_{i,u,l,N-1} \,]$$

Here, various constellations such as BPSK, QPSK, 8PSK, 16QAM, 64QAM, or 256QAM can be used for mapping to the complex symbols. Further, $N_{SL,i,u}$ indicates the number of spatial layers for the reception device u.

After the mapping to the spatial layer, the transmission device performs power allocation and precoding on the symbols as indicated in the following Formula.

[Math. 3]

$$x_{i,u} = W_{i,u} P_{i,u} s_{i,u} \quad (3)$$

$$\begin{bmatrix} x_{i,u,0,0} & \cdots & x_{i,u,0,N_{EL,TTL}-1} \\ \vdots & \ddots & \vdots \\ x_{i,u,N_{AP,i}-1,0} & \cdots & x_{i,u,N_{AP,i}-1,N_{EL,TTL}-1} \end{bmatrix}$$

$$\begin{bmatrix} x_{i,u,0} \\ \vdots \\ x_{i,u,N_{AP,i}-1} \end{bmatrix}$$

[Math. 4]

$$x_{i,u,p} = [\, x_{i,u,p,0} \; \cdots \; x_{i,u,p,N_{EL,TTL}-1} \,] \quad (4)$$

[Math. 5]

$$W_{i,u} = \begin{bmatrix} w_{i,u,0,0} & \cdots & w_{i,u,0,N_{SL,i,u}-1} \\ \vdots & \ddots & \vdots \\ w_{i,u,N_{AP,i}-1,0} & \cdots & w_{i,u,N_{AP,i}-1,N_{SL,i,u}-1} \end{bmatrix} \quad (5)$$

[Math. 6]

$$P_{i,u} = \begin{bmatrix} P_{i,u,0,0} & \cdots & P_{i,u,0,N_{SL,i,u}-1} \\ \vdots & \ddots & \vdots \\ P_{i,u,N_{SL,i,u}-1,0} & \cdots & P_{i,u,N_{SL,i,u}-1,N_{SL,i,u}-1} \end{bmatrix} \quad (6)$$

Here, $N_{AP,i}$ indicates the number of transmitting antenna ports (or the number of transmitting antennas) of the transmission device i, and basically, a relation of $N_{SL,i,u} \leq N_{AP,i}$ is desirable. $N_{EL,TLL}$ indicates the number of elements to be described below. W indicates a precoding matrix, and it is desirable that an element be a complex number or a real number. P indicates a power allocation matrix, and it is desirable that an element is a real number, and it is desirable that it is a diagonal matrix as indicated in the following Formula.

[Math. 7]

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SL,u}-1,N_{SL,u}-1} \end{bmatrix} \quad (7)$$

After the power allocation and the precoding, the transmission device multiplexes signals for each transmitting antenna port as indicated in the following Formula. For multiplexing of signals, for example, superposition multiplexing, superposition coding (SPC), multiuser superposition transmission (MUST), non-orthogonal multiple access (NOMA), or the like can be employed.

[Math. 8]

$$x_i = \sum_{u \in U_i} x_{i,u} \quad (8)$$

Here, $U_i$ indicates a set of indices of the reception device u with which the transmission device i multiplexes signals.

A subsequent process is signal processing for each transmitting antenna port p and for each GFDM symbol g. As illustrated in FIG. 11, first, the transmission device develops the symbols in the frequency direction through S/P conversion and then arranges the symbol on an element of a predetermined subsymbol and a predetermined subcarrier through resource element mapping. A rule of the arrangement may be decided by the transmission device i and may be decided for the reception device u for which multiplexing is performed.

The element arranged in the subcarrier in the resource block r ($0 \leq r < N_{RB}$) as a result of resource element mapping will be described.

The number of subcarriers in a GFDM symbol and a target resource block is indicated by $N_{SC,r,g}$, and the number of subsymbols is indicated by $N_{SS,r,g}$. In this case, the number of elements in the target GFDM symbol is $N_{EL,r,g} = N_{SC,r,g} \times N_{SS,r,g}$.

An element arranged in a subsymbol $m_{r,g}$ and a subcarrier $k_{r,g}$ is indicated by $x_{p,kr,g,mr,g}$. The transmission device first oversamples the respective elements (that is, for each subcarrier and each subsymbol) at a sampling rate $N_{SR,r,g}$, and then filters them using a filter coefficient $h_{p,kr,g,mr,g}(n)$. N is an index of a sample. In FIG. 11, k is an index of a subcarrier, and K is a total number of subcarriers.

A filtered sample is indicated as in the following Formula. An effect of over-sampling is included in a term of a filter coefficient.

[Math. 9]

$$d_{p,k_{r,g},m_{r,g}} = [d_{p,k_{r,g},m_{r,g}}(0) \cdots d_{p,k_{r,g},m_{r,g}}(N_{SS,r,g}N_{SR,r,g}-1)]d_{p,k_{r,g},m_{r,g}}(n) = x_{p,k_{r,g},m_{r,g}} h_{p,k_{r,g},m_{r,g}}(n - n_{r,g}N_{SR,r,g}) \quad (9)$$

After the filtering, the transmission device performs modulation and multiplexing at a frequency f(k) for each subcarrier. If a set of subcarrier indexes included in the GFDM symbol g and the resource block r is indicated by $K_{r,g}$, c(n) of the multiplexed GFDM symbol is expressed as in the following Formula.

[Math. 10]

$$c_{p,g} = [c_{p,g}(0) \cdots c_{p,g}(N_{SS,g}N_{SR,g}-1)] \quad (10)$$

$$c_{p,g}(n) = \sum_{r=0}^{N_{RB}-1} \sum_{m_{r,g}=0}^{N_{SS,r,g}-1} \sum_{k \in K_{r,g}} d_{p,k,m_{r,g}}(n) \exp\left\{ j2\pi f(k) n \frac{T_{SS,r,g}}{N_{SR,r,g}} \right\}$$

The transmission device adds a CP and a cyclic suffix (CS) to each multiplexed GFDM symbol. The GFDM symbol to which the CP and the CS are added is indicated as in the following Formula.

[Math. 11]

$$c_{CP,p,g} = [c_{p,g}(N_{SS,g}N_{SR,g} - N_{CP,g}) \cdots c_{p,g}(N_{SS,g}N_{SR,g}-1) c_{p,g}(0) \cdots c_{p,g}(N_{SS,g}N_{SR,g}-1)] \quad (11)$$

Here, $N_{CP,g}$ indicates the number of samples of the CP added to the GFDM symbol g.

(2.2) Second Example

Figure 12:
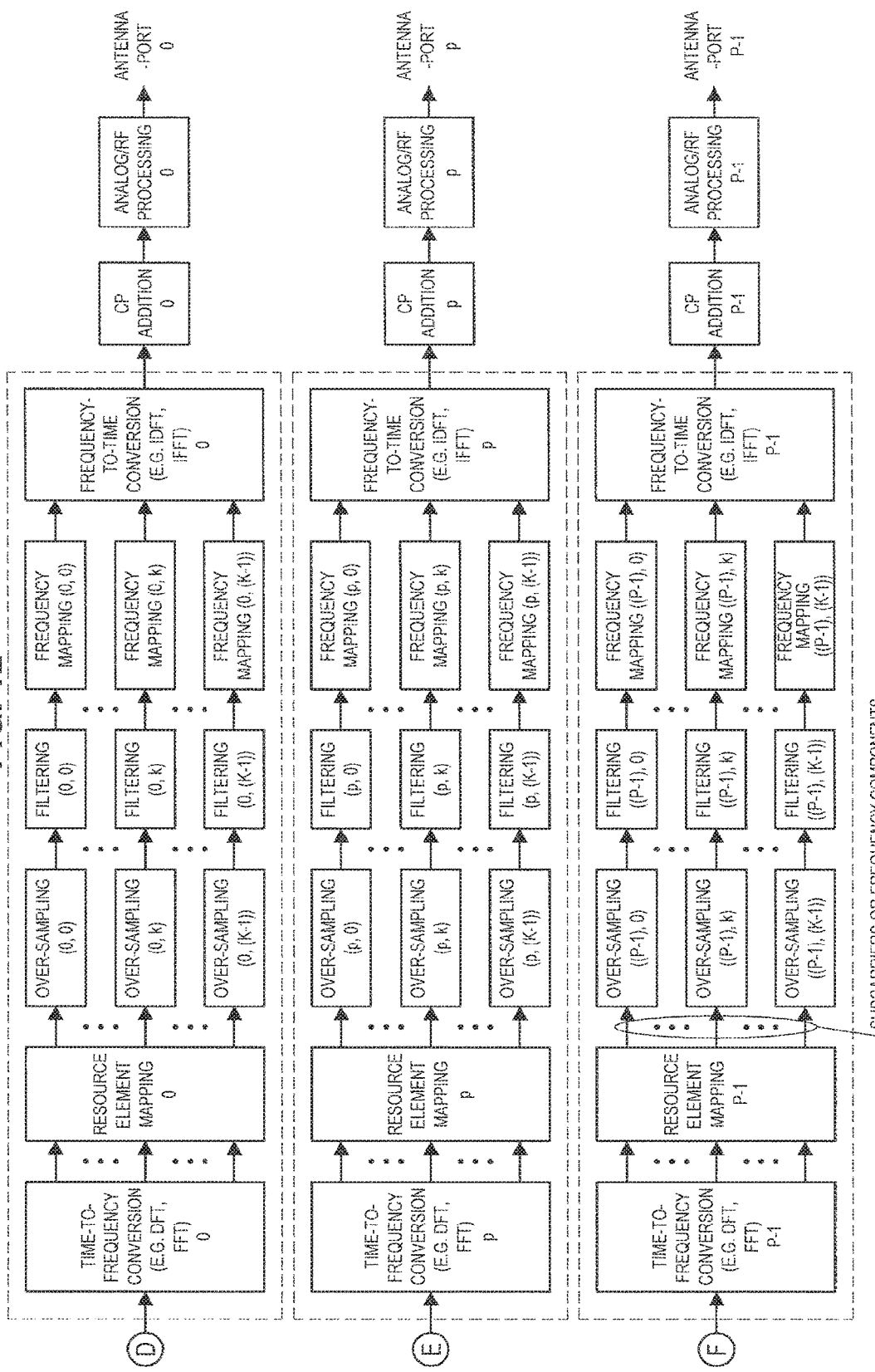
FIG. 12 is an explanatory diagram for describing technical features of a system according to the embodiment.

FIG. 12 is an explanatory diagram for describing an example of a configuration of a second transmission device supporting GFDM according to the present embodiment. The transmission device according to the second example first performs the process illustrated in FIG. 9 and then performs the process illustrated in FIG. 10 for each user, similarly to the first example. Thereafter, the transmission device according to the second example performs the process illustrated in FIG. 12 for each transmitting antenna port. A difference with the first example is that in the second example, a signal processing domain passes through an order of time, frequency, and time. Specifically, in the first example, a part in which the process is regarded as the process for each user is regarded as a process in the time domain in the second example.

In the second example, the transmission signal processing of SC-FDE illustrated in FIG. 3 is extended to implement the transmission signal processing of GFDM. In the present transmission signal processing, particularly, there is a feature in which a process of performing frequency conversion on a signal of a processing target in the time domain takes place before the over-sampling. The transmission process will be described below with reference to FIG. 12.

As illustrated in FIG. 12, the transmission device first performs time- to frequency conversion (for example, the DFT or the FFT) on the time symbol sequence, and performs conversion into frequency components. If the time symbol sequence allocated to the GFDM symbol g and the subcarrier k of the resource block r is indicated by $x_{p,r,g}$, a frequency component that has undergone the frequency conversion is indicated as in the following Formulas.

[Math. 12]

$$\overline{x}_{p,r,k,g} \quad (12)$$

[Math. 13]

$$\overline{x}_{p,r,k,g} = F_{N_{SS,r,k,g}} x_{p,r,g}^T \quad (13)$$

$$= [\overline{x}_{p,r,k,g,0} \cdots \overline{x}_{p,r,k,g,N_{SS,r,k,g}-1}]^T$$

[Math. 14]

$$x_{p,r,g} = [x_{p,r,g,0} \cdots x_{p,r,g,N_{SS,r,k,g}-1}] \quad (14)$$

[Math. 15]

$$F_N = \begin{bmatrix} \exp\left(-j2\pi \frac{0 \cdot 0}{N}\right) & \cdots & \exp\left(-j2\pi \frac{0 \cdot (N-1)}{N}\right) \\ \vdots & \ddots & \vdots \\ \exp\left(-j2\pi \frac{(N-1) \cdot 0}{N}\right) & \cdots & \exp\left(-j2\pi \frac{(N-1) \cdot (N-1)}{N}\right) \end{bmatrix} \quad (15)$$

Here, $F_N$ indicates a Fourier transform matrix of a size N.

After the conversion to the frequency component, the transmission device performs the over-sampling for each subcarrier. Since the over-sampling process corresponds to repetition of the frequency component in the frequency domain, it is indicated as in the following Formula.

[Math. 16]

$$\tilde{x}_{p,r,k,g} = I_{OS,N_{SS,r,k,g},N_{SR,r,k,g}} \overline{x}_{p,r,k,g}^T \quad (16)$$

$$= [\tilde{x}_{p,r,k,g,0} \cdots \tilde{x}_{p,r,k,g,N_{SS,r,k,g}N_{SR,r,k,g}-1}]^T$$

$$= \left[ \underbrace{\overline{x}_{p,r,k,g,0} \cdots \overline{x}_{p,r,k,g,N_{SS,r,k,g}-1}}_{0-th} \cdots \underbrace{\overline{x}_{p,r,g,0} \cdots \overline{x}_{p,r,g,N_{SS,r,k,g}-1}}_{(N_{SR,r,k,g}-1)-th} \right]^T$$

[Math. 17]

$$I_{OS,N,M} = \left[ \underbrace{I_N}_{0-th} \cdots \underbrace{I_N}_{(M-1)-th} \right]^T \quad (17)$$

Here, a matrix IN is a unit matrix of a size N. In other words, $I_{OS,N,M}$ is a matrix in which M matrices $I_N$ are arranged.

The transmission device performs filtering on each of a predetermined number of subcarriers after the over-sampling. For example, the transmission device implements the filtering by multiplying each frequency component by a frequency filter coefficient. The predetermined number may be 1 or may be an arbitrary number of 1 or more. An arbitrary number of 1 or more may be, for example, the number of subcarriers included in a unit resource to be described below. The filtered signal is indicated as in the following Formula.

[Math. 18]

$$\bar{d}_{p,r,k,g} = \Gamma_{p,r,k,g} \tilde{x}_{p,r,k,g}$$
$$= [\bar{d}_{p,r,k,g}(0) \cdots \bar{d}_{p,r,k,g}(N_{SS,r,k,g} N_{SR,r,k,g} - 1)]^T$$

$$\Gamma_{p,r,k,g} = \begin{bmatrix} \bar{\gamma}_{p,r,k,g,0,0} & \cdots & \bar{\gamma}_{p,r,k,g,0,N_{SS,p,r,k,g} N_{SR,p,r,k,-1}} \\ \vdots & \ddots & \vdots \\ \bar{\gamma}_{p,r,k,g,N_{SS,p,r,k,g} N_{SR,p,r,k,g}-1,0} & \cdots & \bar{\gamma}_{p,r,k,g,N_{SS,p,r,k,g} N_{SR,p,r,k,g}-1,N_{SS,p,r,k,g} N_{SR,p,r,k,g}-1} \end{bmatrix}$$
(18)

Here, a matrix F is a filtering coefficient. This matrix can be generally a diagonal matrix. In other words, the matrix F may be indicated as in the following Formula.

[Math. 19]

$$\Gamma_{p,r,k,g} = \begin{bmatrix} \bar{\gamma}_{p,r,k,g,0,0} & 0 & \cdots & 0 & 0 \\ 0 & \ddots & \ddots & \ddots & 0 \\ \vdots & \ddots & \ddots & \ddots & \vdots \\ 0 & \ddots & \ddots & \ddots & 0 \\ 0 & 0 & \cdots & 0 & \bar{\gamma}_{p,r,k,g,N_{SS,p,r,k,g} N_{SR,p,r,k,g}-1,N_{SS,p,r,k,g} N_{SR,p,r,k,g}-1} \end{bmatrix}$$
(19)

After the filtering, the transmission device performs mapping of the frequency components in accordance with a predetermined rule and performs frequency to time conversion (for example, the IDFT, the IFFT, or the like). The processes are indicated as in the following Formulas.

[Math. 20]

$$\tilde{d}_{p,r,g} = \sum_{k \in K_{r,g}} \bar{A}_{p,r,k,g} \bar{d}_{p,r,k,g}$$
$$= [\tilde{d}_{p,r,g}(0) \cdots \tilde{d}_{p,r,g}(N_{IDFT} - 1)]^T$$
(20)

[Math. 21]

$$c_{p,g} = F_{N_{IDFT}}^H \sum_{r=0}^{N_{RB}-1} \tilde{d}_{p,r,g}$$
$$= [c_{p,g}(0) \cdots c_{p,g}(N_{IDFT} - 1)]^T$$
(21)

Here, $F_H$ is a Hermitian matrix of F. Further, A is a frequency mapping matrix of a size $N_{IDFT} \times N_{SS,r,k,g} \times N_{SR,r,k,g}$. A (K,k') component of a frequency mapping matrix A is 1 when a frequency component k' after the filtering on each subcarrier is arranged in a final frequency component k. The (K,k') component of a frequency mapping matrix A is 0 when the frequency component k' after the filtering on each subcarrier is not arranged in the final frequency component k. It is desirable that in the frequency mapping matrix A, a sum of elements of each row be 1 or less, and a sum of elements of each column be 1 or less.

The transmission device adds the CP to each GFDM symbol after the frequency to time conversion. The GFDM symbol to which the CP is added is indicated as in the following Formula.

[Math. 22]

$$c_{CP,p,g} = [c_{p,g}(N_{SS,g} N_{SR,g} - N_{CP,g}) \cdots c_{p,g}(N_{SS,g} N_{SR,g} - 1) c_{p,g}(0) \cdots c_{p,g}(N_{SS,g} N_{SR,g} - 1)]$$
(22)

Here, $N_{CP,g}$ is the number of samples of CP added to the GFDM symbol g.

(2.3) Comparison of First Example and Second Example

The transmission device according to the first example and the transmission device according to the second example generate the same waveform theoretically. However, when subsymbols of different lengths and/or subcarriers of different intervals are multiplexed as described below, there is a difference in simplicity of implementation.

Specifically, in the case of the first example, when subcarriers with different intervals are mixed, it is difficult to use a high-speed operation such as the IDFT or the IFFT for multiplexing subcarriers. This is because it is difficult to input a signal whose resolution is not constant for the IDFT and the IFFT.

On the other hand, in the case of the second example, it is possible to use the high-speed operations such as the IDFT or the IFFT for the frequency to time conversion by setting the parameters appropriately. In other words, the transmission device according to the second example is more useful than the transmission device according to the first example since it is easier to implement.

(3) Parameter Setting

The parameter setting by the transmission device (for example, the setting unit 151) according to the present embodiment will be described below.

(3.1) Filtering Parameter Setting

The transmission device (for example, the setting unit 151) according to the present embodiment variably sets at least one of intervals of subcarriers and time lengths of subsymbols included in a unit resource configured with one or more subcarriers or one or more subsymbols. Here, the unit resources may be a unit of a frequency resource (for example, a resource block or a component carrier), a unit of a time resource (for example, a GFDM symbol, a subframe, or the like), or a combination of a frequency resource and a time resource. The transmission device (for example, the transmission processing unit 153) performs the filtering on the basis of this setting. Specifically, the transmission device (for example, the transmission processing unit 153) variably sets the bandwidth of the filter on the basis of the set intervals of the subcarriers. In the first or second configuration described above, since it is possible to perform the filtering for each of a predetermined number of subcarriers, it is possible to implement a resource configuration of implementing the intervals of the subcarriers which are variably set and the time lengths of the subsymbols which are variably set. For example, the transmission device according to the present embodiment can multiplex subsymbols of different time lengths and/or subcarriers of different intervals in the same GFDM symbol period. An example of the configuration of the GFDM symbol is illustrated in FIG. 13.

Figure 13:
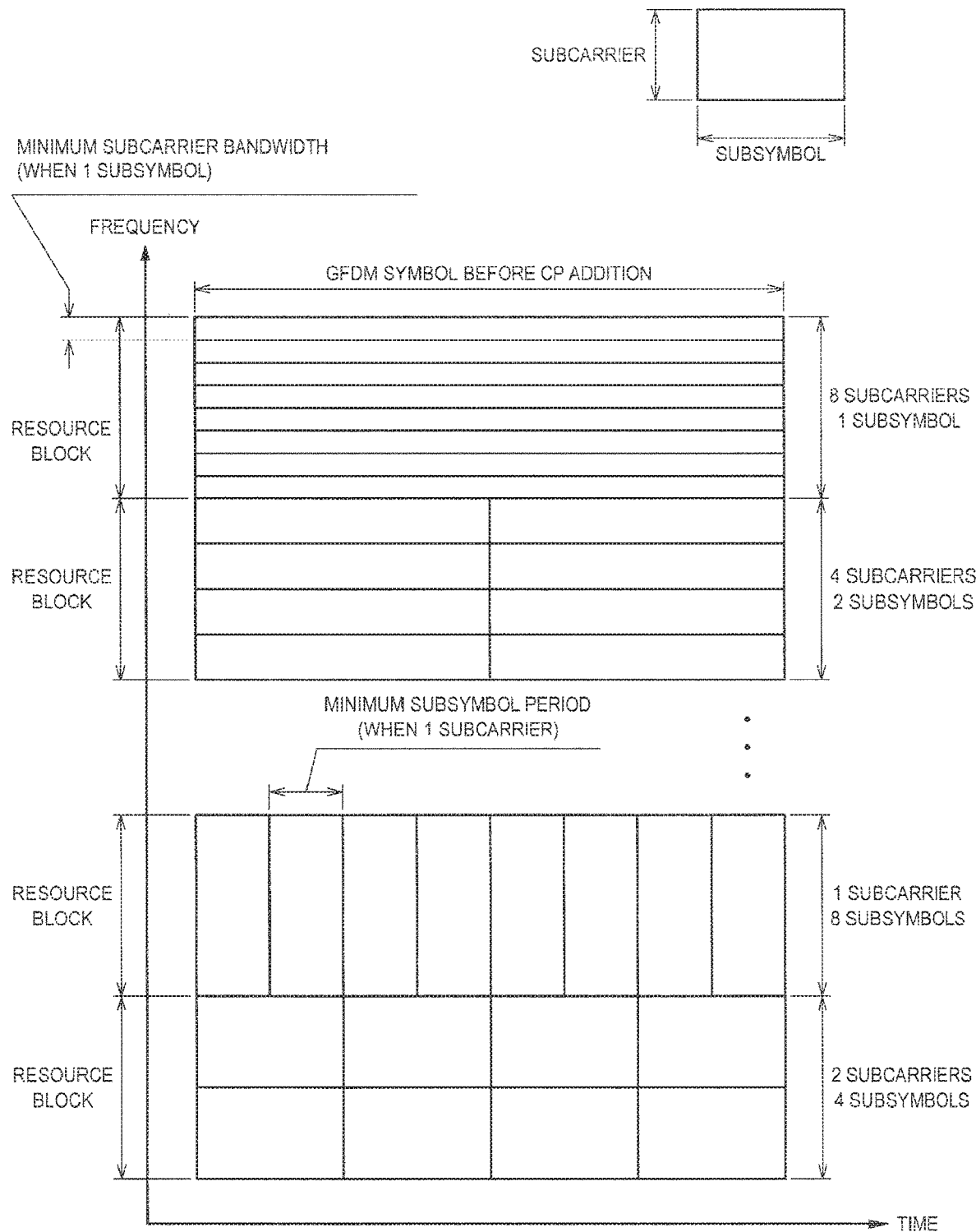
FIG. 13 is an explanatory diagram for describing technical features of a system according to the embodiment.

As illustrated in FIG. 13, the transmission device (for example, the setting unit 151) can set different values as the subsymbol length and the subcarrier interval for each unit resource. However, the transmission device sets the same value as the subcarrier interval and the subsymbol length within the unit resource. For example, in the example illustrated in FIG. 13, the subcarrier interval and subsymbol length are the same in one resource block. In a multi-user system, when a resource block is set as a frequency resource allocation unit, such a setting makes it possible to set subsymbol length and subcarrier interval to predetermined values for one user. Thus, it is possible to simplify the transmission process and the reception process. The transmission device (for example, the setting unit 151) can set different values as the subsymbol length and the subcarrier interval in units of GFDM symbols or in units of subframes.

Further, it is desirable that different unit resources be the same in a value of the product of the number of subcarriers and the number of subsymbols. For example, in the example illustrated in FIG. 13, the products of the number of subcarriers and the number of subsymbols of a plurality of resource blocks multiplexed in the same GFDM symbol period are all eight. As a result, it is possible to simplify the configuration of the transmission device and the configuration of the reception device (that is, the transmission process and the reception process) when a variable parameter is introduced.

The transmission device (for example, the setting unit 151) can variably set the subcarrier interval. For example, the transmission device may set an integer multiple of a minimum settable value set in the system 1 as the subcarrier interval. Further, the transmission device can set a value by which the bandwidth of the unit resource is divisible as the subcarrier interval. Through this setting, the transmission device is able to use up all usable frequency resources without waste. The minimum value of the subcarrier interval is preferably equal to the subcarrier interval when the number of subsymbols in the GFDM symbol is 1.

The transmission device (for example, the setting unit 151) can variably set the subsymbol length. For example, the transmission device may set an integer multiple of a minimum settable value set in the system 1 as the subsymbol length. Further, the transmission device may set a value by which a time length of the unit resource is divisible as the subsymbol length. Through this setting, the transmission device is able to use up all usable time resources without waste. The minimum value of the subsymbol length is preferably equal to the subsymbol length when the number of subcarriers in the resource block is 1.

The following table shows an example of a range of parameters related to resources that can be used in the system 1 according to the present embodiment.

TABLE 2

| Parameters | | Values | Remarks |
| --- | --- | --- | --- |
| subsymbol length | minimum value | same as subsymbol length when number of subcarriers is 1 | |
| | maximum value | same as GFDM symbol length | |
| number of subsymbols | minimum value | 1 | value of product of number of subsymbols and number of subcarriers is constant |
| | maximum value | maximum value of number of subcarriers | value of product of number of subsymbols and number of subcarriers is constant |
| subcarrier interval | minimum value | same as subcarrier interval when number of subsymbols is 1 | |
| | maximum value | same as resource block bandwidth (or same as value of product of resource block bandwidth and total number of resource blocks allocated to target signal) | |
| number of subcarriers | minimum value | 1 | value of product of number of subsymbols and number of subcarriers is constant |
| | maximum value | maximum value of number of subsymbols | value of product of number of subsymbols and number of subcarriers is constant |

Figure 14:
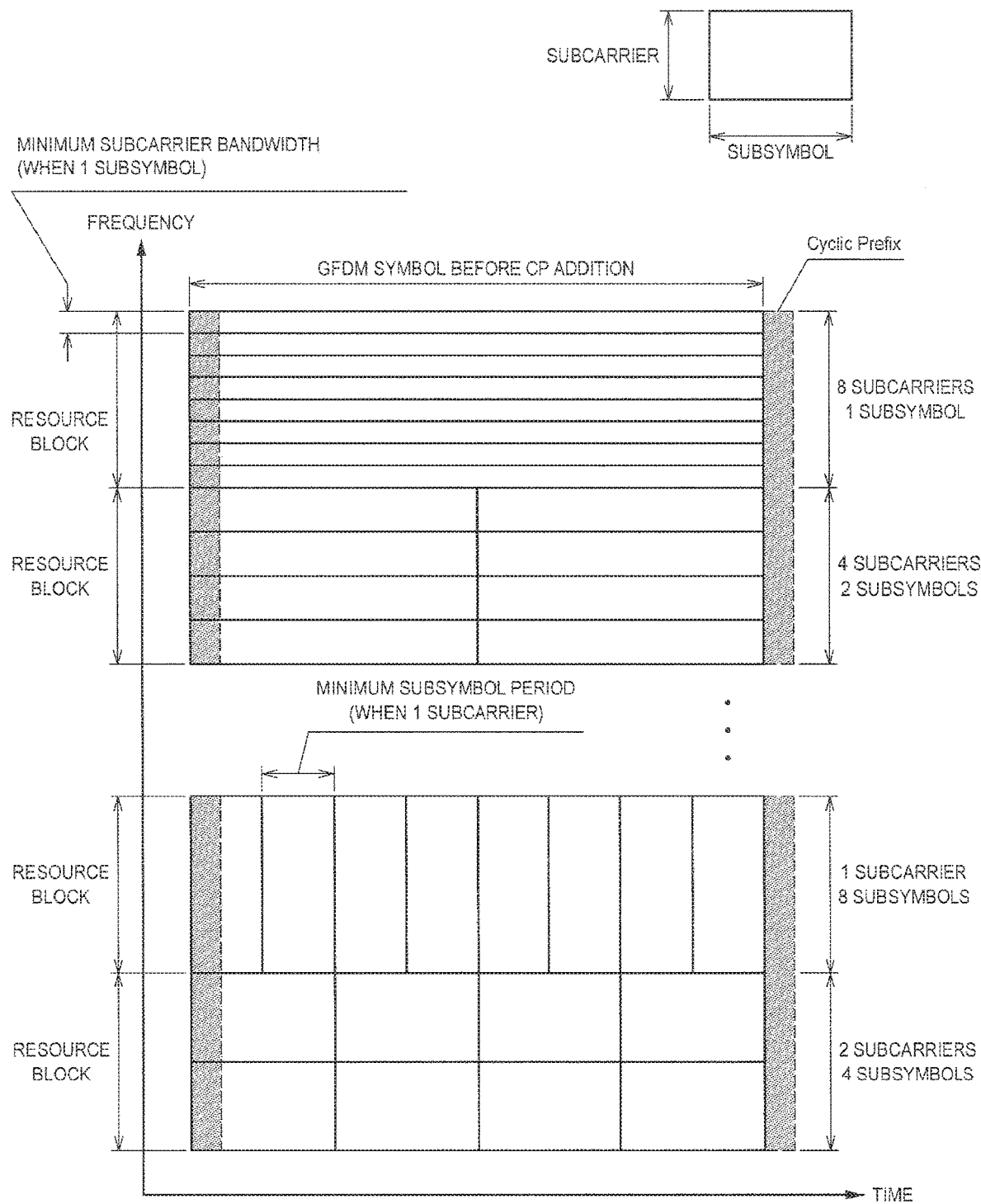
FIG. 14 is an explanatory diagram for describing technical features of a system according to the embodiment.

In FIG. 13, a state before the CP is added is illustrated. The transmission device (for example, the transmission processing unit 153) adds the CP of the same time length to one or more unit resources of an addition target. An example of a state after the CP is added is illustrated in FIG. 14. In the example illustrated in FIG. 14, a copy of a predetermined length part in a second half of the GFDM symbol covering the entire area of the component carrier is added to a head of the GFDM symbol.

(3.2) Setting of Subcarrier Interval and Subsymbol Length

Figure 15:
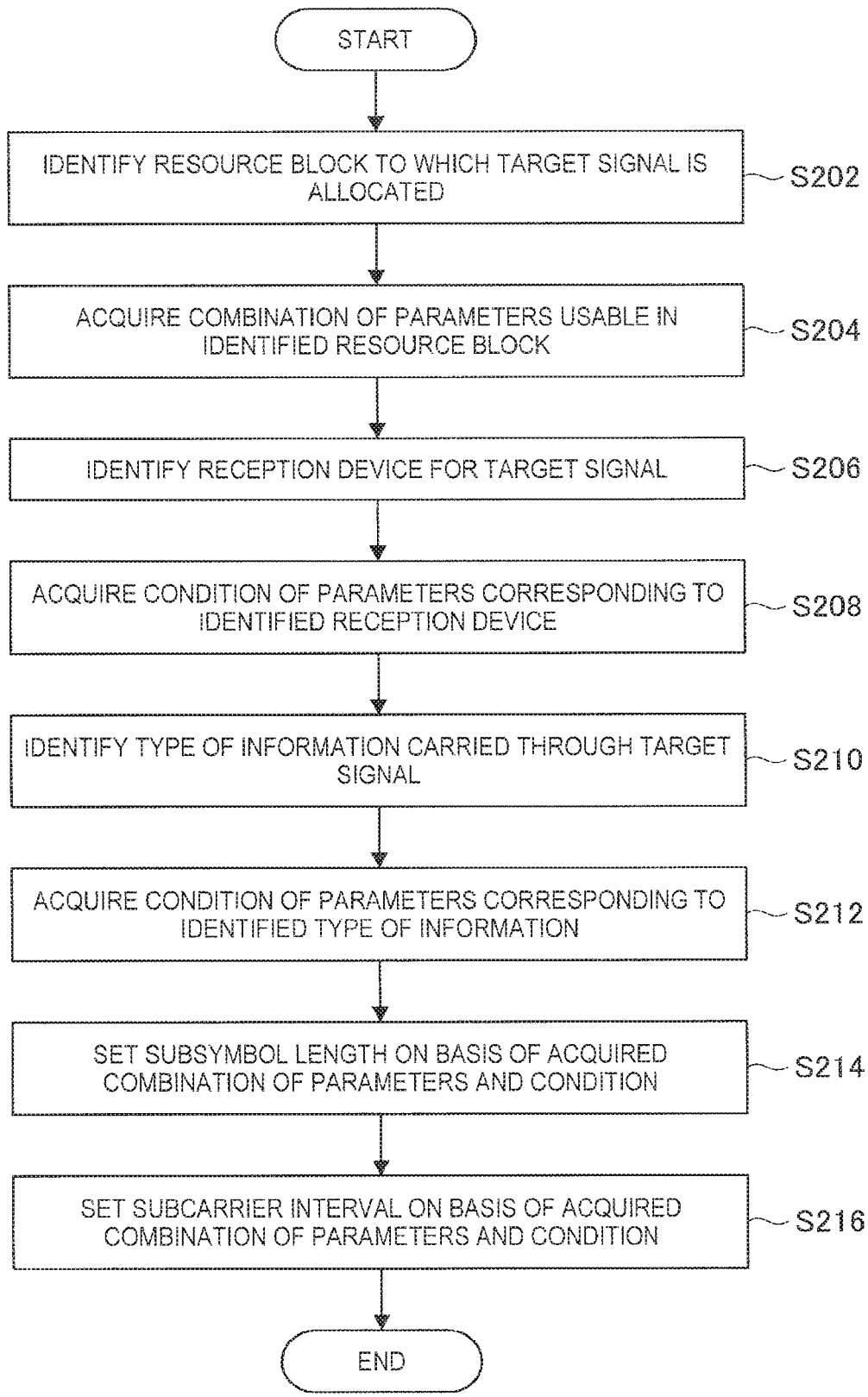
FIG. 15 is an explanatory diagram for describing technical features of a system according to the embodiment.

FIG. 15 is a flowchart illustrating an example of the flow of the parameter setting process performed in the transmission device (for example, the setting unit 151) according to the present embodiment. Here, as an example, possible values of the subsymbol length and the subcarrier interval are assumed to be discrete values. Further, the transmission device is assumed to select the subsymbol length and the subcarrier interval to be set from combinations of a plurality of subsymbol lengths and subcarrier intervals predetermined in the system 1.

As illustrated in FIG. 15, the transmission device identifies a resource block to which a target signal is allocated (step S202). Then, the transmission device acquires a combination of parameters usable in the identified resource block (step S204).

Then, the transmission device identifies the reception device for the target signal (step S206). In place of or in addition to this step, the transmission device may identify a type of reception device of the target signal. Then, the transmission device acquires conditions of parameters (that is, the subsymbol length and the subcarrier interval) corresponding to the identified reception device (and/or the type of reception device) (step S208). The conditions of the parameters corresponding to the reception device will be described below.

Then, the transmission device identifies a type of information carried by the target signal (step S210). In place of or in addition to this step, the transmission device may identify a type of application related to the information carried by the target signal. Then, the transmission device acquires conditions of parameters corresponding to the identified type of information (and/or the type of application) (step S212). The conditions of the parameters corresponding to the type of information will be described below.

Then, the transmission device sets the subsymbol length on the basis of the combination of parameters acquired in step S204 and the conditions acquired in step S208 (step S214). Further, the transmission device sets the subcarrier interval on the basis of the combination of parameters acquired in step S204 and the conditions acquired in step S212 (step S216).

Then, the process ends.

Next, the conditions of parameters corresponding to the reception device will be described. An example of the conditions is shown in the following table.

TABLE 3

| Type of reception device | Conditions of parameter | | |
|---|---|---|---|
| | Subcarrier interval | Filter coefficient | Subsymbol length |
| there is interference cancellation capability | small | sharp band limitation | small |
| there is interference cancellation capability | large | gentle band limitation | large |

As shown in the above table, the subcarrier interval, the filter coefficient, and the subsymbol length may be set in accordance with to the type of reception device. Specifically, the transmission device (for example, the setting unit 151) may set a filter according to an interference cancellation capability of the reception device of the transmission target. In accordance with this setting, for example, the transmission device (for example, the transmission processing unit 153) may apply a filter in which a filter coefficient with a sharp band limitation is set when the reception device has the interference cancellation capability or a high interference cancellation capability. Further, the transmission device (for example, the transmission processing unit 153) may apply a filter in which a filter coefficient with a gentle band limitation is set when the reception device has no interference cancellation capability or a low interference cancellation capability. As a result, when the reception device has no or low interference cancellation capability, at the reception device side, interference cancellation is unnecessary, and the load of the interference cancellation process can be reduced. This is advantageous particularly when a device which is small and requires low power consumption such as the MTC device or the IoT device is accommodated in the system 1. The filter coefficient with the gentle band limitation may be a filter coefficient corresponding to a root-raised-cosine (RRC) filter. Further, the filter coefficient with the sharp band limitation may be a filter coefficient corresponding to a raised-cosine (RC) filter. Further, when the filter coefficient with the gentle band limitation is set, a larger subcarrier interval may be set than when the filter coefficient with the gentle band limitation is not set. From another point of view, the filter coefficient with the sharp band limitation has a smaller roll-off factor, and the filter coefficient with the gentler band limitation has a characteristic of having larger roll-off factor.

Further, the transmission device may set the large subcarrier interval for the reception device with the low signal processing capability such as the MTC device or the IoT device. Thus, it is possible to reduce influence of inter-subsymbol interference and inter-subcarrier interference, and it is possible to reduce the load of the interference cancellation process in the reception device.

As described above, the transmission device can set the parameters in accordance with the performance or the request of the reception device. Thus, the transmission device can deal with various data rates, delay amounts, signal processing complexity, or the like.

Next, the conditions of parameters corresponding to the type of the information (for example, application) carried by the target signal will be described. An example of the conditions is shown in the following table.

TABLE 4

| | About QoS | | | | | About parameter | |
|---|---|---|---|---|---|---|---|
| QCI | Resource Type | Priority | Packet Delay Budget | Packet Error Loss Rate | Example Services | Example of subsymbol length | Example of subcarrier interval |
| 1 | Guaranteed Bit Rate | 2 | 100 msec | 10^-2 | VoIP Call | $T_{SS,1}$ | $\Delta F_{SC,1}$ |
| 2 | | 4 | 150 msec | 10^-3 | Video Call | $T_{SS,2}$ | $\Delta F_{SC,2}$ |
| 3 | | 3 | 50 msec | | Online Gaming (Real Time) | $T_{SS,3}$ | $\Delta F_{SC,3}$ |
| 4 | | 5 | 300 msec | 10^-6 | Video Streaming | $T_{SS,4}$ | $\Delta F_{SC,4}$ |
| 5 | Non- | 1 | 100 msec | | IMS Signaling | $T_{SS,5}$ | $\Delta F_{SC,5}$ |

TABLE 4-continued

| | | About QoS | | | | About parameter | |
|---|---|---|---|---|---|---|---|
| QCI | Resource Type | Priority | Packet Delay Budget | Packet Error Loss Rate | Example Services | Example of subsymbol length | Example of subcarrier interval |
| 6 | Guaranteed Bit Rate | 6 | 300 msec | | Video, TCP Based Services (e.g. Email, Chat, FTP, etc.) | $T_{SS,6}$ | $\Delta F_{SC,6}$ |
| 7 | | 7 | 100 msec | $10^{-3}$ | Voice, Video, Interactive Gaming | $T_{SS,7}$ | $\Delta F_{SC,7}$ |
| 8 | | 8 | 300 msec | $10^{-6}$ | Video, TCP Based Services (e.g. Email, Chat, FTP, etc.) | $T_{SS,8}$ | $\Delta F_{SC,8}$ |
| 9 | | 9 | | | | $T_{SS,9}$ | $\Delta F_{SC,9}$ |

In the above table, an example of conditions of corresponding applications (that is, services) and corresponding parameters of each QOS class identifier (QCI) obtained by classifying a quality of service (QoS) is shown. For example, the transmission device (for example, the setting unit 151) may set at least one of the subsymbol length and the subcarrier interval in accordance with the processing capacity of the reception device and the application type (for example, the QCI) with reference to the above table.

A setting example based on delay tolerance (Packet Delay Budget in the above table) will be described as an example of the setting method. For example, the transmission device may set the subsymbol length such that the subsymbol length decreases as the delay tolerance decreases. Further, the transmission device may set the subcarrier interval such that the subcarrier interval increases as the delay tolerance decreases. This is because as the delay tolerance decreases, a shorter delay time is required, and it is desirable that reception and the reception device side perform demodulation promptly in order. Thus, the transmission device can set the subsymbol length and the subcarrier interval so that a relation of the following Formula is satisfied.

[Math. 23]

$$T_{SS,3} \leq T_{SS,1} = T_{SS,5} = T_{SS,7} \leq T_{SS,2} \leq T_{SS,4} = T_{SS,6} = T_{SS,8} = T_{SS,9},$$

$$\Delta F_{SC,9} = \Delta F_{SC,8} = \Delta F_{SC,6} = \Delta F_{SC,4} \leq \Delta F_{SC,2} \leq \Delta F_{SC,7} \leq \Delta F_{SC,5} = \Delta F_{SC,1} \leq \Delta F_{SC,3} \quad (23)$$

As another example of the setting method, a setting example based on a priority (Priority in the above table) will be described. For example, the transmission device may set the subsymbol length such that as the priority increases, the subsymbol length decreases. For example, the transmission device may set the subcarrier interval such that as the priority increases, the subcarrier interval increases. Thus, the transmission device can set the subsymbol length and the subcarrier interval so that a relation of the following Formula is satisfied.

[Math. 24]

$$T_{SS,5} \leq T_{SS,1} = T_{SS,3} = T_{SS,2} \leq T_{SS,4} \leq T_{SS,6} \leq T_{SS,7} \leq T_{SS,8} \leq T_{SS,9},$$

$$\Delta F_{SC,9} \leq \Delta F_{SC,8} \leq \Delta F_{SC,7} \leq \Delta F_{SC,6} \leq \Delta F_{SC,4} \leq \Delta F_{SC,2} \leq \Delta F_{SC,3} \leq \Delta F_{SC,1} \leq \Delta F_{SC,5} \quad (24)$$

Further, the transmission device may set the parameters in accordance with a moving speed of the reception device. The conditions of the parameters corresponding to the moving speed of the reception device will be described below. An example of the conditions is shown in the following table. The transmission device (for example, the setting unit 151) may set at least one of the subsymbol length and the subcarrier interval in accordance with the moving speed of the reception device with reference to the above table.

TABLE 5

| Mobility category index | Moving speed of device (e.g., km/h) | Examples of subsymbol length | Examples of subcarrier interval |
|---|---|---|---|
| 0 | $v_0 \leq v < v_1$ | $T_{SS,0}$ | $\Delta F_{SC,0}$ |
| 1 | $v_1 \leq v < v_2$ | $T_{SS,1}$ | $\Delta F_{SC,1}$ |
| 2 | $v_2 \leq v < v_3$ | $T_{SS,2}$ | $\Delta F_{SC,1}$ |
| 3 | $v_3 \leq v < v_4$ | $T_{SS,3}$ | $\Delta F_{SC,1}$ |
| ... | ... | ... | ... |

In the above table, a mobility category index, the moving speed, an example of the subsymbol length, and an example of the subcarrier interval are associated with one another. In the table above, as the mobility category index increases, the moving speed increases.

In GFDM, the subcarrier interference is considered to occur due to the Doppler effect and the Doppler spread caused by movement. For this reason, the transmission device sets the subsymbol length and the subcarrier interval corresponding to the moving speed or the mobility category index. As a result, it is possible to prevent degradation in transmission quality. Specifically, the transmission device can set the subsymbol length and the subcarrier interval so that a relation the following Formula is satisfied.

[Math. 25]

$$T_{SS,3} \geq T_{SS,2} \geq T_{SS,1} \geq T_{SS,0}$$

$$\Delta F_{SC,0} \leq \Delta F_{SC,1} \leq \Delta F_{SC,2} \leq \Delta F_{SC,3} \quad (25)$$

In other words, it is desirable that as the moving speed increases, the subcarrier interval is increased relatively, or the subsymbol length is decreased relatively.

(3.3) Setting of Number of Subcarriers and Number of Subsymbols

The transmission device (for example, the setting unit 151) variably sets the subcarrier interval and the subsymbol length. In other words, the transmission device can variably set the number of subcarriers and the number of subsymbols. The transmission device may set the parameters so that a predetermined relation is established between the number of subcarriers and the number of subsymbols in order to further improve the stability of the operation.

For example, the transmission device may be set so that at least one of the number of subcarriers and the number of subsymbols is an odd number. Through this setting, the stability of the equalization process in the reception device can be improved.

As a method of counting the number of subsymbols here, it is desirable to count the number of subsymbols per GFDM symbol in the system 1. Further, as the method of counting the number of subcarriers here, it is desirable to count the number of subcarriers in a total bandwidth of the system 1. However, when a unit of a predetermined frequency bandwidth such as a resource block is introduced, the number of subcarriers per resource block may be counted as the method of counting the number of subcarriers.

Further, as the method of counting the number of subcarriers and the number of subsymbols, it is desirable to count subcarriers and subsymbols on which information is actually carried. In other words, it is desirable to exclude a subcarrier that is present on the system but does not actually carry information such as a null subcarrier from a counting target.

On the basis of the above-described methods, a relation between the number of subcarriers and the number of subsymbols is summarized in the following table. Parameters whose stability is "OK" indicate a setting in which the operation of the reception device is stable (that is, a desirable system configuration). Hatched parameters whose stability is "NG" in the table indicate a setting in which the operation of the reception device is unstable (that is, an undesirable system configuration).

TABLE 6

| Number of subcarriers (per resource block) | Number of subsymbols (per GFDM symbol) | Number of subcarriers on which information is actually carried (per resource block) | Number of subsymbols on which information is actually carried (per GFDM symbol) | Stability (desired system configuration) |
|---|---|---|---|---|
| even number | even number | even number | even number | NG |
| even number | even number | even number | odd number | OK |
| even number | even number | odd number | even number | OK |
| even number | even number | odd number | odd number | OK |
| even number | odd number | even number | even number | NG |
| even number | odd number | even number | odd number | OK |
| even number | odd number | odd number | even number | OK |
| even number | odd number | odd number | odd number | OK |
| odd number | even number | even number | even number | NG |
| odd number | even number | even number | odd number | OK |
| odd number | even number | odd number | even number | OK |
| odd number | even number | odd number | odd number | OK |
| odd number | odd number | even number | even number | NG |
| odd number | odd number | even number | odd number | OK |
| odd number | odd number | odd number | even number | OK |
| odd number | odd number | odd number | odd number | OK |

(3.4) Setting of Filter Coefficient
(Transmission Device Side)

As described above, the transmission device (for example, the transmission processing unit 153) performs filtering for each subcarrier. The type of filter may be the same irrespective of the subcarrier interval or may differ in accordance with the subcarrier interval.

For example, the transmission device may select a filter in accordance with the subcarrier interval. Thus, the transmission device can control the influence of inter-subsymbol interference and inter-subcarrier interference. Specifically, the transmission device may apply a filter in which a filter coefficient with a sharper band limitation as the subcarrier interval decreases is set and apply a filter in which a filter coefficient with a gentler band limitation as the subcarrier interval decreases is set. As a result, the load of the interference cancellation process in the corresponding reception device can be reduced. In addition to the filter, the transmission device may set a roll-off coefficient of the filter in accordance with the subcarrier interval.

Figure 16:
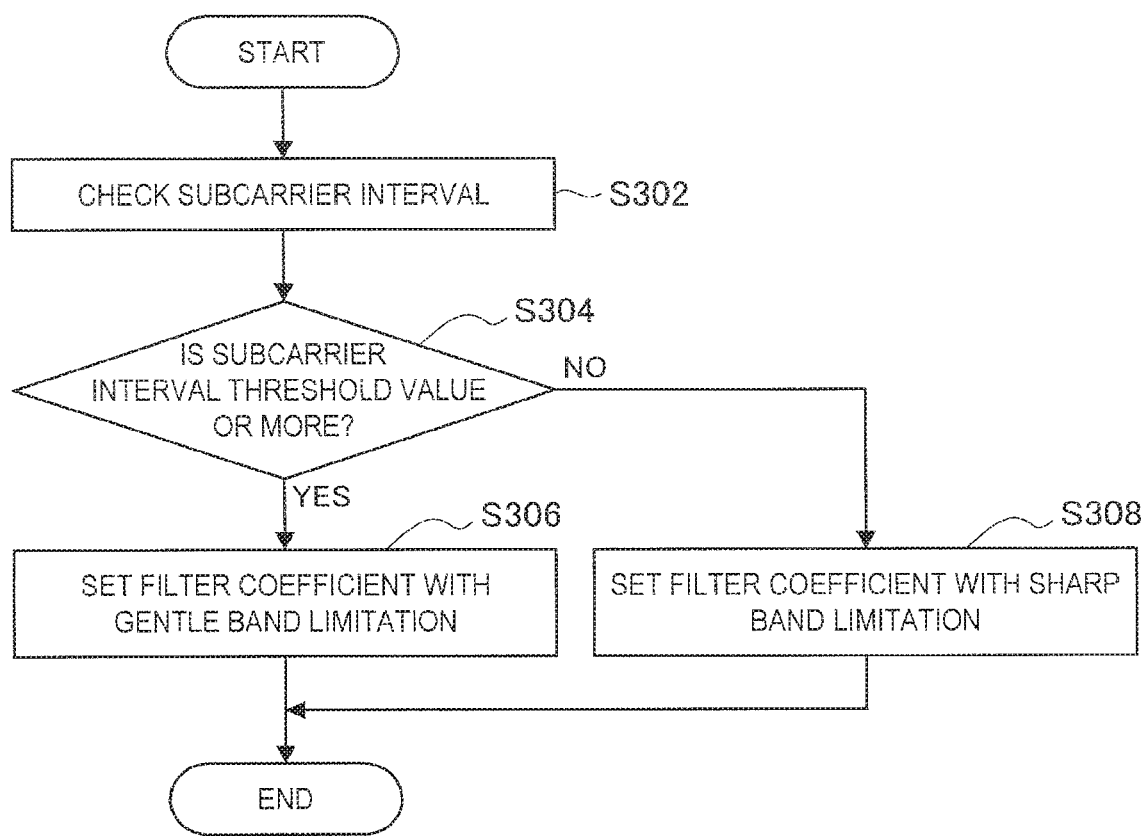
FIG. 16 is an explanatory diagram for describing technical features of a system according to the embodiment.

FIG. 16 is a flowchart illustrating an example of the flow of the filter coefficient setting process performed in the transmission device according to the present embodiment.

As illustrated in FIG. 16, first, the transmission device sets the subcarrier interval (step S302). For example, as described above with reference to FIG. 15, the transmission device may set the subcarrier interval in accordance with the type of reception device and the type of information carried by the signal.

Then, the transmission device determines whether or not the subcarrier interval is a determined to be threshold value or more (step S304). When the subcarrier interval is a threshold value or more (YES in step S304), the transmission device sets the filter coefficient with the gentle band limitation (step S306). Specifically, the transmission device may set the filter coefficient corresponding to the RRC filter. On the other hand, when the subcarrier interval is determined to be less than a threshold value (NO in step S304), the transmission device sets the filter coefficient with the sharp band limitation (step S308). Specifically, the transmission device may set the filter coefficient corresponding to the RC filter.

Then, the process ends.
(Reception Device Side)

As described above, the transmission device variably sets the subcarrier interval and the subsymbol length. For this reason, the reception device (for example, the reception processing unit 241) performs the reception process in accordance with the parameters set in the transmission device.

For example, the reception device may switch whether or not the interference cancellation function is enabled or disabled in accordance with the subcarrier interval. An example of this process will be described in detail with reference to FIG. 17.

Figure 17:
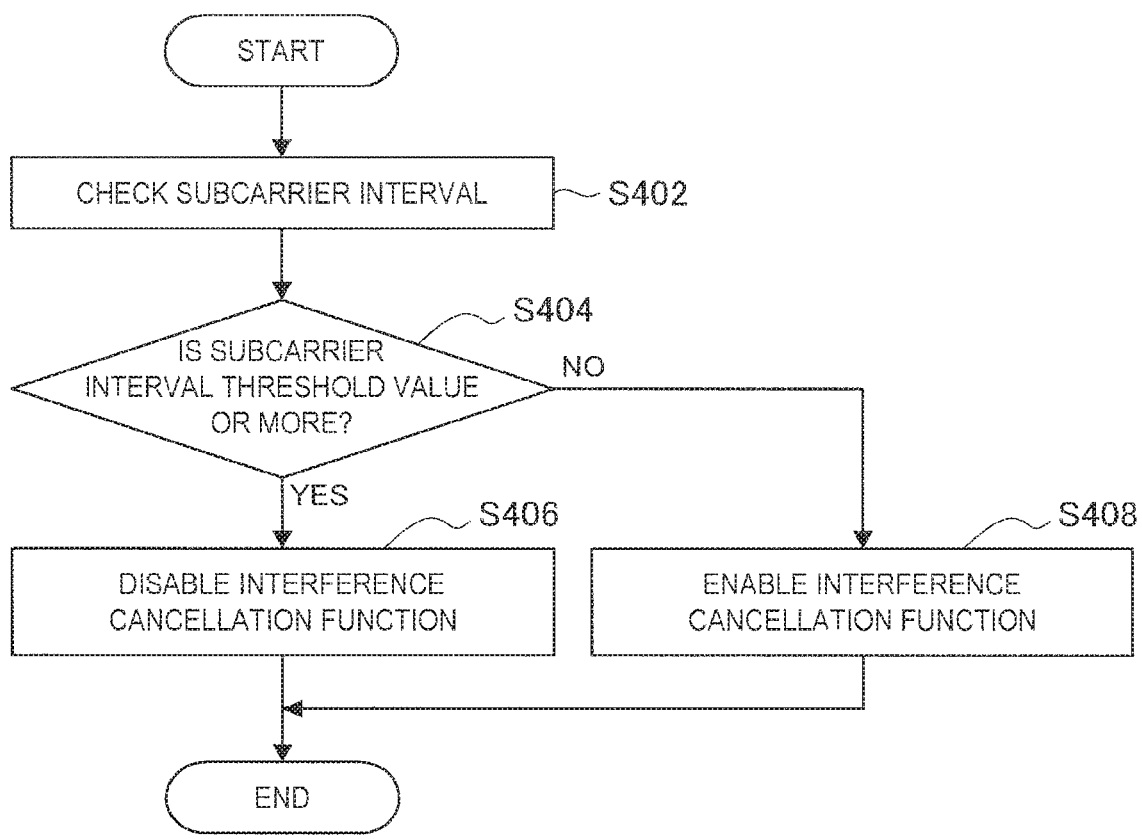
FIG. 17 is an explanatory diagram for describing technical features of a system according to the embodiment.

FIG. 17 is a flowchart illustrating an example of the flow of a process of switching the interference cancellation function performed in the reception device according to the present embodiment.

As illustrated in FIG. 17, first, the reception device checks the subcarrier interval (step S402). For example, the reception device acquires information indicating the subcarrier interval from system information or control information.

Then, the reception device determines whether or not the subcarrier interval is a threshold value or more (step S404). When the subcarrier interval is determined to be a threshold value or more (YES in step S404), the reception device disables the interference cancellation function (step S406). Here, as a reception method when the interference cancellation function is disabled, for example, a matched filter may be employed. This is because the band limitation by the filter is gentle, and the influence of inter-subsymbol interference and inter-subcarrier interference is suppressed. On the other hand, when the subcarrier interval is determined to be less than a threshold value (NO in step S404), the reception device enables the interference cancellation function (step S408). Here, as a reception method when the interference cancellation function is enabled, Zero-Forcing (ZF), minimum mean squared error (MMSE), successive interference cancellation (SIC), parallel interference cancellation (PIC), iterative interference cancellation (iterative cancellation), or turbo interference cancellation (turbo cancellation) may be employed.

Then, the process ends.

(Filter Coefficient)

Next, the filter coefficient corresponding to the subcarrier interval will be described in further detail with reference to FIGS. 18 and 19.

Figure 18:
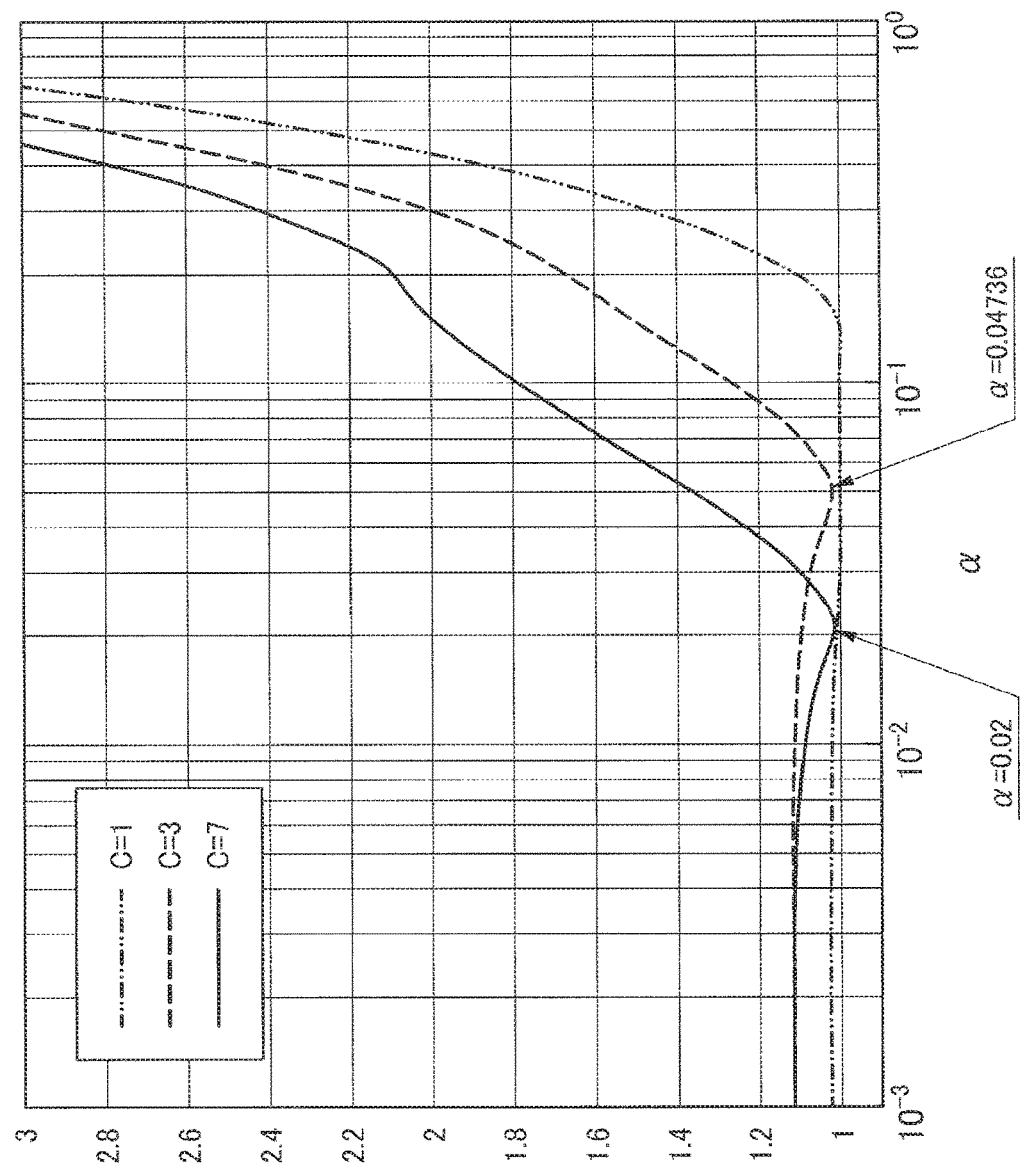
FIG. 18 is an explanatory diagram for describing technical features of a system according to the embodiment.

FIG. 18 is a diagram for describing the filter coefficient corresponding to the subcarrier interval according to the present embodiment. FIG. 18 illustrates a graph in which a horizontal axis indicates the roll-off factor, and a vertical axis indicates a condition number of an equivalent channel matrix of GFDM. A difference in line type corresponds to a difference in the subcarrier interval. C=1 corresponds to a subcarrier interval in OFDM of the related art, C=3 corresponds to a subcarrier interval which is three times the subcarrier interval in OFDM of the related art, and C=7 corresponds to a subcarrier interval which is 7 times the subcarrier interval in OFDM of the related art.

The reception device basically decodes signals through a process of correcting the equivalent channel matrix of GFDM (for example, equalization by an inverse matrix, zero forcing, a least square error technique, or the like). As the condition number of the equivalent channel matrix decreases, the accuracy of the inverse matrix increases, and thus degradation in performance of the reception process can be also expected to be prevented. In other words, a filter coefficient in which the condition number is minimum is an optimum filter coefficient. Referring to FIG. 18, the optimum roll-off factor in which the condition number is minimum differs in accordance with the subcarrier interval and has a value that decreases as the subcarrier interval increases. For example, in the case of C=1 in which the subcarrier interval is smallest in FIG. 18, the optimum roll-off factor is around 0.1. In the case of C=3 in which the subcarrier interval is intermediate in FIG. 18, the optimum roll-off factor is 0.04736. In the case of C=7 in which the subcarrier interval is largest in FIG. 18, the optimum roll-off factor is 0.02. Therefore, it is desirable to employ the roll-off factor that decreases as the subcarrier interval increases.

In addition to the condition number of the equivalent channel matrix, the accuracy of the inverse matrix can be expected to increase as a rank number of the equivalent channel matrix increases (is closer to a full rank).

Figure 19:
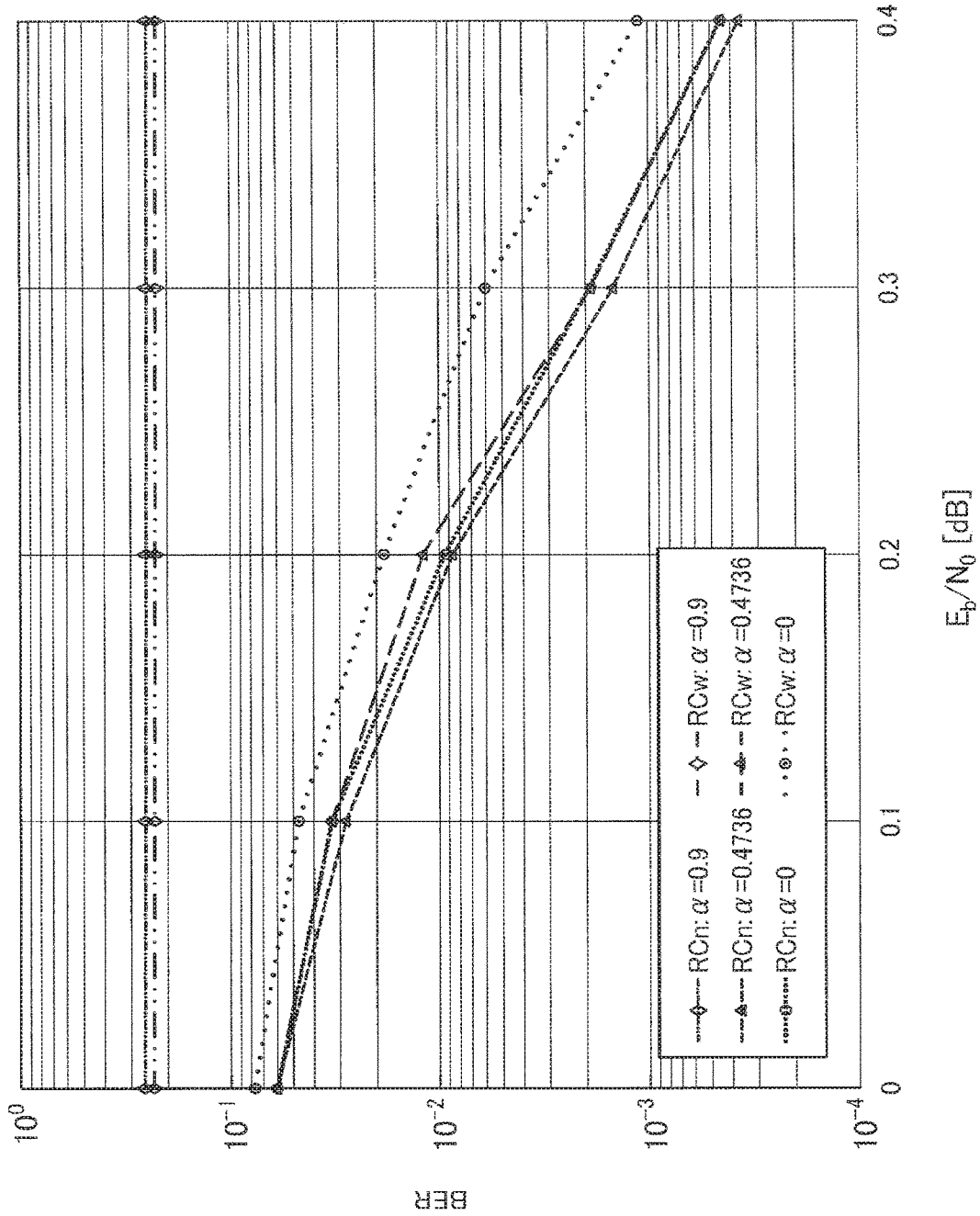
FIG. 19 is an explanatory diagram for describing technical features of a system according to the embodiment.

FIG. 19 is a diagram for describing the filter coefficient corresponding to the subcarrier interval according to the present embodiment. FIG. 19 illustrates a simulation result of a bit error rate (BER) characteristic with respect to Eb/N0 using the roll-off factor as a parameter. In FIG. 19, the BER (RCn, C=1) of a signal of the subcarrier interval serving as a reference and the BER (RCw, C=3) of a signal of the subcarrier interval which is three times the reference are plotted. Further, for a roll-off factor α, 0.9, 0.04736 (an optimum value of the roll-off factor in the case of C=3 in FIG. 18) and 0 are plotted. The zero forcing may be employed as the reception method. As illustrated in FIG. 19, when the case in which the roll-off factor is 0 for RCw is compared with the case where the roll-off factor is 0.4736 which is the optimum value, the improvement effect of the BER by optimization of the roll-off factor is confirmed. In other words, it is confirmed that optimization of the roll-off factor leads to not only optimization of the condition number of the equivalent channel matrix illustrated in FIG. 18 but also improvement in terms of the reception performance (BER characteristics).

In the GFDM system, the subcarrier interval and the filter coefficient may be set as continuous values or may be set as a plurality of discrete values. If it is considered that the setting of the subcarrier interval and the filter coefficient is exchanged as the control information between the transmission device and the reception device, that the latter case is suitable for reducing the overhead of the control information. On the other hand, in the former case, it is possible to perform an optimum setting finely in accordance with a radio wave propagation environment, a type of data to be transmitted and received, or a type of service.

The transmission device (for example, the transmission processing unit 153) includes information indicating setting content of the subcarrier interval and the filter coefficient in the control information and transmits the resulting control information to the reception device. Here, when the subcarrier interval and the filter coefficient are set as a plurality of discrete values, for example, a combination of an index and set values of the subcarrier interval and the filter coefficient indicated by the index is recognized in common between the devices in the system 1 in advance. Then, the transmission device includes the index corresponding to the set subcarrier interval and the filter coefficient in the control information, and notifies the reception device of the set value. An example of the combination of the index and the set values indicated by the regarding the subcarrier interval and the filter coefficient is illustrated in the following Table 7.

In the following Table 7, the subcarrier interval and the roll-off factor are defined for each index of the subcarrier interval. It is also possible to interpret the roll-off factor as being linked with the subcarrier interval.

TABLE 7

| Subcarrier Spacing Index | Subcarrier Spacing | Roll-off Factor | Remarks |
|---|---|---|---|
| 0 | Δf0 (<=Δf1) | α0 (>=α1) | minimum value of subcarrier interval may be used as reference (default) of subcarrier interval of entire system |
| 1 | Δf1 (<=Δf2) | α1 (>=α2) | |
| 2 | Δf2 (<=Δf3) | α2 (>=α3) | |
| 3 | Δf3 (<=Δf4) | α3 (>=α4) | |
| ... | ... | ... | |

A notification of a set value other than the subcarrier interval and the filter coefficient may also be given using an index in a similar manner to that described above. Other examples of the combination of the index and the set values indicated by the index are illustrated in the following Tables 8 to 12.

In the following Table 8, the number of subcarriers (for example, the number of subcarriers per resource block) and the roll-off factor are defined for each index of the subcarrier interval.

TABLE 8

| Subcarrier Spacing Index | Number of Subcarriers (per Resource Block) | Roll-off Factor | Remarks |
|---|---|---|---|
| 0 | Nsc0 (>=Nsc1) | α0 (>=α1) | number of subcarriers when subcarrier interval is minimum may be used as reference (or default) of number of subcarriers of entire system |
| 1 | Nsc1 (>=Nsc2) | α1 (>=α2) | |
| 2 | Nsc2 (>=Nsc3) | α2 (>=α3) | |
| 3 | Nsc3 (>=Nsc4) | α3 (>=α4) | |
| ... | ... | ... | |

In the following Table 9, the subsymbol length and the roll-off factor are defined for each index of the subsymbol length.

TABLE 9

| Subsymbol Length Index | Subsymbol Length | Roll-off Factor | Remarks |
|---|---|---|---|
| 0 | Tss0 (>=Tss1) | α0 (>=α1) | subsymbol length when subcarrier interval is minimum may be used as reference (or default) of subsymbol length of entire system |
| 1 | Tss1 (>=Tss2) | α1 (>=α2) | |
| 2 | Tss2 (>=Tss3) | α2 (>=α3) | |
| 3 | Tss3 (>=Tss4) | α3 (>=α4) | |
| ... | ... | ... | |

In the following Table 10, the number of subsymbols (for example, the number of subcarriers per GFDM symbol) and the roll-off factor are defined for each index of the subsymbol length.

TABLE 10

| Subsymbol Length Index | Number of Subsymbols (per GFDM Symbol) | Roll-off Factor | Remarks |
|---|---|---|---|
| 0 | Nss0 (<=Nss1) | α0 (>=α1) | number of subsymbols when subcarrier interval is minimum may be used as reference (default) of number of subsymbols of entire system |
| 1 | Nss1 (<=Nss2) | α1 (>=α2) | |
| 2 | Nss2 (<=Nss3) | α2 (>=α3) | |
| 3 | Nss3 (<=Nss4) | α3 (>=α4) | |
| ... | ... | ... | |

In the following Table 11, TTI and a ratio of TTI to a GFDM symbol length are defined for each TTI index.

TABLE 11

| TTI Index | TTI | Ratio of TTI to GFDM Symbol Length | Remarks |
|---|---|---|---|
| 0 | TTI0 (>=TTI1) | δ0 (>=δ1) | TTI is directly designated or indirectly designated as ratio to GFDM symbol length |
| 1 | TTI1 (>=TTI2) | δ1 (>=δ2) | |
| 2 | TTI2 (>=TTI3) | δ2 (>=δ3) | |
| 3 | TTI3 (>=TTI4) | δ3 (>=δ4) | |
| ... | ... | ... | |

In the following Table 12, a CP length and a ratio of a CP length to a GFDM symbol length are defined for each index of CP length.

TABLE 12

| CP Length Index | CP Length | Ratio of CP Length to GFDM Symbol Length | Remarks |
|---|---|---|---|
| 0 | Tcp0 (>=Tcp1) | τ0 (>=τ1) | CP length is directly designated or indirectly designated as ratio to GFDM symbol length |
| 1 | Tcp1 (>=Tcp2) | τ1 (>=τ2) | |
| 2 | Tcp2 (>=Tss3) | τ2 (>=τ3) | |
| 3 | Tcp3 (>=Tss4) | τ3 (>=τ4) | |
| ... | ... | ... | |

(3.5) Over-Sampling Parameter Setting

The over-sampling parameters may be set in accordance with the transmission process.

For example, for the first transmission device illustrated in FIGS. 9 to 11, it is desirable that the sampling rate $N_{SR,r,g}$ is a total number of subcarriers or more. Further, when the subsymbol length and the subcarrier interval are variable, the actual number of subcarriers may be set as the total number of subcarriers (that is, a guard interval may not be considered). Alternatively, the number of subcarriers when a minimum value that can be used in the system 1 is used as all the subcarrier intervals (that is, a maximum of the total number of subcarriers that can be used in the system 1) may be set as the total number of subcarriers. Further, when multiplexing of subcarriers is performed through the IDFT or the IFFT, the IDFT size or IFFT size may be set in the over-sampling parameter $N_{SR,r,g}$.

For example, as the over-sampling parameter for the second transmission device illustrated in FIG. 12, a smaller value than that in the case of the first transmission device may be set. For example, when a transmission filter coefficient corresponding to the RC filter or the RRC filter is employed, it is enough if the number of over-samplings is at most two. Of course, even in this case, the number over-samplings may be 2 or more.

(3.6) Non-Use Frequency Domain

Difference between Allocation Bandwidth and Use Bandwidth

The transmission device (for example, the setting unit 151) sets a non-use frequency domain (that is, bandwidth) in unit resources configured with one or more subcarriers or one or more subsymbols, and variably sets at least one of the subcarrier interval and the subsymbol length in the other usable frequency domains. The transmission device (for example, the transmission processing unit 153) transmits signals using the use frequency domain (that is, bandwidth). The bandwidth of the unit resource is also referred to as an "allocation bandwidth." Further, a bandwidth which is actually used excluding the non-use frequency domain from the allocation bandwidth is also referred to as a "use bandwidth." Through the setting of the non-use frequency domain, it is possible to simplify the transmission and reception process as will be described below. Here, the frequency resources of the unit resources are typically resource blocks. Besides, here, the unit resources may be an arbitrary frequency channel such as a subband or a component carrier.

The transmission device switches whether or not the non-use frequency domain is set in accordance with whether or not the subcarrier intervals or the subsymbol time lengths are the same in a plurality of unit resources on the same time resources. Specifically, the transmission device sets the non-use frequency domain when the subcarrier intervals or the subsymbol time lengths are different in a plurality of unit resources on the same time resources. Thus, it is possible to reduce inter-unit resource interference in a situation in which orthogonality between the unit resources (more accurately, between the subcarriers) collapses. Conversely, the transmission device does not set the non-use frequency domain when the subcarrier intervals or the subsymbol time lengths are the same in a plurality of unit resources on the same time resources. Thus, it is possible to use the frequency resources without waste in the situation where orthogonality between the unit resources is held. Here, a plurality of unit resources may refer to unit resources included in one frequency channel (for example, a component carrier or the like) or may indicate unit resources included in a plurality of frequency channels. Further, bandwidths of the unit resources are assumed to be the same on the same time resources.

Hereinafter, a definition of the subcarrier interval will be described with reference to FIG. 20.

Figure 20:
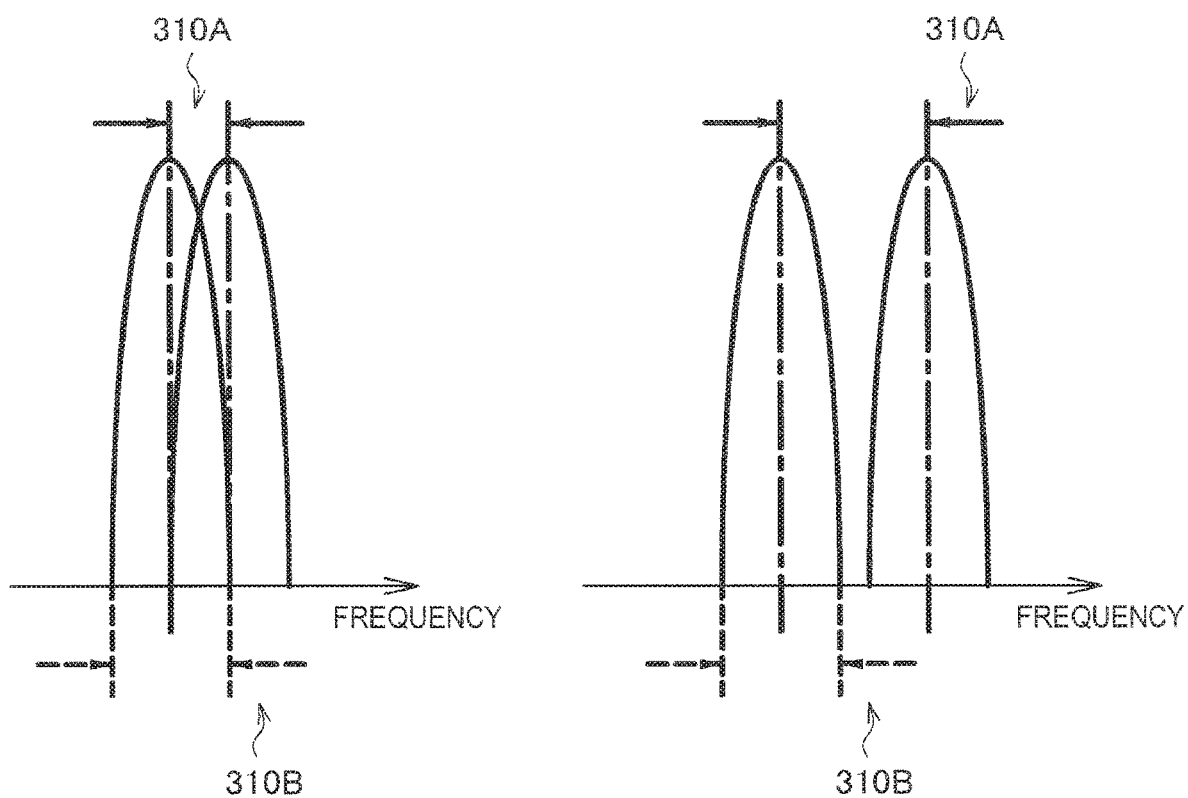
FIG. 20 is an explanatory diagram for describing technical features of a system according to the embodiment.

FIG. 20 is a diagram for describing the definition of the subcarrier interval. A left drawing illustrates an example in which neighboring subcarriers overlap, and a right drawing illustrates an example in which neighboring subcarriers do not overlap. A plurality of definitions can be given to the subcarrier, and three definitions will be described here.

A first definition is a definition in which the subcarrier interval is an interval of frequencies indicating specific positions of neighboring subcarriers. For example, an interval indicated by reference numeral 310A in FIG. 20 is the subcarrier interval. With reference to the reference numeral 310A, the subcarrier interval is an interval between peak positions of the subcarriers but is not necessarily required to be the interval between peak positions. For example, the subcarrier interval may be an interval between 3 dB frequencies on the lower sides of the subcarriers, an interval between 3 dB frequencies on the upper sides of the subcarriers, an interval between (n-th) zero-cross frequencies on the lower sides, an interval between (n-th) zero-cross frequencies on the upper sides, or the like.

A second definition is a definition in which the subcarrier interval is an interval of frequencies of specific positions of the subcarriers. For example, an interval indicated by reference numeral 310B in FIG. 20 is the subcarrier interval. Specific positions may be an interval of 3 dB frequencies on the lower side and the upper side of one subcarrier, an interval between (n-th) zero-cross frequencies on the lower side and the upper side, or the like.

A third definition is a definition in which the subcarrier interval is a reciprocal of the symbol length or the subsymbol length. Here, it is desirable that the length of the CP is not included in the symbol length or the subsymbol length used for a calculation of the reciprocal.

The definitions of the subcarrier interval have been described above. Next, an example of setting the allocation bandwidth and the use bandwidth will be described with reference to FIG. 21.

Figure 21:
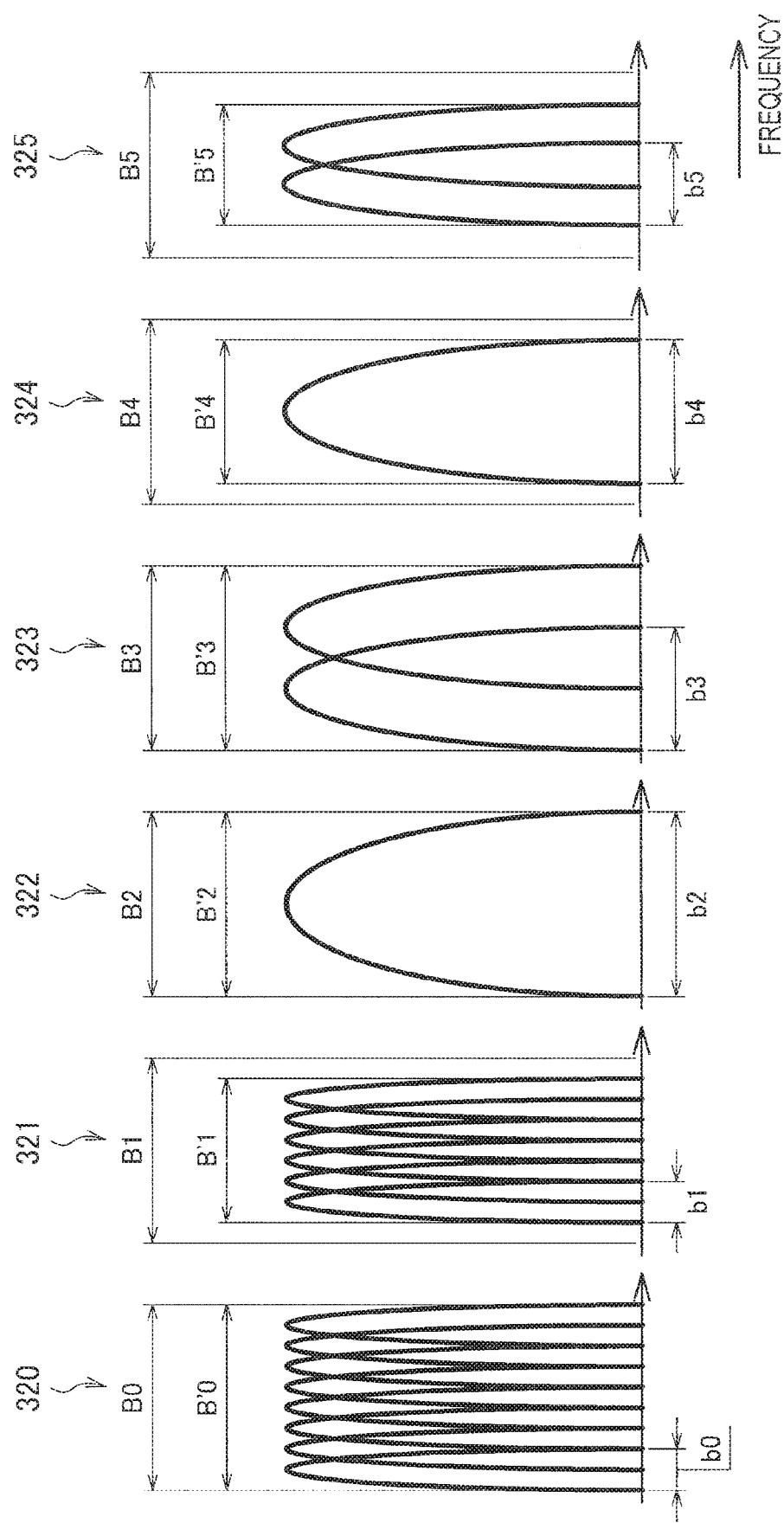
FIG. 21 is an explanatory diagram for describing technical features of a system according to the embodiment.

FIG. 21 is a diagram illustrating an example of setting the allocation bandwidth and the use bandwidth according to the present embodiment. In FIG. 21, six examples of setting the allocation bandwidth and the use bandwidth are indicated by reference numerals 320 to 325. Bk indicates the allocation bandwidth, B'k indicates the use bandwidth, and bk indicates the subcarrier interval or a bandwidth of one subcarrier. k is an integer indicating an index of an example.

In FIG. 21, b0 is set as a reference subcarrier interval. Further, b0 is assumed to be a minimum subcarrier interval that can be set in the system 1. In FIG. 21, a side lobe part of a frequency component of the subcarrier is omitted, but, in fact, there may be side lobes. Further, in FIG. 21, the side lobe part is not included in the bandwidth of the subcarrier. Here, the subcarriers are assumed to be non-orthogonal, but may be orthogonal.

The following Table 13 shows various set values in the respective settings indicated by reference numerals 320 to 325 in FIG. 21. Nk in the table indicates the number of subcarriers in the allocated bandwidth. The use bandwidth is calculated by B'k=bk×Nk as a value obtained by multiplying the subcarrier interval by the number of subcarriers.

TABLE 13

| Reference numerals in FIG. 21 | allocation bandwidth [Hz] | subcarrier interval [Hz] | number of subcarriers in allocation bandwidth | use bandwidth [Hz] |
| --- | --- | --- | --- | --- |
| 320 | B0 | b0 | N0 >= 1 | B'0 == B0 |
| 321 | B1 == B0 | b1 == b0 | 1 <= N1 < N0 | B'1 <= B1 |
| 322 | B2 == B0 | b2 >= b0 | N2 == 1 < N0 | B'2 == B2 |
| 323 | B3 == B0 | b3 >= b0 | 1 <= N3 < N0 | B'3 == B3 |
| 324 | B4 == B0 | b4 >= b0 | N4 == 1 < N0 | B'4 <= B4 |
| 325 | B5 == B0 | b5 >= b0 | 1 <= N5 < N0 | B'5 <= B5 |

The cases indicated by reference numerals 320 to 325 will be described below in detail.

In the case indicated by reference numeral 320, the allocation bandwidth and the use bandwidth are the same, and the reference subcarrier interval is employed. This case relates to a method of using a band seen in the existing OFDMA or LTE. This case may be regarded as a reference or default setting of the system 1.

In the case indicated by reference numeral 321, the use bandwidth is narrower than the allocation bandwidth, and the reference subcarrier interval is employed. In the case indicated by reference numeral 321, since both ends of the allocation bandwidth are empty, it is possible to mitigate interference from the adjacent areas (for example, neighboring resource blocks).

As can be seen from a comparison of reference numerals 320 and 321, the system 1 may set the number of subcarriers (for example, N1) included in the unit resource in which a non-use domain is set to be the number of subcarriers (for example, N0) included in the unit resource in which a non-use domain is not set. As a result, the non-use frequency domain is set.

In the cases indicated by reference numerals 322 and 323, the allocation bandwidth and use bandwidth are the same, and a subcarrier interval larger than the reference subcarrier interval is employed. In the case indicated by reference numeral 322, unit resources are formed by one subcarrier, and in the case illustrated by reference numeral 323, unit resources are formed by two subcarriers. In the system 1, it is possible to simultaneously accommodate subcarriers of different subcarrier intervals in the CC, and these cases are cases that occur at this time.

In the case indicated by reference numeral 324, the use bandwidth is narrower than the allocation bandwidth, the unit resources are formed by one subcarrier, and a subcarrier interval larger than the reference subcarrier interval is employed. A subcarrier with an extended interval enables decoding with a simple reception algorithm and implements strong resistance with respect to the Doppler effect under the high-speed mobile environment. However, when the reception algorithm is simplified, it is desirable to pay attention to interference from a neighboring subcarrier (such as a subcarrier in a neighboring resource block). In this case, since both ends of the allocation bandwidth are empty, it is possible to mitigate interference from the adjacent areas, and it is possible to apply the simple reception algorithm.

In the case indicated by reference numeral 325, the use bandwidth is narrower than the allocation bandwidth, the unit resources are formed by two subcarriers, and a subcarrier interval wider than the reference subcarrier interval is employed. In this case, similarly to the case indicated by reference numeral 324, since both ends of the allocation bandwidth are empty, it is possible to mitigate interference from the adjacent areas, and it is possible to apply a simple reception algorithm. However, in this case, since the subcarriers overlap each other within the allocation bandwidth, it is desirable that the reception algorithm in which inter-subcarrier interference is considered be employed.

As can be seen from a comparison of reference numerals 322 and 324 and reference numerals 323 and 325, the system 1 may set the interval of the subcarrier (for example, b3 or b5) included in the unit resource in which a non-use domain is set to be an interval of the subcarrier (for example, b2 or b4) or less included in the unit resource in which the non-use domain is not set. As a result, the non-use frequency domain is set.

In the above, the cases indicated by reference numerals 320 to 325 have been described in detail. The system 1 can mixedly accommodate one or more cases in one frequency channel (for example, the CC) at the same time among the cases indicated by reference numerals 320 to 325.

The allocation bandwidth Bk is preferably an integer multiple of the minimum subcarrier interval b0 assumed in the system. In other words, Bk=n×b0 is desirable. However, n is a positive integer.

For a unit of the allocation bandwidth (for example, the resource block), when there are a plurality of subcarriers in one unit, it is desirable that the bandwidths of the subcarriers are equal. In other words, it is desirable that all values of Bk of the subcarriers arranged in the allocation bandwidth Bk are equal.

Arrangement of Subcarriers

An arrangement of subcarriers when there is a difference between the allocation bandwidth and the use bandwidth will be described in detail. It is desirable that the arrangement of subcarriers satisfy at least one of the following conditions.

A first condition is that the center of the allocation bandwidth Bk and the center of B'k are identical or substantially identical to each other.

A second condition is that empty (that is, the non-use frequency domain) is set at both ends of the allocation bandwidth Bk. In other words, the second condition is that only one side of the bandwidth Bk is not empty.

A third condition is that two empty bandwidths set at both ends of the allocation bandwidth Bk are set to be identical.

A fourth condition is that the empty bandwidths (including an empty area other than both ends) in the allocation bandwidth Bk are set to be identical.

A fifth condition is that when the number of subcarriers included in the allocation bandwidth Bk is odd, the center frequency of at least one of the subcarriers included in the allocation bandwidth Bk is identical or substantially identical to the center frequency of the allocation bandwidth Bk.

A sixth condition is that when the number of subcarriers included in the allocation bandwidth Bk is even, the center frequencies of all subcarriers included in allocation bandwidth Bk are neither identical nor substantially identical to the center frequency of allocation bandwidth Bk.

When the frequencies are substantially identical, it may mean that it is within an absolute allowable range or may mean that, for example, a deviation of several Hz to several tens of Hz is allowed. Also, when the frequencies are substantially identical, it may mean that it is within a relative allowable range or may mean that a deviation of several % or several tens of % with respect to the subcarrier interval is allowed.

The transmission device sets the arrangement of subcarriers so that at least one of the conditions is satisfied. An exemplary arrangement in that case will be described with reference to FIGS. 22 to 25.

Figure 22:
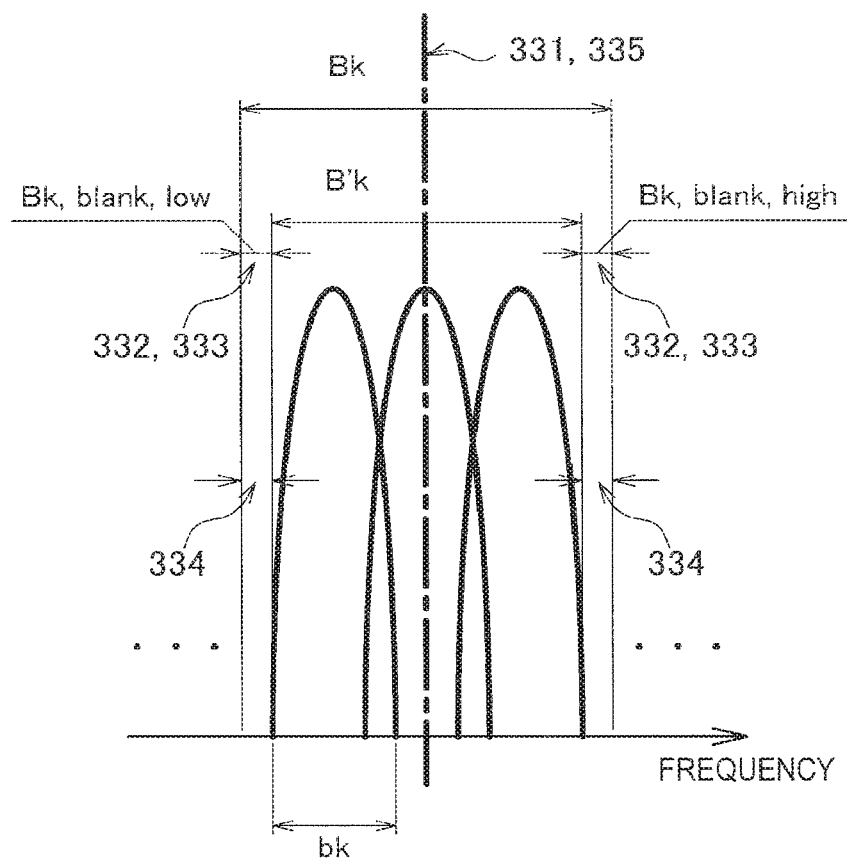
FIG. 22 is an explanatory diagram for describing technical features of a system according to the embodiment.

FIG. 22 is a diagram for describing an example of the arrangement of subcarriers according to the present embodiment. FIG. 22 illustrates an example arrangement of subcarriers in the case in which the use bandwidth is narrower than the allocation bandwidth, and the unit resources are formed by three subcarriers. As indicated by reference numeral 331, the first condition is satisfied. As indicated by reference numeral 332, the second condition is satisfied. As indicated by reference numeral 333, the third condition is satisfied. As indicated by reference numeral 334, the fourth condition is satisfied. As indicated by reference numeral 335, the fifth condition is satisfied.

Figure 23:
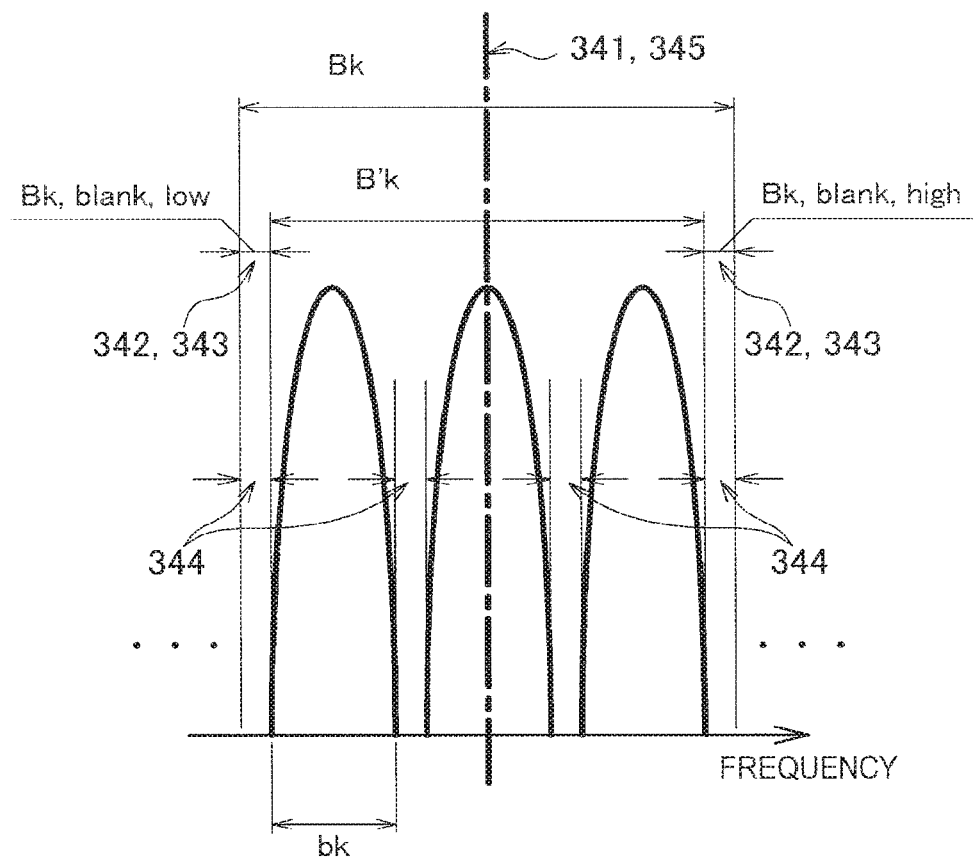
FIG. 23 is an explanatory diagram for describing technical features of a system according to the embodiment.

FIG. 23 is a diagram for describing an example of the arrangement of subcarriers according to the present embodiment. FIG. 23 illustrates an exemplary arrangement of subcarriers in the case in which the use bandwidth is narrower than allocation bandwidth, and the unit resources are formed by three subcarriers. As indicated by reference numeral 341, the first condition is satisfied. As indicated by reference numeral 342, the second condition is satisfied. As indicated by reference numeral 343, the third condition is satisfied. As indicated by reference numeral 344, the fourth condition is satisfied. As indicated by reference numeral 345, the fifth condition is satisfied.

Figure 24:
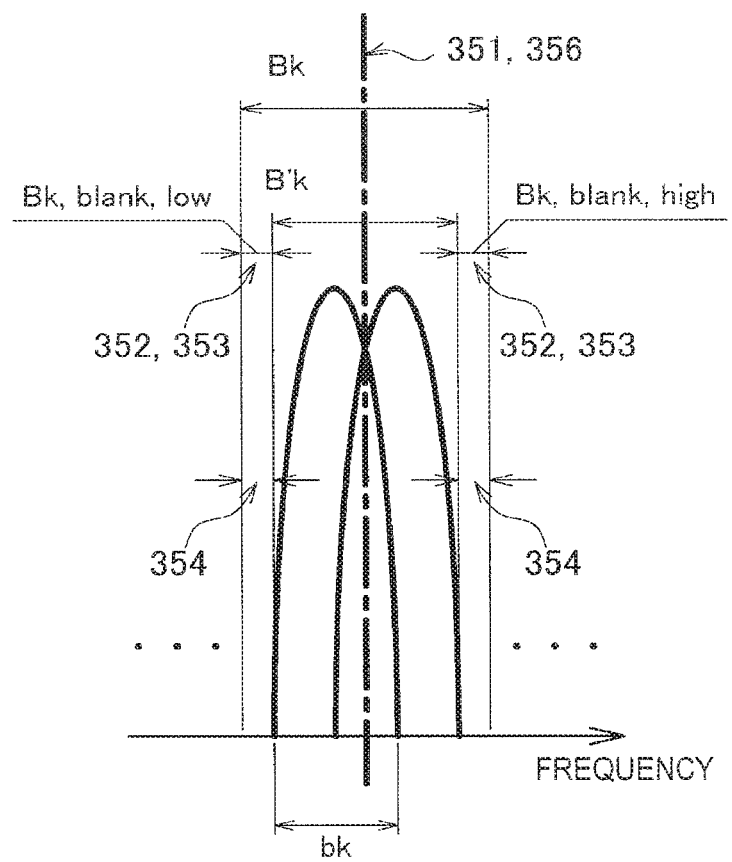
FIG. 24 is an explanatory diagram for describing technical features of a system according to the embodiment.

FIG. 24 is a diagram for describing an example of the arrangement of subcarriers according to the present embodiment. FIG. 24 illustrates an example arrangement of subcarriers in the case in which the use bandwidth is narrower than the allocation bandwidth, and the unit resources are formed by two subcarriers. As indicated by reference numeral 351, the first condition is satisfied. As indicated by reference numeral 352, the second condition is satisfied. As indicated by reference numeral 353, the third condition is satisfied. As indicated by reference numeral 354, the fourth condition is satisfied. As indicated by reference numeral 356, the sixth condition is satisfied.

Figure 25:
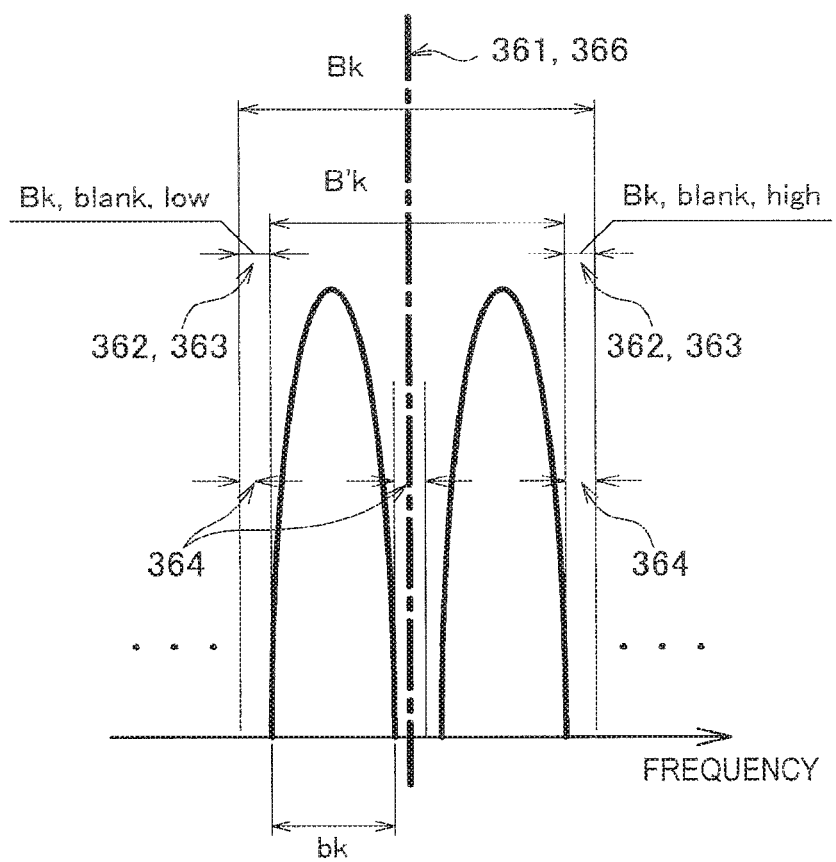
FIG. 25 is an explanatory diagram for describing technical features of a system according to the embodiment.

FIG. 25 is a diagram for describing an example of the arrangement of subcarriers according to the present embodiment. FIG. 25 illustrates an example arrangement of subcarriers in the case in which the use bandwidth is narrower than the allocation bandwidth, and the unit resources are formed by two subcarriers. As indicated by reference numeral 361, the first condition is satisfied. As indicated by reference numeral 362, the second condition is satisfied. As indicated by reference numeral 363, the third condition is satisfied. As indicated by reference numeral 364, the fourth condition is satisfied. As indicated by numeral 366, the sixth condition is satisfied.

The example arrangements of subcarriers have been described above.

In the cases indicated by reference numerals 321, 324, and 325 illustrated in FIG. 21, at least one of the above conditions is satisfied. However, even in the cases indicated by reference numerals 320, 322 and 323 illustrated in FIG. 21, at least one of the above conditions is satisfied when an empty bandwidth is considered to be zero. In other words, in all the cases illustrated in FIG. 21, the arrangement control is enabled on the basis of the above conditions.

The system 1 can cause influence of interference applied to the subcarrier to be uniform by performing an arrangement in which at least one of the above conditions is satisfied. Here, the interference means interference which a subcarrier in a certain allocation bandwidth receives from a subcarrier of another bandwidth and interference which a subcarrier in a certain allocation bandwidth receives from another subcarrier in the same bandwidth.

Next, the flow of the processing related to the setting of the non-use frequency domain will be described with reference to FIG. 26.

Figure 26:
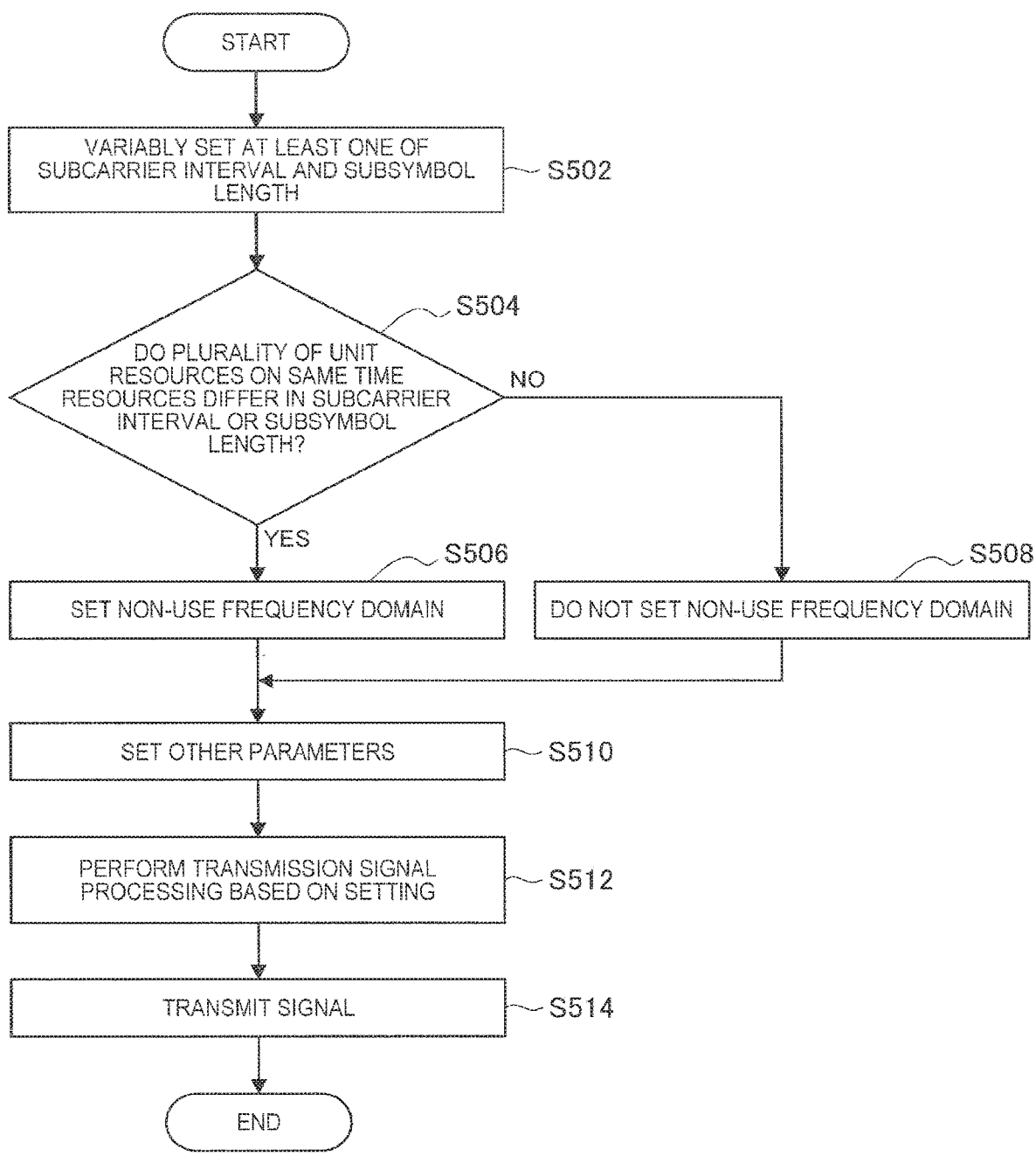
FIG. 26 is an explanatory diagram for describing technical features of a system according to the embodiment.

FIG. 26 is a flowchart illustrating an example of the flow of the process of setting the non-use frequency domain according to the present embodiment. As illustrated in FIG. 26, the transmission device (for example, the setting unit 151) first variably sets at least one of the subcarrier interval and the subsymbol length (step S502). Then, the transmission device (for example, the setting unit 151) determines whether or not the subcarrier interval or the subsymbol length differs in a plurality of unit resources on the same time resources (step S504). Then, the transmission device (for example, the setting unit 151) sets the non-use frequency domain (step S506) when the subcarrier interval or the subsymbol length differs in a plurality of unit resources on the same time resources, and does not set the non-use frequency domain (step S508) when the subcarrier interval or the subsymbol length is the same in a plurality of unit resources on the same time resources. Then, the transmission device (for example setting unit 151) sets the remaining parameters (step S510).

Examples of the remaining parameters include the filter coefficient, the over-sampling parameter, the number of subcarriers, and the number of subsymbols. Then, the transmission device (for example, the transmission processing unit 153 and the radio communication unit 120) performs transmission signal processing on the basis of the above setting, and generates an RF signal (step S512). Then, the transmission device (for example, the antenna unit 110) transmits the generated RF signal (step S514). Then, the process ends.

(3.6) Parameter Limitation
Content of Limitation

Limitations may be imposed on the parameters of the transmission device and/or the reception device. As a result, the overhead is reduced, and implementation is easy. In general, since the terminal device has a lot of limitations for the implementation of hardware and software, it is desirable that a limit be imposed on the parameters of the terminal device.

In this regard, the base station 100 (for example, the setting unit 151) limits the number of parameter candidates that can be set in a plurality of unit resources on the same time resources by the terminal device 200 (corresponding to the transmission device or the reception device) to a predetermined number. Thus, it is possible to solve the problem of limitations on the implementation of hardware and software of the terminal device. Here, a plurality of unit resources may refer to unit resources included in one frequency channel (for example, a component carrier or the like) or may refer to unit resources included in a plurality of frequency channels. In other words, limitations may be imposed on the parameters in one unit resource, or limitations may be imposed on the parameters in a plurality of unit resources.

The number of parameter candidates may be limited to a predetermined number in a plurality of frequency channels, and the number of parameter candidates may be limited to a predetermined number minus one in one frequency channel.

The predetermined number may be 1 or an arbitrary number of 1 or more.

Parameter limitation may be imposed for each predetermined time resource. As the predetermined time resource, for example, a transmission time interval (TTI), a subframe, a plurality of TTIs, a plurality of subframes, a radio frame, or the like is considered. For example, the parameters of the transmission device are limited so that the same parameters are set in the same time resources. However, different parameters are allowed to be set in different time resources. Similarly, the parameters of the reception device are limited so that the same parameters are set in the same time resources. However, different parameters can be allowed to be set in different time resources However, different parameter limitations are allowed to be imposed in different time resources. This is because one device can be used in parallel in a plurality of different use cases. As a use case, for example, broadband communication (Enhanced Mobile Broadband (eMBB)), ultra reliable and low latency communication (URLLC)), machine type communication (MTC), or the like is considered. For example, different limitations in which a different use case is assumed for each time resource may be imposed. In other words, the parameter limitation imposed on each time resource may be switched. Of course, switching need not be performed over a plurality of time resources.

Further, parameter limitation may be imposed for each predetermined frequency resource. As the predetermined frequency resource, for example, the entire frequency of the system, the frequency channel (for example, the component carrier), the frequency block (for example, the resource block), or the like is considered. For example, the parameters of the transmission device are limited so that the same parameter is set in the same frequency resource. The same applies to the parameters of the reception device. However, different parameter limitations may be allowed to be imposed in different frequency resources.

The parameter limitation may differ between respective reception devices or may be common to a plurality of reception devices. Similarly, the parameter limitation may differ between respective transmission devices or may be common to a plurality of transmission devices.

Further, the parameter limitation may only be imposed on some parameters. For example, some parameters such as the subcarrier interval and the subsymbol length may not be limited, and other parameters such as the CP length and the TTI length may be limited.

The parameter limitation in the downlink communication of the cellular system will be specifically described below with reference to FIGS. 27 to 32. Of course, the parameter limitation may be similarly performed in the uplink communication, sidelink communication in device-to-device (D2D) communication, and the like.

Figure 27:
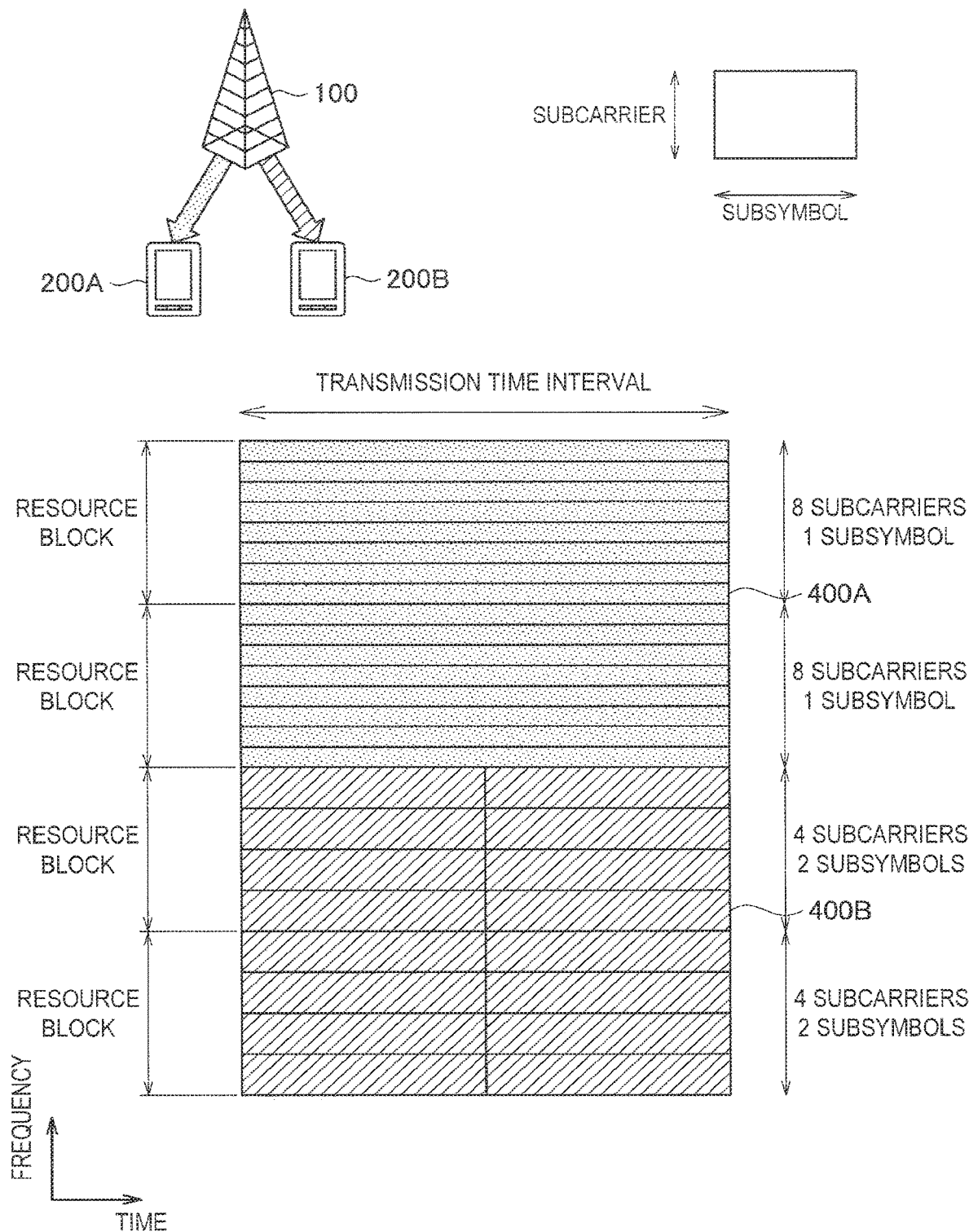
FIG. 27 is an explanatory diagram for describing technical features of a system according to the embodiment.

FIG. 27 is a diagram for describing an example of the parameter limitation according to the present embodiment. As illustrated in FIG. 27, the base station 100 is a transmission device, and terminal devices 200A and 200B are reception devices. Resources 400A are resources used for signals destined for the terminal device 200A, and resources 400 B are resources used for signals destined for the terminal device 200B. As illustrated in FIG. 27, the same parameters (here, the subcarrier interval and the subsymbol length) are set within the same time resources (here, the TTI) for each terminal device 200. As described above, in the example illustrated in FIG. 27, limitations are imposed on the parameters.

Figure 28:
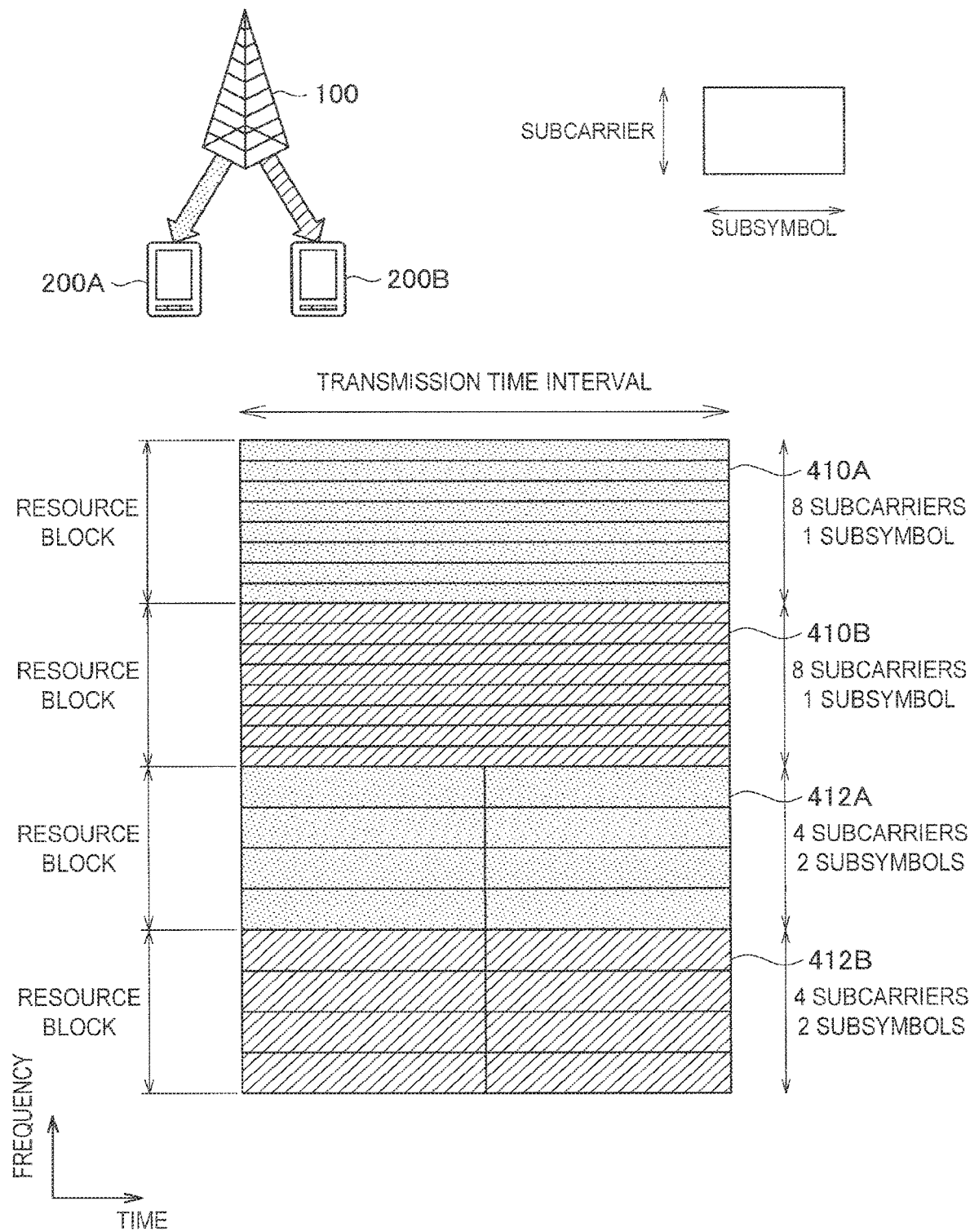
FIG. 28 is an explanatory diagram for describing technical features of a system according to the embodiment.

FIG. 28 is a diagram for describing an example of the parameter limitation according to the present embodiment. As illustrated in FIG. 28, the base station 100 is a transmission device, and the terminal devices 200A and 200B are reception devices. Resources 410A and 412A are resources used for signals destined for the terminal device 200A, and resources 410B and 412B are resources used for signals destined for the terminal device 200B. As illustrated in FIG. 28, different parameters (here, the subcarrier interval and the subsymbol length) are set within the same time resources (here, the TTI) in the resources 410A and 412A used for signals destined for the terminal device 200A. Further, different parameters are set in the same time resources in the resources 410B and 412B used for signals destined for the terminal device 200B. As described above, some different parameters may be allowed to be set. However, limitations may be imposed on other parameters such as the CP length and/or the TTI length.

Here, in the examples illustrated in FIGS. 27 and 28, the parameter limitation is imposed in one frequency channel (for example, a component carrier). On the other hand, the parameter limitation may be imposed in a plurality of frequency channels as illustrated in FIGS. 29 and 30.

Figure 29:
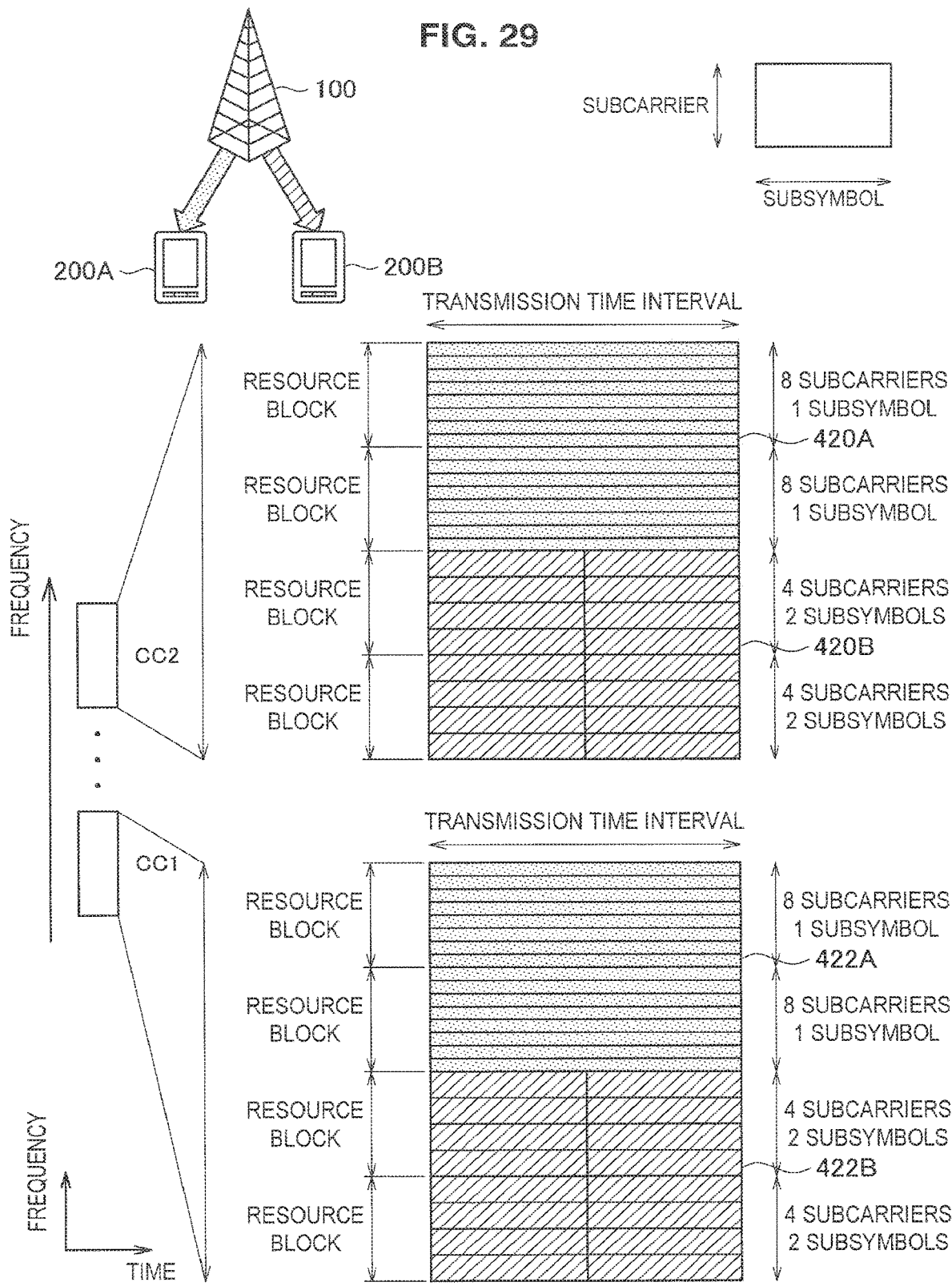
FIG. 29 is an explanatory diagram for describing technical features of a system according to the embodiment.

FIG. 29 is a diagram for describing an example of the parameter limitation according to the present embodiment. As illustrated in FIG. 29, the base station 100 is a transmission device, and the terminal devices 200A and 200B are reception devices. Resources 420A and 422A are resources used for signals destined for the terminal device 200A, and resources 420B and 422B are resources used for signals destined for the terminal device 200B. As illustrated in FIG. 29, the same parameters (here, the subcarrier interval and the subsymbol length) are set in the same time resources (here, the TTI) even in different component carriers for each terminal device 200. As described above, in the example illustrated in FIG. 27, limitations are imposed on the parameters related to a plurality of component carriers. Due to such limitations, even when the number of component carriers increases, it is possible to efficiently implement the reception process by causing the parameters for signal processing to shared.

Figure 30:
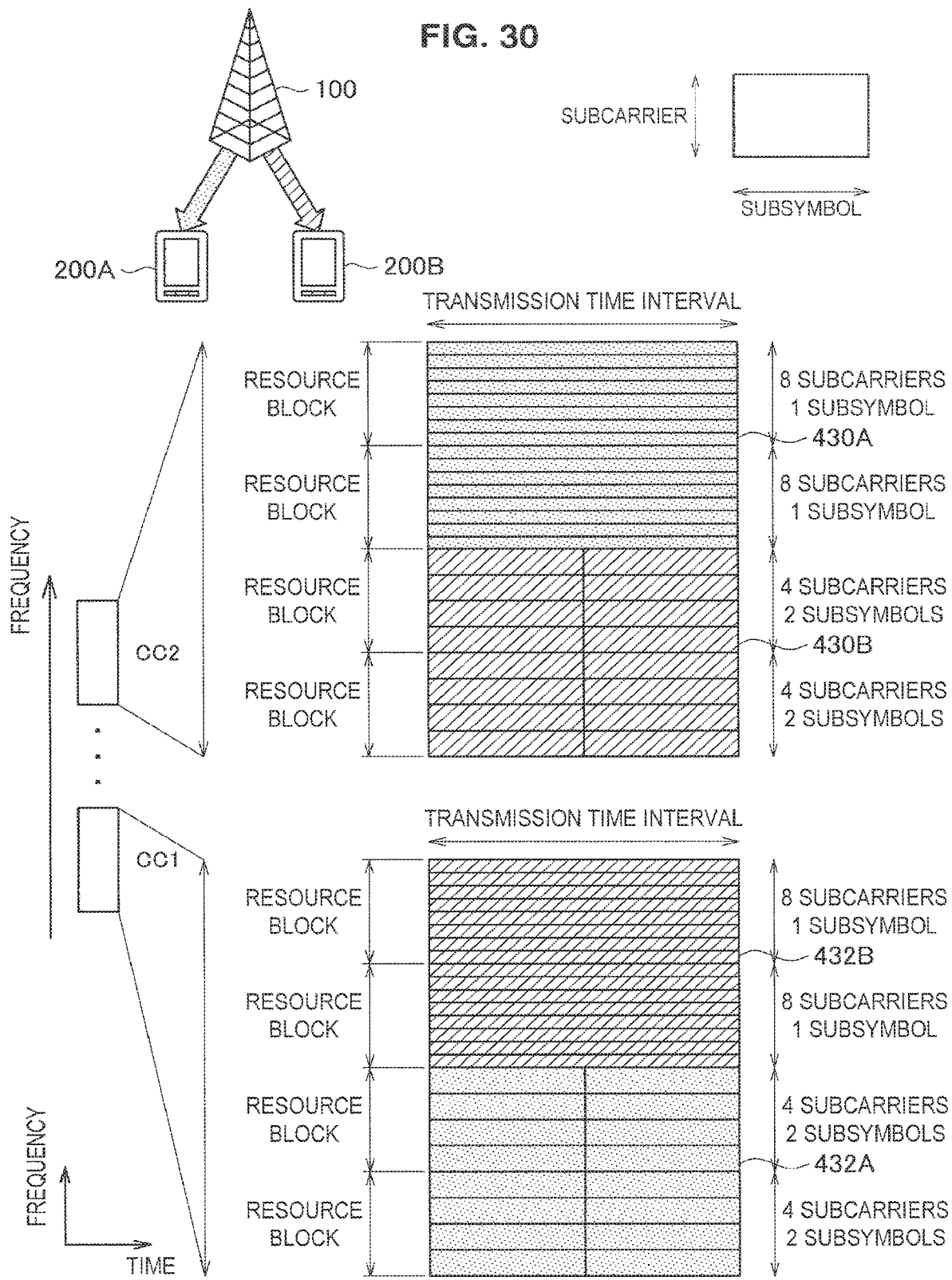
FIG. 30 is an explanatory diagram for describing technical features of a system according to the embodiment.

FIG. 30 is a diagram for describing an example of the parameter limitation according to the present embodiment. As illustrated in FIG. 30, the base station 100 is a transmission device, and the terminal devices 200A and 200B are reception devices. Resources 430A and 432A are resources used for signals destined for the terminal device 200A, and resources 430B and 432B are resources used for signals destined for the terminal device 200B. As illustrated in FIG. 30, different parameters (here, the subcarrier interval and the subsymbol length) are set in the same time resources (here, the TTI) in the resources 430A and 432A used for signals destined for the terminal device 200A. Different parameters are set in the same time resources in different component carriers in the resources 430B and 432B used for signals destined for the terminal device 200B. As described above, different parameters may be allowed to be set. However, limitations may be imposed on other parameters such as the CP length and/or the TTI length.

Here, the parameter limitation imposed on the same time resources has been described with reference to FIGS. 27 to 30. On the other hand, as illustrated in FIGS. 31 and 32, different parameter limits may be imposed on different time resources.

Figure 31:
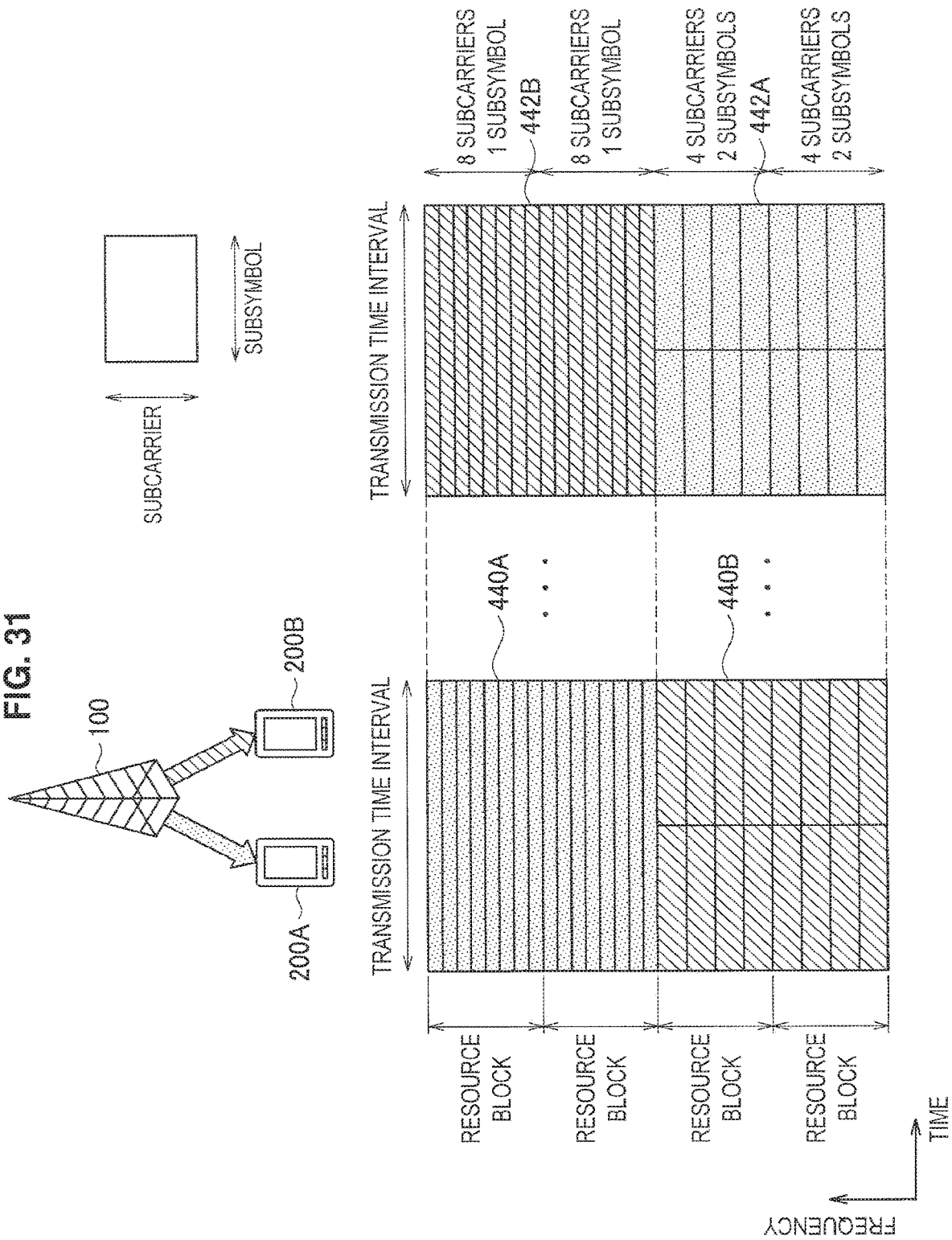
FIG. 31 is an explanatory diagram for describing technical features of a system according to the embodiment.

FIG. 31 is a diagram for describing an example of the parameter limitation according to the present embodiment. As illustrated in FIG. 31, the base station 100 is a transmission device, and the terminal devices 200A and 200B are reception devices. Resources 440A and 442A are resources used for signals destined for the terminal device 200A, and resources 440B and 442B are resources used for signals destined for the terminal device 200B. As illustrated in FIG. 31, different parameters (here, the subcarrier interval and the subsymbol length) are set in different time resources (here, TTIs) for each terminal device 200. As described above, in the example illustrated in FIG. 31, it is allowed to impose different parameter limitations between respective time resources.

Figure 32:
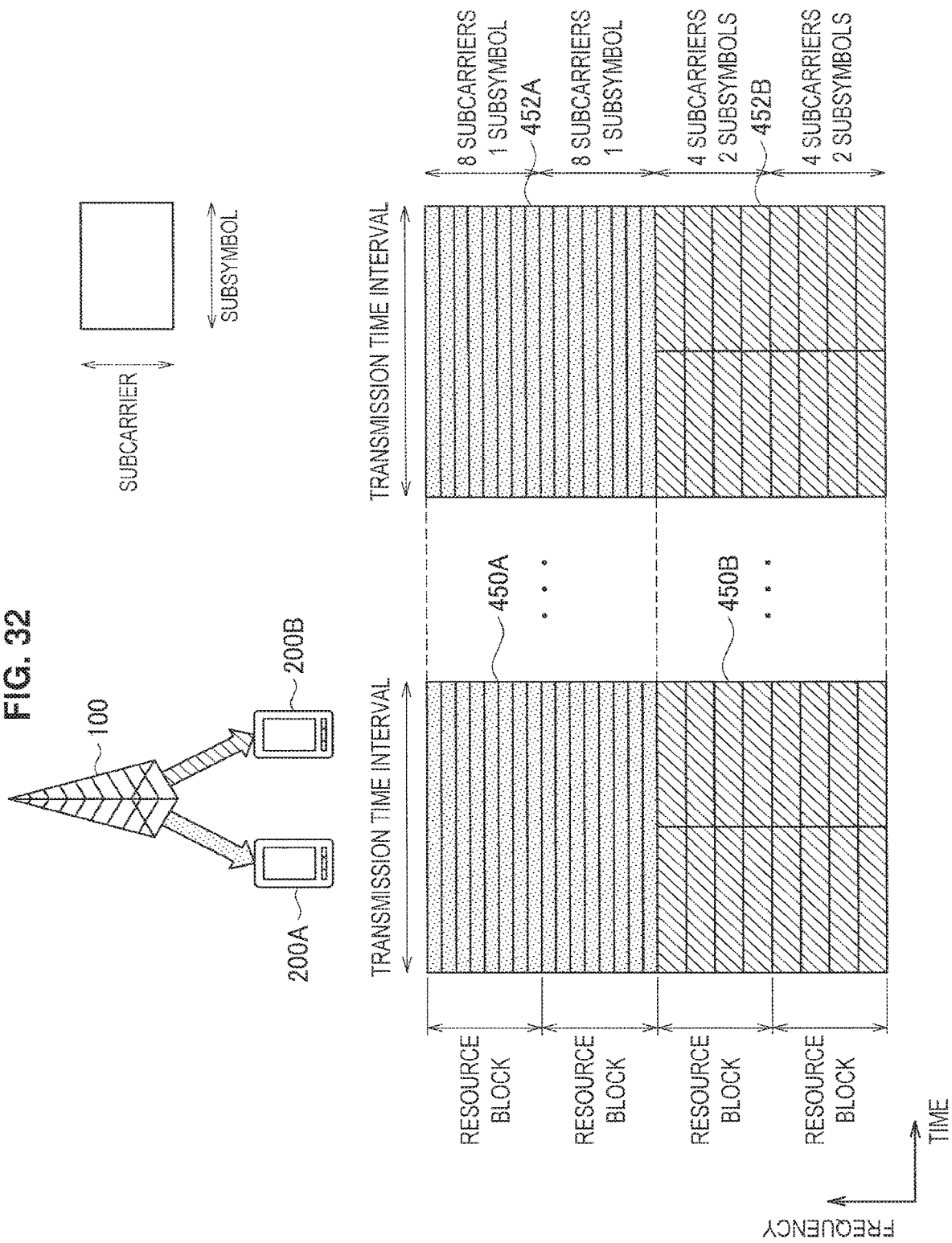
FIG. 32 is an explanatory diagram for describing technical features of a system according to the embodiment.

FIG. 32 is a diagram for describing an example of the parameter limitation according to the present embodiment. As illustrated in FIG. 32, the base station 100 is a transmission device, and the terminal devices 200A and 200B are reception devices. Resources 450A and 452A are resources used for signals destined for the terminal device 200A, and resources 450B and 452B are resources used for signals destined for the terminal device 200B. As illustrated in FIG. 32, the same parameters (here, the subcarrier interval and the subsymbol length) are set in different time resources (here, TTIs) for each terminal device 200. As described above, in the example illustrated in FIG. 32, the same parameter limitation is imposed even in different time resources. The implementation is easy when it is not allowed to impose different parameter limitations in different time resources. Of course, switching of the parameter limitation may be allowed in units of a plurality of TTIs, a plurality of subframes, or one or more radio frame units, or the like.

The following Table 14 shows a table in which the parameters of the transmission device are summarized. Further, the following Table 15 shows a table in which the parameters of the reception device are summarized.

TABLE 14

| Applicable cases | Number of reception devices (type of reception device) multiplexed in predetermined time resources | Number of combinations of parameters usable for transmission of signal destined for one reception device in predetermined time resources | Particularly desirable one in terms of implementation |
| --- | --- | --- | --- |
| Downlink/uplink/sidelink | 1 (terminal device/base station) | 1 | Particularly desirable |
| Downlink/uplink/sidelink | 1 (terminal device/base station) | plural | |
| Downlink/sidelink | plural (terminal device) | 1 | Particularly desirable |
| Downlink/sidelink | plural (terminal device) | plural | |

TABLE 15

| Applicable cases | Number of transmission devices (type of transmission device) multiplexed in predetermined time resources | Number of combinations of parameters assumed with regard to reception of signals from one transmission device in predetermined time resources | Particularly desirable one in terms of implementation |
| --- | --- | --- | --- |
| Downlink/uplink/sidelink | 1 (terminal device/base station) | 1 | Particularly desirable |
| Downlink/uplink/sidelink | 1 (terminal device/base station) | plural | |
| Uplink/sidelink | plural (terminal device) | 1 | Particularly desirable |
| Uplink/sidelink | plural (terminal device) | plural | |

Control Information Transmitted from Base Station to Terminal Device

Control information transmitted from the base station 100 (for example, the transmission device) to the terminal device 200 (for example, the reception device) when limitations are imposed on the parameters will be described.

The base station 100 (for example, the setting unit 151) sets a parameter selected from settable parameter candidates. The base station 100 (the transmission processing unit 153) includes information indicating the selected parameter in the control information, transmits the resulting control information to the terminal device 200, and then transmits the data signal in accordance with the selected parameter.

An example of the control information when the number of parameter candidates that can be set on the same time resources is limited to 1 is shown in the following Table 16. Hatched parts are the control information related to the parameters on which the limitations are imposed. As illustrated in Table 16, the parameters on which the limitations are imposed include at least one of the subcarrier interval, the subsymbol time length, the TTI length, and the CP length. The transmission of the control information may be omitted when a set value corresponds to a predetermined value (for example, a default value or a reference value of the system 1). As a result, the transmission/reception load of the control information is reduced. Here, the default parameter is assumed to be a parameter that is neither a minimum value nor a maximum value that is usable in the system 1.

An example of the control information when the number of parameter candidates that can be set on the same time resources is limited to 2 or more is shown in the following Table 17. Hatched parts are the control information related to the parameters on which the limitations are imposed. For example, the system 1 can support two or more parameter candidates by preparing the control information related to the parameters on which the limitations are imposed in units of resource blocks. Although not shown in the same table, the control information related to the parameters may be prepared in units of frequency channels (for example, component carriers) in addition to units of resource blocks.

TABLE 16

| Information Elements | Meaning | Supplement |
| --- | --- | --- |
| Carrier Indicator | indicates bandwidth of frequency channel | |
| Flag for Control Information Format | indicates control information format | |
| Frequency Hopping Flag | indicates whether or not frequency hopping is applied | |
| Resource Block Assignment | indicates allocation location of resource block | |
| Subcarrier Spacing Index | indicates subcarrier interval | See Tables 7 and 8. It may be indicated by number of subcarriers |
| Subsymbol Length Index | indicates subsymbol length | It is desirable to have candidate value table similar to Tables 7 and 8. It may be indicated by number of subsymbols. See Tables 9 and 10. |
| TTI Index | indicates TTI length | It is desirable to have candidate value table similar to Tables 7 and 8. See Table 11. |
| CP Length Index | indicates CP length | It is desirable to have candidate value table similar to Tables 7 and 8. It may be indicated by ratio to symbol length or subsymbol length. See Table 12 |
| Hopping Resource Allocation | indicates frequency hopping pattern | |
| Modulation and Coding Scheme | indicates PSK/QAM modulation scheme, error correcting coding scheme, and code rate | |
| Redundancy Version | indicates redundancy version | |
| New Data Indicator | indicates whether or not it is new data or retransmission data | |

TABLE 16-continued

| Information Elements | Meaning | Supplement |
|---|---|---|
| Transmit Power Control Command for Scheduled Channel | indicates transmission power control parameter or command | |

TABLE 17

| Information Elements | | Meaning | Supplement |
|---|---|---|---|
| Carrier Indicator | | indicates bandwidth of frequency channel | |
| Flag for Control Information Format | | indicates control information format | |
| Frequency Hopping | | indicates whether or not frequency hopping is applied | |
| Resource Block Assignment | | indicates allocation location of resource block | |
| Subcarrier Spacing Index Set | Subcarrier Spacing Index for Resource Block 1 | indicates subcarrier interval of allocated first resource block | See Table 7. Notification of corresponding subcarrier spacing index is issued as many time as number of allocated resource blocks which is indicated by Resource Block Assignment |
| | Subcarrier Spacing Index for Resource Block 2 | indicates subcarrier interval of allocated second resource block | |
| | ... | ... | |
| | Subcarrier Spacing Index for Resource Block $N_{ARB}$ | indicates subcarrier interval of allocated $N_{ARB}$-th resource block | |
| Subsymbol Length Index Set | | | Similar to Subcarrier Spacing Index Set |
| TTI Index Set | | | Similar to Subcarrier Spacing Index Set |
| CP Length Index Set | | | Similar to Subcarrier Spacing Index Set |
| Hopping Resource Allocation | | indicates frequency hopping pattern | |
| Modulation and Coding Scheme | | indicates PSK/QAM modulation scheme, error correcting coding scheme, and code rate | |
| Redundancy Version | | indicates redundancy version | |
| New Data Indicator | | indicates whether or not it is new data or retransmission data | |
| Transmit Power Control Command for Scheduled Channel | | indicates transmission power control parameter or command | |

A transmission timing of the control information can be variously considered. For example, the control information may be transmitted constantly, may be transmitted for each subframe, or may be transmitted each time the parameter is set (for example, at intervals of scheduling unit times or at intervals of a plurality of scheduling unit times). The flow of the process in the latter case will be described with reference to FIGS. 33 and 34.

Figure 33:
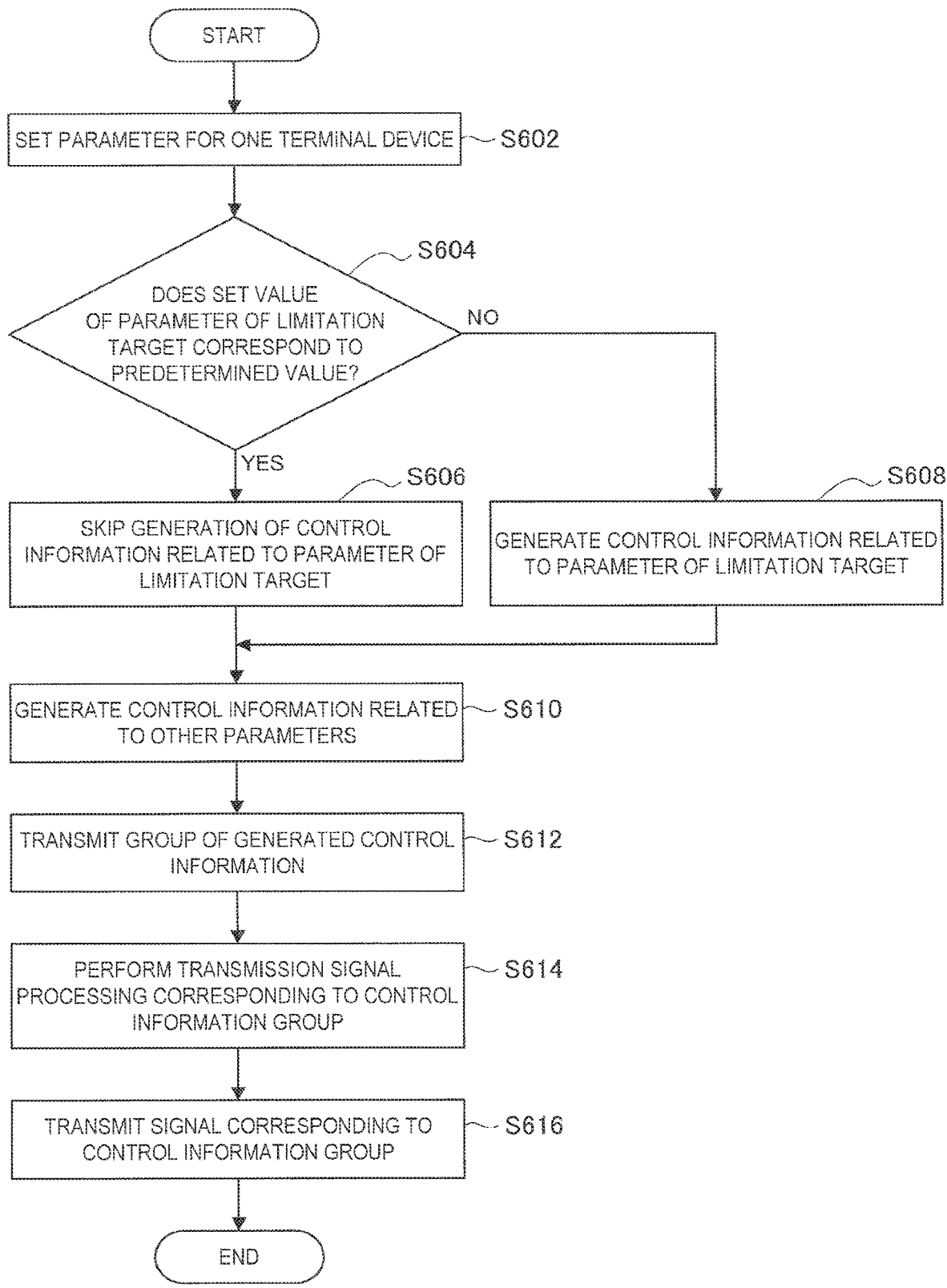
FIG. 33 is an explanatory diagram for describing technical features of a system according to the embodiment.

FIG. 33 is a flowchart illustrating an example of the flow of a transmission process of control information related to downlink communication performed in the base station 100 according to the present embodiment. As illustrated in FIG. 33, the base station 100 first sets a parameter for one terminal device 200 (step S602). Then, the base station 100 determines whether or not the set value of the parameter to be limited corresponds to a predetermined value (for example, a default value or a reference value of the system 1) (step S604). Here, the parameters to be limited are the parameters hatched in Tables 16 and 17. The default value may be, for example, the subcarrier interval corresponding to (0) in Table 13 for the subcarrier interval or may be, for example, the same value (for example, 1 msec) as the subframe for the TTI. When the set value of the parameter to be limited is determined to correspond to a predetermined value (YES in step S604), the base station 100 skips the generation of the control information related to the parameter to be limited (step S606). On the other hand, when the set value of the parameter to be limited is determined to be different from a predetermined value (NO in step S604), the base station 100 generates the control information related to the parameter to be limited (step S608). Then, the base station 100 generates control information related to other parameters other than the parameter to be limited (step S610). Then, the base station 100 transmits a group of the generated control information (step S612). Then, the base station 100 performs transmission signal processing such as encoding and modulation corresponding to the control information group on the real data (step S614), and transmits the signal subjected to transmission signal processing on the physical channel corresponding to the control information group (Step S616). Then, the process ends.

Figure 34:
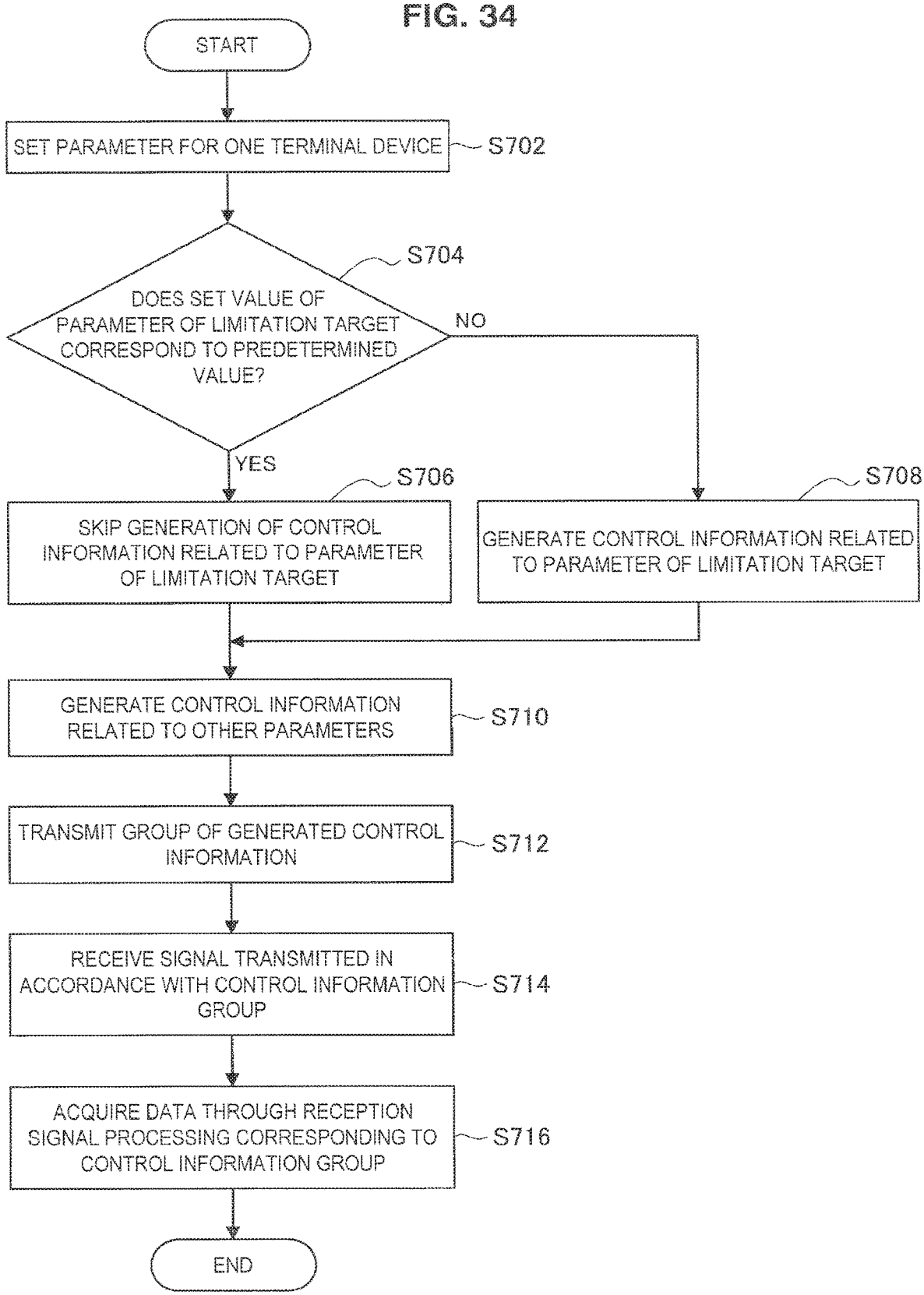
FIG. 34 is an explanatory diagram for describing technical features of a system according to the embodiment.

FIG. 34 is a flowchart illustrating an example of the flow of a transmission process of control information related to uplink communication performed in the base station 100 according to the present embodiment. As illustrated in FIG. 34, the base station 100 first sets a parameter for one terminal device 200 (step S702). Then, the base station 100 determines whether or not the set value of the parameter to be limited corresponds to a predetermined value (for example, a default value or a reference value of the system 1) (step S704). When the set value of the parameter to be limited is determined to correspond to a predetermined value (YES in step S704), the base station 100 skips the generation of the control information related to the parameter to be limited (step S706). On the other hand, when the set value of the parameter to be limited is determined not to correspond to a predetermined value (NO in step S704), the base station 100 generates the control information related to the parameter to be limited (step S708). Then, the base station 100 generates control information related to parameters other than parameter of limitation target (step S710). Then, the base station 100 transmits a group of the generated control information (step S712). Then, the base station 100 receives the signal transmitted from the terminal device 200 in accordance with the control information group (step S714). Then, the base station 100 performs reception signal processing such as decoding and demodulation corresponding to the group of control information on the reception signal, and acquires data (step S716). Then, the process ends.

Control Information Transmitted from Terminal Device to Base Station

The control information transmitted from the terminal device 200 to the base station 100 when limitations can be imposed on the parameters will be described.

For example, this control information is UE capability information indicating capabilities of the terminal device 200. The UE capability information includes information about a capability for transmission signal processing of the terminal device 200 and a capability for reception signal processing. The base station 100 can perform scheduling and setting and notification of the parameter on the basis of the received UE capability information An example of the UE capability information is shown in the following Table 18. As shown in Table 18, the UE capability information may include information common to both transmission and reception (for example, a UE category indicating a category of the terminal device 200) in addition to information related to transmission signal processing and reception signal processing.

TABLE 18

| Capability Information Elements | Sub Information Elements | Formats | Supplement |
|---|---|---|---|
| Common Capability Information | UE Category | Integer (0, 1, 2, . . .) | |
| | Support Subcarrier Spacing | Integer (0, 1, 2, . . .) | |
| | Support Cyclic Prefix Length | Integer (0, 1, 2, . . .) | |
| | Support Symbol Length | Integer (0, 1, 2, . . .) | |
| | Support TTI | Integer (0, 1, 2, . . .) | |
| Transmitter Capability Information | Filtering Capability | Yes/No | |
| | Windowing Capability | Yes/No | |
| | Support Filtering Type | Integer (0, 1, 2, . . .) | May be added only when Filtering Capability is Yes |
| | Support Windowing Type | Integer (0, 1, 2, . . .) | May be added only when Windowing Capability is Yes |
| Receiver Capability Information | Filtering Capability | Yes/No | |
| | Windowing Capability | Yes/No | |
| | Support Filtering Type | Integer (0, 1, 2, . . .) | May be added only when Filtering Capability is Yes |

TABLE 18-continued

| Capability Information Elements | Sub Information Elements | Formats | Supplement |
|---|---|---|---|
| | Support Windowing Type | Integer (0, 1, 2, . . .) | May be added only when Windowing Capability is Yes |
| | Cancellation Capability | Yes/No | |
| | Support Cancellation Type | Integer (0, 1, 2, . . .) | May be added only when Windowing Capability is Yes |

It is desirable that the UE capability information be received by the base station 100 before dynamic scheduling of the data channel by the base station 100. It is desirable that a timing is exchanged during the RRC connection procedure or the handover procedure. The flow of the process related to the transmission of the UE capability information will be described with reference to FIG. 35 and FIG. 36.

Figure 35:
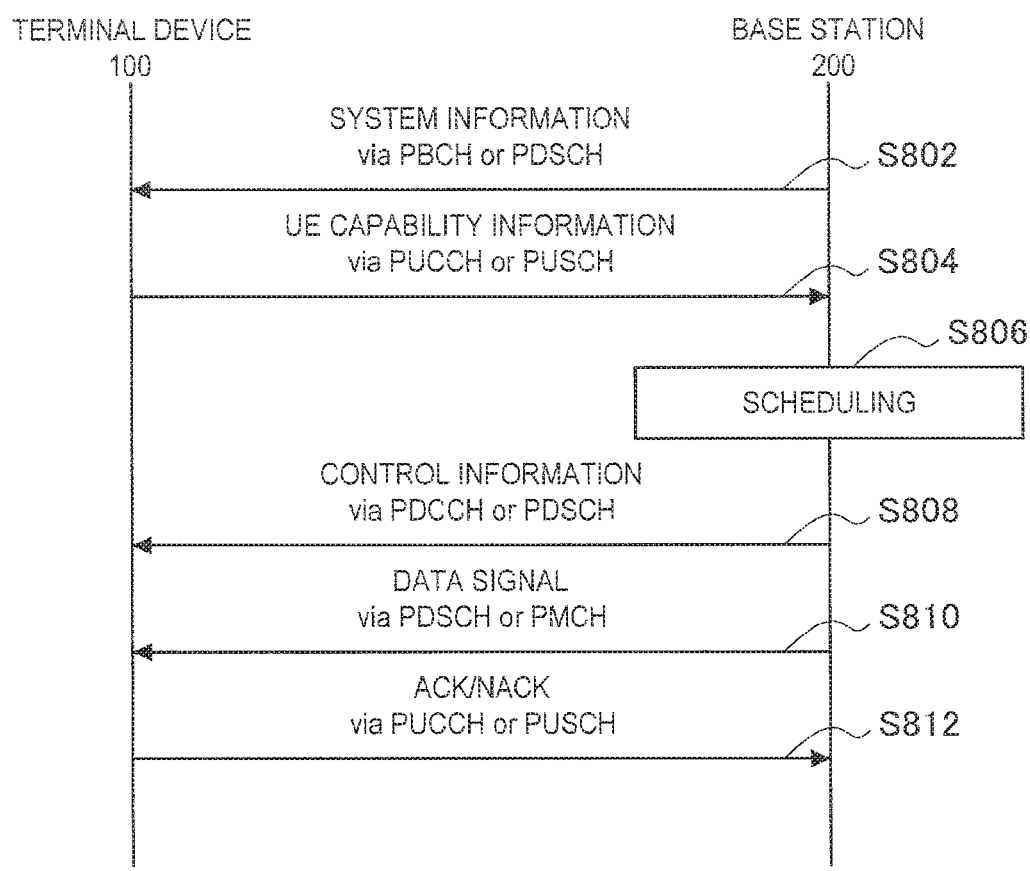
FIG. 35 is an explanatory diagram for describing technical features of a system according to the embodiment.

FIG. 35 is a sequence diagram illustrating an example of a flow of a transmission process of the UE capability information related to downlink communication performed in the system 1 according to the present embodiment. In this sequence, the base station 100 and the terminal device 200 are involved. As illustrated in FIG. 35, first, the base station 100 transmits the system information to the terminal device 200 via a physical broadcast channel (PBCH) or a physical downlink shared channel (PDSCH) (step S802). Then, the terminal device 200 transmits the UE capability information to the base station 100 via a Physical Uplink Control Channel (PUCCH) or a physical uplink shared channel (PUSCH) (step S804). Then, the base station 100 performs scheduling on the basis of the received UE capability information (step S806). Through this scheduling, the parameters to be used when the target terminal device 200 receives the PDSCH (the subframe, the resource block, the subcarrier interval, the number of subcarriers, the CP length, the TTI, and the like) are set. Then, the base station 100 transmits the control information including the parameters corresponding to a scheduling result to the terminal device 200 through a Physical Downlink Control Channel (PDCCH) (or an enhanced EPDCCH (EPDCCH)) or the PDSCH (step S808). Then, the base station 100 transmits the data signal to the terminal device 200 through the PDSCH or a physical multicast channel (PMCH) (step S810). Then, the terminal device 200 performs the reception process of the data signal in accordance with the received control information and transmits a response (ACK/NACK) to the base station 100 through the PUCCH or the PUSCH (step S812). Then, the process ends.

Figure 36:
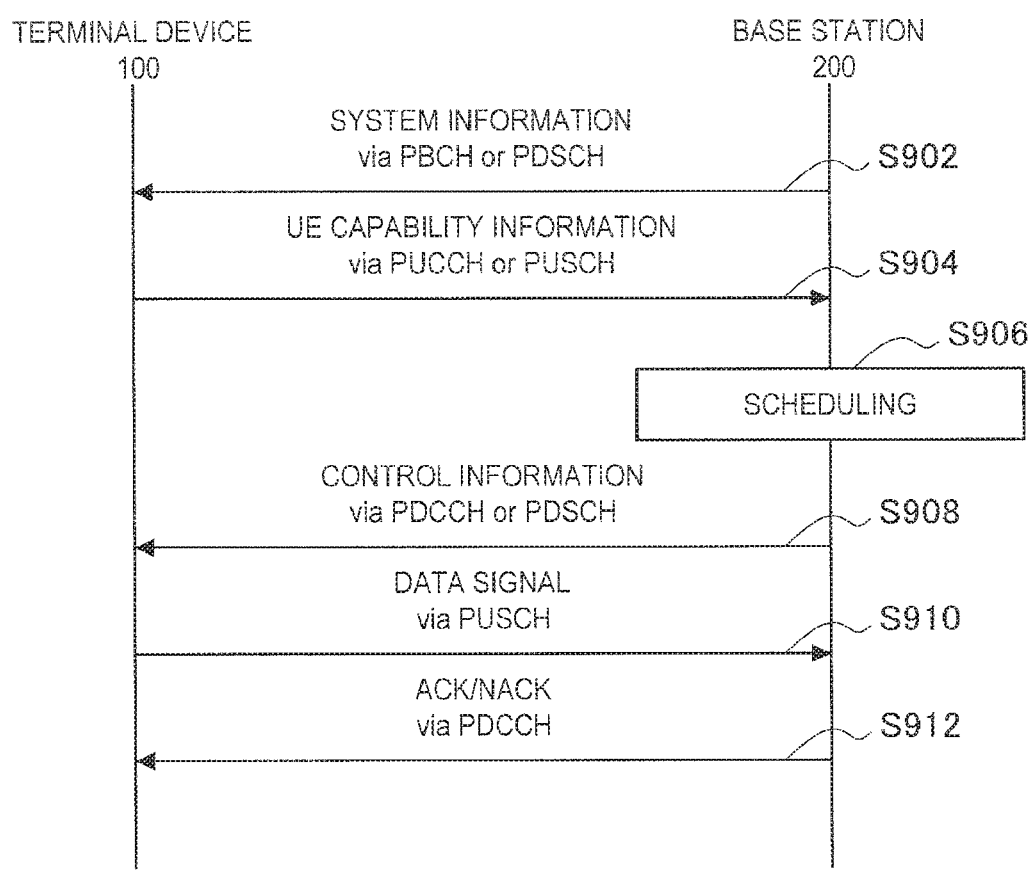
FIG. 36 is an explanatory diagram for describing technical features of a system according to the embodiment.

FIG. 36 is a sequence diagram illustrating an example of a flow of a transmission process of the UE capability information related to uplink communication performed in the system 1 according to the present embodiment. In this sequence, the base station 100 and the terminal device 200 are involved. As illustrated in FIG. 36, the base station 100 first transmits the system information to the terminal device 200 through the PBCH or the PDSCH (step S902). Then, the terminal device 200 transmits the UE capability information to the base station 100 through the PUCCH or the PUSCH (step S904). Then, the base station 100 performs scheduling on the basis of the received UE capability information (step S906). Through this scheduling, the parameters to be used when the target terminal device 200 transmits the PUSCH (the subframe, the resource block, the subcarrier interval, the number of subcarriers, the CP length, the TTI, and the like) are set. Then, the base station 100 transmits the control information including the parameters corresponding to a scheduling result to the terminal device 200 through the PDCCH (or the ePDCCH) or the PDSCH (step S908). Then, the terminal device 200 transmits the data signal to the base station 100 through the PUSCH in accordance with the received control information (step S910). Then, the base station 100 performs the reception process of the data signal in accordance with the set parameters and transmits a response (ACK/NACK) to the terminal device 200 through the PDCCH (step S912). Then, the process ends.

5. APPLICATION EXAMPLES

The technology of an embodiment of the present disclosure is applicable to various products. For example, the base station 100 may be realized as any type of evolved Node B (eNB) such as a macro eNB or a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body. Additionally, various types of terminals to be discussed below may also operate as the base station 100 by temporarily or semi-permanently executing a base station function. Furthermore, at least a part of elements of the base station 100 may be realized in the base station apparatus or a module for the base station apparatus.

For example, the terminal device 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal device 200 may also be realized as a terminal (that is also referred to as a machine type communication (MTC) terminal) that performs machine-to-machine (M2M) communication. Furthermore, at least a part of elements of the terminal device 200 may be realized in a module (such as an integrated circuit module including a single die) mounted on each of the terminals.

<5.1. Application Example Regarding Base Station>
(First Application Example)

Figure 37:
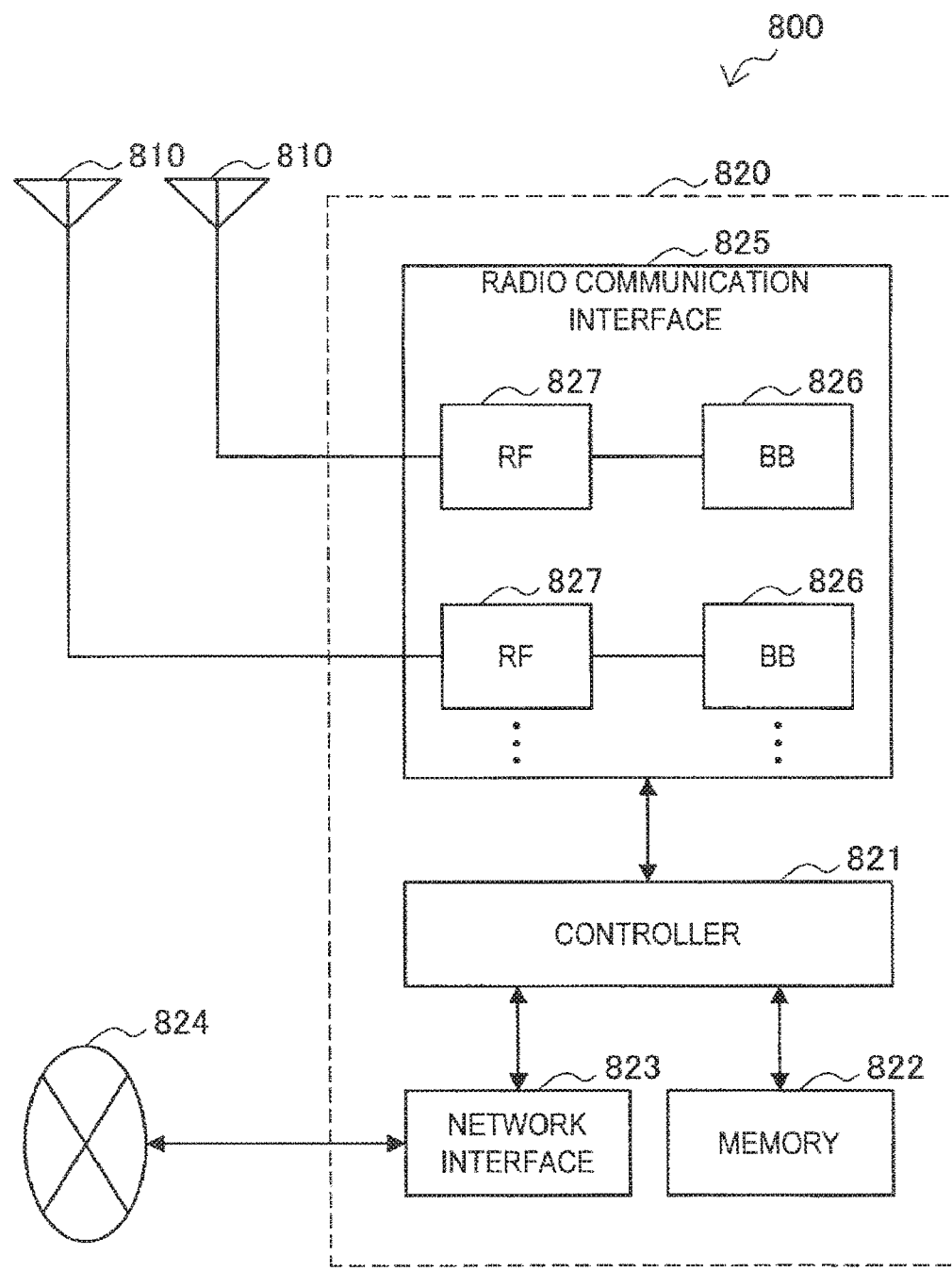
FIG. 37 is a block diagram illustrating a first example of a schematic configuration of an eNB.

FIG. 37 is a block diagram illustrating a first example of a schematic configuration of an eNB to which the technology of an embodiment of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 37. For example, the multiple antennas 810 may be compatible with multiple frequency bands used by the eNB 800. Although FIG. 37 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 37. For example, the multiple BB processors 826 may be compatible with multiple frequency bands used by the eNB 800. The radio communication interface 825 may include the multiple RF circuits 827, as illustrated in FIG. 37. For example, the multiple RF circuits 827 may be compatible with multiple antenna elements. Although FIG. 37 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 37, one or more components (the setting unit 151 and/or the transmission processing unit 153) included in the base station 100 described with reference to FIG. 5 may be implemented in the radio communication interface 825. Alternatively, at least some of the components may be implemented in the controller 821. As an example, the eNB 800 may include a module that includes a part (for example, the BB processor 826) or all of the radio communication interface 825 and/or the controller 821, and one or more components described above may be mounted in the module. In this case, the module may store a program causing a processor to function as one or more components described above (in other words, a program causing a processor to perform operations of one or more components described above) and perform the program. As another example, a program causing a processor to function as one or more components described above may be installed in the eNB 800 and the radio communication interface 825 (for example, the BB processor 826) and/or the controller 821 may execute the program. As described above, the eNB 800, the base station apparatus 820, or the module may be provided as a device including one or more components described above, and a program causing a processor to function as one or more components described above may be provided. Further, a readable recording medium having a program recorded therein may be provided.

Figure 5:
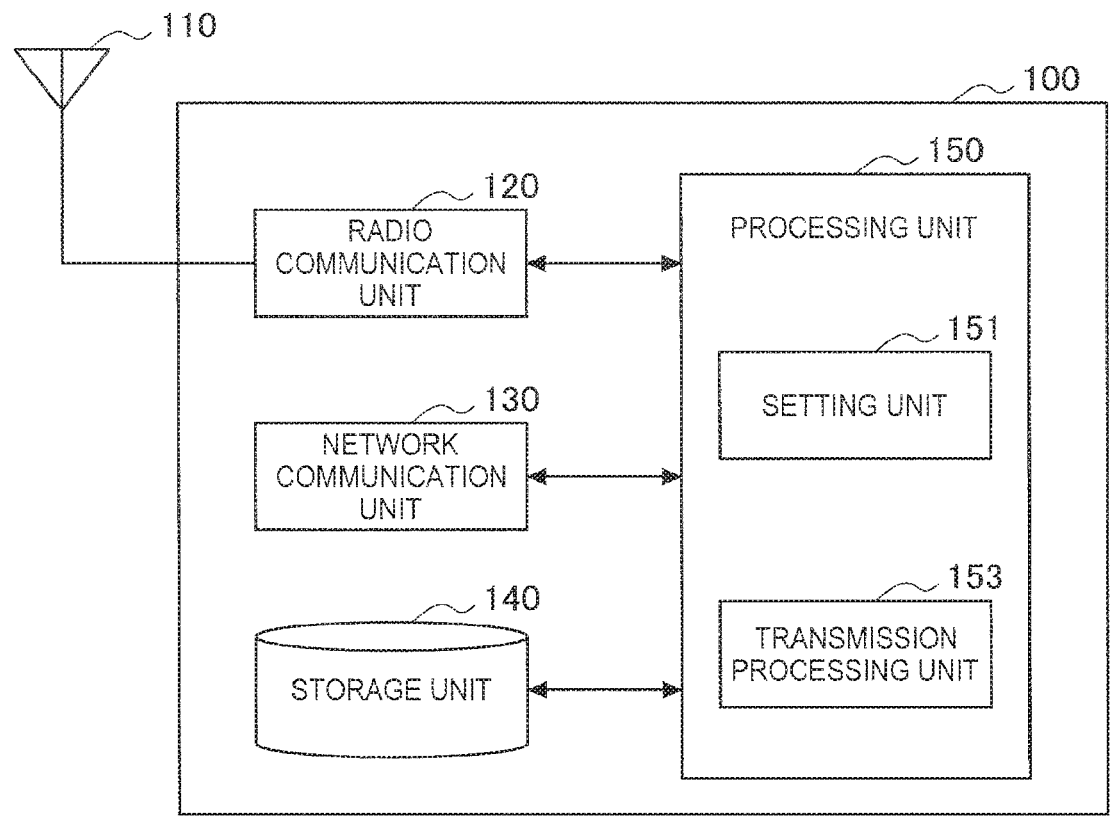
FIG. 5 is a block diagram illustrating an example of a configuration of a base station according to the embodiment.

Furthermore, in the eNB 800 illustrated in FIG. 37, the radio communication unit 120 described by using FIG. 5 may be implemented by the radio communication interface 825 (e.g., the RF circuit 827). In addition, the antenna unit 110 may be implemented by the antenna 810. Further, the network communication unit 130 may be implemented in the controller 821 and/or the network interface 823. Further, the storage unit 140 may be mounted in the memory 822.

(Second Application Example)

Figure 38:
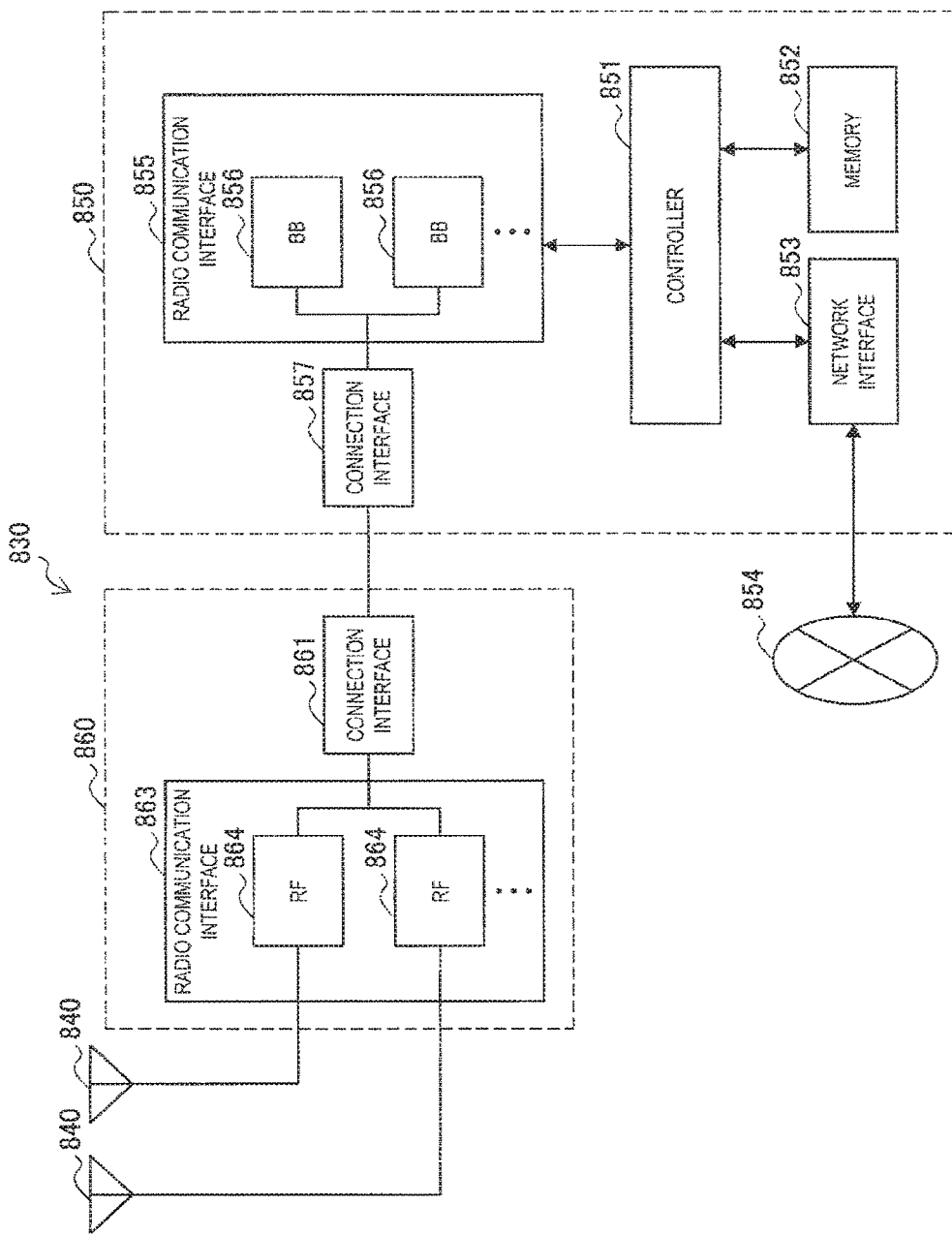
FIG. 38 is a block diagram illustrating a second example of a schematic configuration of an eNB.

FIG. 38 is a block diagram illustrating a second example of a schematic configuration of an eNB to which the technology of an embodiment of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 38. For example, the multiple antennas 840 may be compatible with multiple frequency bands used by the eNB 830. Although FIG. 38 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 37.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 37, except the BB processor 856 is connected to the RF circuit 864 of the RRH 860 via the connection interface 857. The radio communication interface 855 may include the multiple BB processors 856, as illustrated in FIG. 38. For example, the multiple BB processors 856 may be compatible with multiple frequency bands used by the eNB 830. Although FIG. 38 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 38. For example, the multiple RF circuits 864 may support multiple antenna elements. Although FIG. 38 illustrates the example in which the radio communication interface 863 includes the multiple RF circuits 864, the radio communication interface 863 may also include a single RF circuit 864.

In the eNB 830 illustrated in FIG. 38, one or more components (the setting unit 151 and/or the transmission processing unit 153) included in the base station 100 described with reference to FIG. 5 may be implemented in the radio communication interface 855 and/or the radio communication interface 863. Alternatively, at least some of the components may be implemented in the controller 851. As an example, the eNB 830 may include a module that includes a part (for example, the BB processor 856) or all of the radio communication interface 855 and/or the controller 851, and one or more components described above may be mounted in the module. In this case, the module may store a program causing a processor to function as one or more components described above (in other words, a program causing a processor to perform operations of one or more components described above) and perform the program. As another example, a program causing a processor to function as one or more components described above may be installed in the eNB 830 and the radio communication interface 855 (for example, the BB processor 856) and/or the controller 851 may execute the program. As described above, the eNB 830, the base station apparatus 850, or the module may be provided as a device including one or more components described above, and a program causing a processor to function as one or more components described above may be provided. Further, a readable recording medium having a program recorded therein may be provided.

Furthermore, for example, in the eNB 830 illustrated in FIG. 38, the radio communication unit 120 described by using FIG. 5 may be implemented by the radio communication interface 863 (e.g., the RF circuit 864). In addition, the antenna unit 110 may be implemented by the antenna 840. Further, the network communication unit 130 may be implemented in the controller 851 and/or the network interface 853. Further, the storage unit 140 may be mounted in the memory 852.

<5.2. Application Example Regarding Terminal Device>
(First Application Example)

Figure 39:
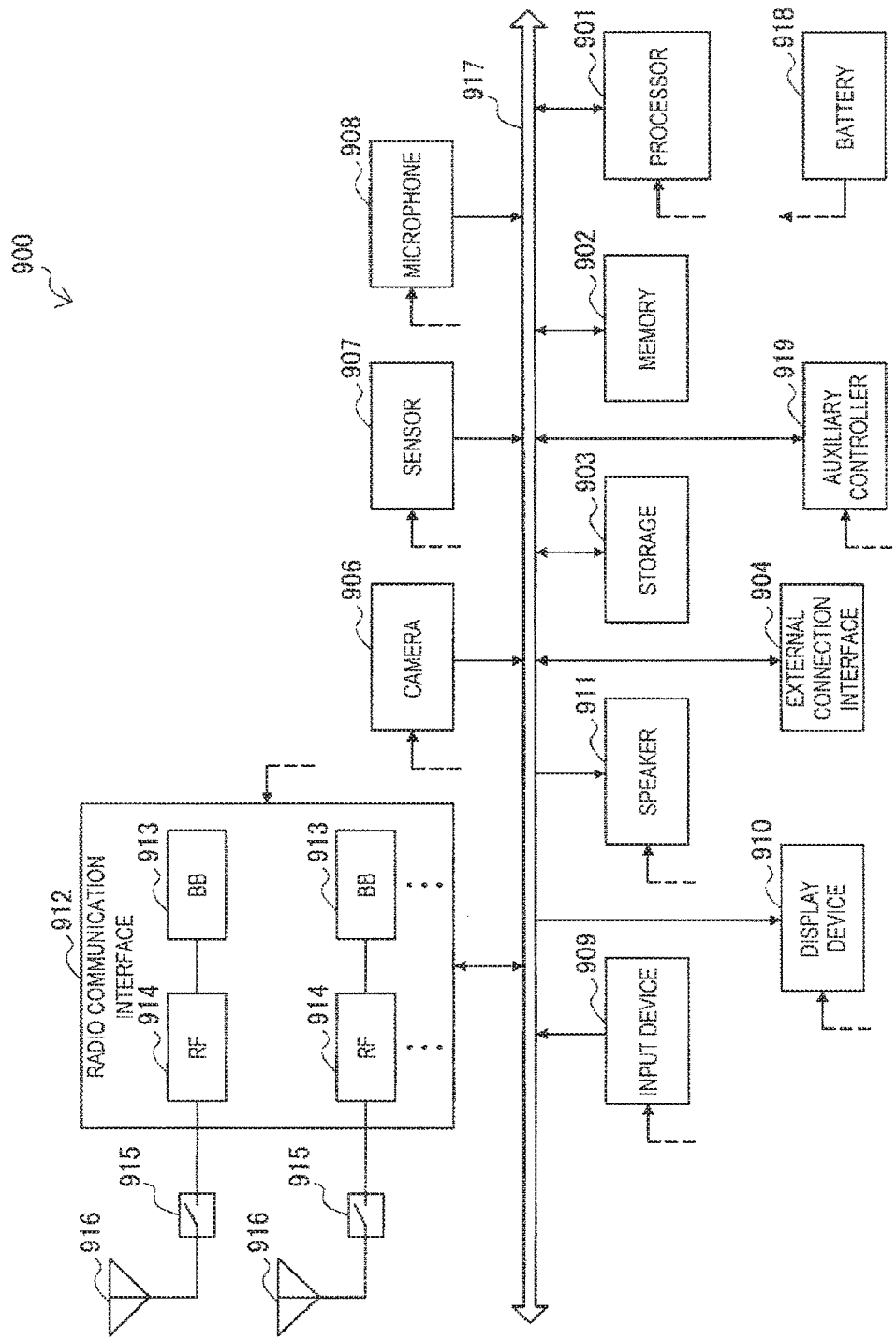
FIG. 39 is a block diagram illustrating an example of a schematic configuration of a smartphone.

FIG. 39 is a block diagram illustrating an example of a schematic configuration of a smartphone 900 to which the technology of an embodiment of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 39. Although FIG. 39 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 39. Although FIG. 39 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 39 via feeder lines, which are partially shown as dashed lines in the figure. The auxiliary controller 919 operates a minimum necessary function of the smartphone 900, for example, in a sleep mode.

In the smartphone 900 illustrated in FIG. 39, one or more components (reception processing unit 241) included in the terminal device 200 described with reference to FIG. 6 may be implemented in the radio communication interface 912. Alternatively, at least some of the components may be implemented in the processor 901 or the auxiliary controller 919. As an example, the smartphone 900 may include a module that includes a part (for example, the BB processor 913) or all of the radio communication interface 912, the processor 901 and/or the auxiliary controller 919, and one or more components described above may be mounted in the module. In this case, the module may store a program causing a processor to function as one or more components described above (in other words, a program causing a processor to perform operations of one or more components described above) and perform the program. As another example, a program causing a processor to function as one or more components described above may be installed in the smartphone 900 and the radio communication interface 912 (for example, the BB processor 913), the processor 901 and/or the auxiliary controller 919 may execute the program. As described above, the smartphone 900, the base station apparatus 820, or the module may be provided as a device including one or more components described above, and a program causing a processor to function as one or more components described above may be provided. Further, a readable recording medium having a program recorded therein may be provided.

Figure 6:
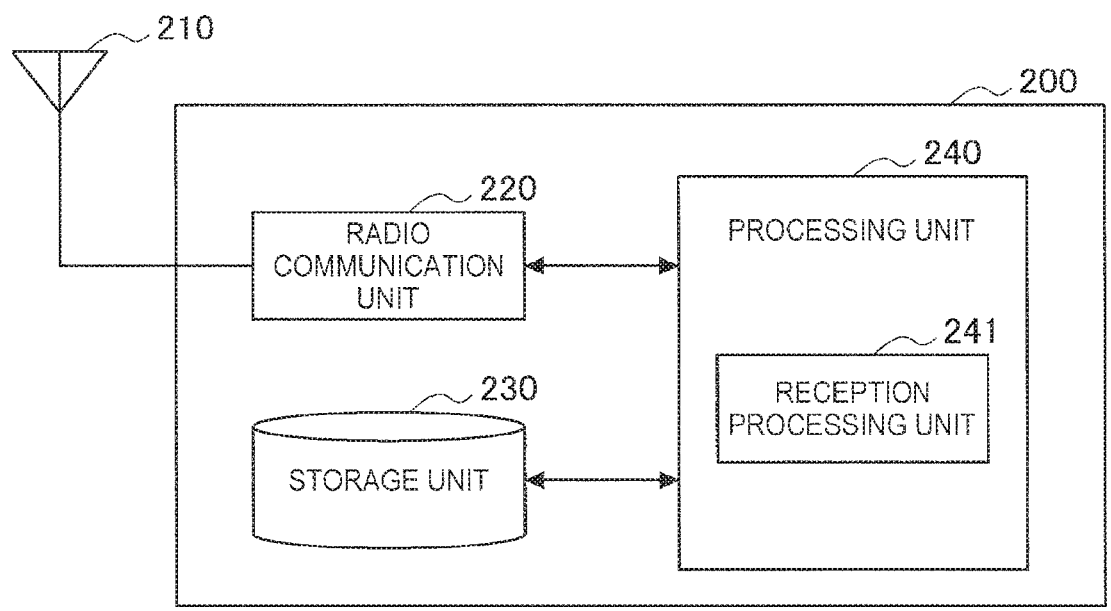
FIG. 6 is a block diagram illustrating an example of a configuration of a terminal device according to the embodiment.

Furthermore, for example, in the smartphone 900 illustrated in FIG. 39, the radio communication unit 220 described by using FIG. 6 may be implemented by the radio communication interface 912 (e.g., the RF circuit 914). In addition, the antenna unit 210 may be implemented by the antenna 916. Further, the storage unit 230 may be mounted in the memory 902.

(Second Application Example)

Figure 40:
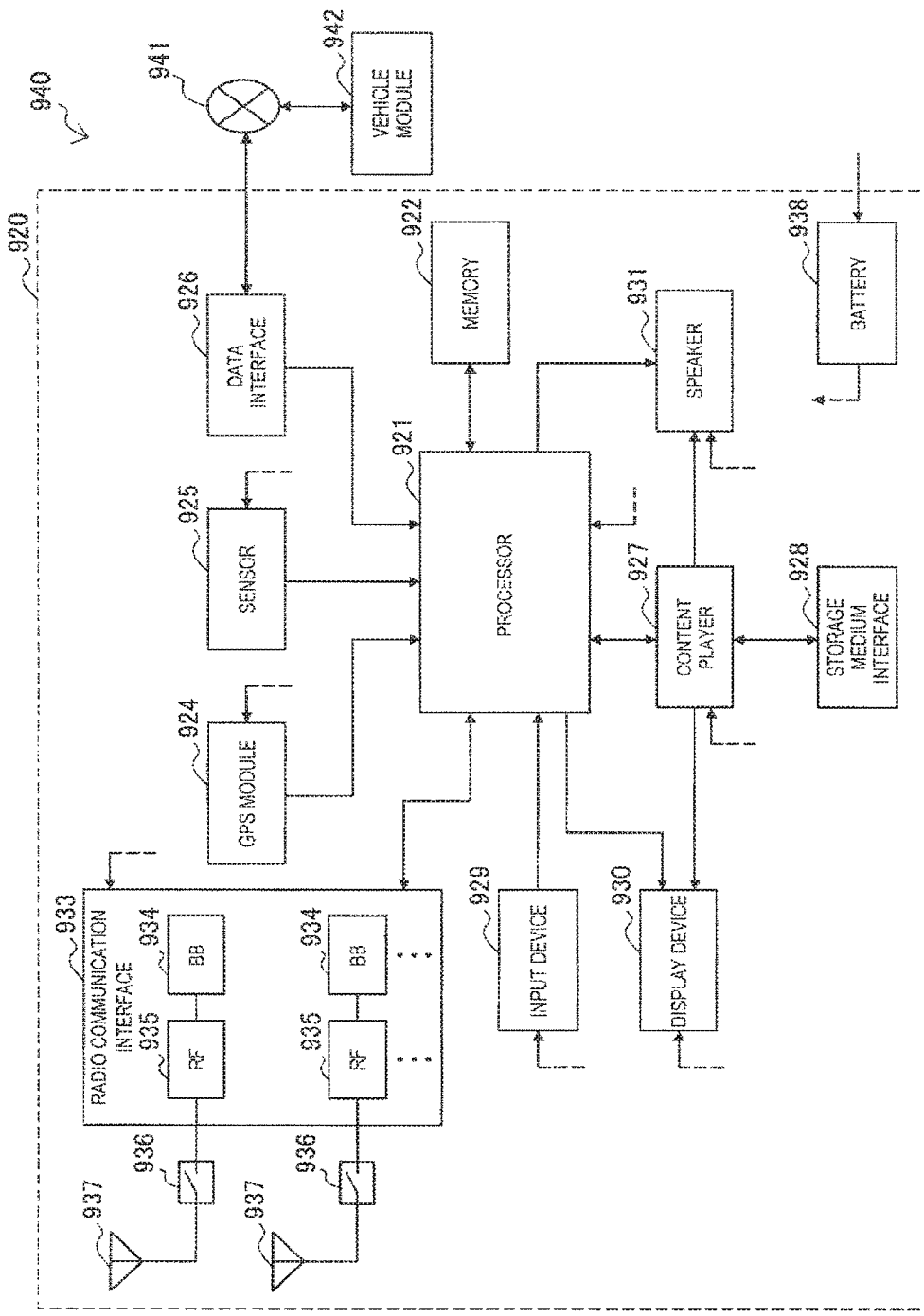
FIG. 40 is a block diagram illustrating an example of a schematic configuration of a car navigation device.

FIG. 40 is a block diagram illustrating an example of a schematic configuration of a car navigation apparatus 920 to which the technology of an embodiment of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 40. Although FIG. 40 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 40. Although FIG. 40 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 40 via feeder lines that are partially shown as dashed lines in the figure. The battery 938 accumulates power supplied from the vehicle.

In the car navigation apparatus 920 illustrated in FIG. 40, one or more components (reception processing unit 241) included in the terminal device 200 described with reference to FIG. 6 may be implemented in the radio communication interface 933. Alternatively, at least some of the components may be implemented in the processor 921. As an example, the car navigation apparatus 920 may include a module that includes a part (for example, the BB processor 934) or all of the radio communication interface 933, and/or the processor 921, and one or more components described above may be mounted in the module. In this case, the module may store a program causing a processor to function as one or more components described above (in other words, a program causing a processor to perform operations of one or more components described above) and perform the program. As another example, a program causing a processor to function as one or more components described above may be installed in the car navigation apparatus 920 and the radio communication interface 933 (for example, the BB processor 934), and/or the processor 921 may execute the program. As described above, the car navigation apparatus 920, the base station apparatus 820, or the module may be provided as a device including one or more components described above, and a program causing a processor to function as one or more components described above may be provided. Further, a readable recording medium having a program recorded therein may be provided.

Furthermore, for example, in the car navigation apparatus 920 illustrated in FIG. 40, the radio communication unit 220 described by using FIG. 6 may be implemented by the radio communication interface 933 (e.g., the RF circuit 935). In addition, the antenna unit 210 may be implemented by the antenna 937. Further, the storage unit 230 may be mounted in the memory 922.

The technology of an embodiment of the present disclosure may also be realized as an in-vehicle system (or a vehicle) 940 including one or more blocks of the car navigation apparatus 920, the in-vehicle network 941, and a vehicle module 942. That is, the in-vehicle system (or a vehicle) 940 may be provided as an apparatus including the reception processing unit 241. The vehicle module 942 generates vehicle data such as vehicle speed, engine speed, and trouble information, and outputs the generated data to the in-vehicle network 941.

6. CONCLUSION

The exemplary embodiments of the present disclosure have been described in detail with reference to FIGS. 1 to 40. As described above, the transmission device according to the present embodiment variably sets at least one of the intervals of the subcarriers and the time lengths of the subsymbols included in the unit resources configured with one or more subcarriers or one or more subsymbols and performs filtering for each subcarrier. In other words, the transmission device according to the present embodiment can variably set at least one of the subcarrier interval and the subsymbol time length in the network supporting GFDM. Therefore, when introducing GFDM, the system 1 can accommodate the legacy terminals not supporting GFDM in addition to the terminals supporting GFDM.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, in this specification, the processes described with reference to the flowcharts and the sequence diagrams need not be necessarily performed in the illustrated order. Some process steps may be performed in parallel. Further, additional process steps may be employed, or some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device, including:

a setting unit configured to variably set at least one of an interval between subcarriers and a time length of a subsymbol included in a unit resource constituted by one or more subcarriers or one or more subsymbols; and a transmission processing unit configured to perform filtering for every predetermined number of subcarriers.

(2)

The device according to (1), wherein the transmission processing unit performs the filtering on the basis of a setting configured by the setting unit.

(3)

The device according to (2), wherein the transmission processing unit variably sets a bandwidth of a filter on the basis of the set interval between the subcarriers.

(4)

The device according to (2) or (3), wherein the transmission processing unit applies a filter in which a filter coefficient with a sharp band limitation characteristic is set to a subcarrier having a small interval, and applies a filter in which a filter coefficient with a gentle band limitation characteristic is set to a subcarrier having a large interval.

(5)

The device according to (4), wherein the filter coefficient with the sharp band limitation characteristic is a filter coefficient corresponding to a raised-cosine filter, and the filter coefficient with the gentle band limitation characteristic is a filter coefficient corresponding to a root-raised-cosine filter.

(6)

The device according to (4) or (5), wherein the filter coefficient with the sharp band limitation characteristic has a small roll-off factor, and the filter coefficient with the gentle band limitation characteristic has a large roll-off factor.

(7)

The device according to any one of (2) to (6), wherein the transmission processing unit applies a filter according to an interference cancellation capability of a reception device serving as a transmission target.

(8)

The device according to any one of (1) to (7), wherein the setting unit sets the intervals between the subcarriers and the time lengths of the subsymbols to be the same within the unit resources.

(9)

The device according to any one of (1) to (8), wherein the transmission processing unit adds a cyclic prefix of a same time length to one or more of the unit resources serving as addition targets.

(10)

The device according to any one of (1) to (9), wherein values of products of the number of subcarriers and the number of subsymbols are the same in the unit resources that are different from each other.

(11)

The device according to any one of (1) to (10), wherein the setting unit sets an integer multiple of a minimum settable value as the time length of the subsymbol.

(12)

The device according to any one of (1) to (11), wherein the setting unit sets a value by which a time length of the unit resource is divisible as the time length of the subsymbol.

(13)

The device according to any one of (1) to (12), wherein the setting unit sets an integer multiple of a minimum settable value as the interval between the subcarriers.

(14)

The device according to any one of (1) to (13), wherein the setting unit sets a value by which a bandwidth of the unit resources is divisible as the interval between the subcarriers.

(15)

The device according to any one of (1) to (14), wherein the transmission processing unit performs oversampling for each subcarrier at a stage prior to the filtering.

(16)
The device according to (15),
wherein the transmission processing unit performs frequency conversion on a signal of a time domain of a processing target at a stage prior to the over-sampling.
(17)
The device according to any one of (1) to (16),
wherein the setting unit sets at least one of the number of subcarriers and the number of subsymbols to be odd.
(18)
The device according to any one of (1) to (17),
wherein the predetermined number is 1.
(19)
The device according to any one of (1) to (18),
wherein the predetermined number is the number of subcarriers included in the unit resource.
(20)
The device according to at least any one of (1) to (20),
wherein the setting unit sets at least one of the interval between the subcarriers and the time length of the subsymbol in accordance with a moving speed of a reception device.
(21)
The device according to (1),
wherein the setting unit limits the number of parameter candidates settable by a terminal device in a plurality of the unit resources on a same time resource to a predetermined number.
(22)
The device according to (21),
wherein the plurality of unit resources are included in one frequency channel.
(23)
The device according to (21),
wherein the plurality of unit resources are included in a plurality of frequency channels.
(24)
The device according to any one of (21) to (23),
wherein the number of parameter candidates is limited to the predetermined number in a plurality of frequency channels, and the number of parameter candidates is limited to the predetermined number minus one in one frequency channel.
(25)
The device according to any one of (21) to (23),
wherein the predetermined number is one.
(26)
The device according to any one of (21) to (25),
wherein information indicating a set parameter is included in control information and reported to the terminal device.
(27)
The device according to (26),
wherein the information indicating the set parameter is included in the control information and reported to the terminal device when the set parameter is different from a default parameter.
(28)
The device according to (27),
wherein the default parameter is a parameter that is neither a minimum possible value nor a maximum possible value.
(29)
The device according to any one of (26) to (28),
wherein the control information is transmitted for each subframe.

(30)
The device according to any one of (26) to (28),
wherein the control information is transmitted at one or more scheduling unit times.
(31)
The device according to any one of (26) to (30),
wherein the parameter includes at least one of the interval between the subcarriers, the time length of the subsymbol, a TTI length, and a CP length.
(32)
The device according to any one of (21) to (31),
wherein the terminal device transmits information indicating a capability to a base station.
(33)
A device, including:
a setting unit configured to set a non-use frequency domain in a unit resource constituted by one or more subcarriers or one or more subsymbols and variably set at least one of an interval between the subcarriers or a time length of the subsymbol in use frequency domains other than the non-use frequency domain.
(34)
The device according to (33),
wherein the setting unit variably sets at least one of the interval between the subcarriers or the time length of the subsymbol included in the unit resource, and switches whether or not to set the non-use frequency domain in accordance with whether or not the intervals between the subcarriers or the time lengths of subsymbols in a plurality of the unit resources on a same time resource are the same.
(35)
The device according to (34),
wherein the setting unit variably sets at least one of the interval between the subcarriers or the time length of the subsymbol included in the unit resource, and sets the non-use frequency domain when the intervals between the subcarriers or the time lengths of the subsymbols in the plurality of unit resources on the same time resource are different.
(36)
The device according to (34) or (35),
wherein the plurality of unit resources are included in one frequency channel.
(37)
The device according to (34) or (35),
wherein the plurality of unit resources are included in a plurality of frequency channels.
(38)
The device according to any one of (34) to (34),
wherein respective bandwidths of the plurality of unit resources are the same on a same time resource.
(39)
The device according to any one of (33) to (38),
wherein the unit resource is a resource block.
(40)
The device according to any one of (33) to (39),
wherein the setting unit sets an interval between subcarriers included in the unit resource in which the non-use domain is set to be equal to or less than an interval between subcarriers included in the unit resource in which the non-use domain is not set.
(41)
The device according to (33) to (40),
wherein the setting unit sets the number of subcarriers included in the unit resource in which the non-use domain is set to be equal to or less than the number of subcarriers included in the unit resource in which the non-use domain is not set.

(42)

The device according to any one of (33) to (41), wherein when the number of subcarriers included in the unit resource in which the non-use domain is set is odd, the setting unit sets a center frequency of at least one of the subcarriers included in the unit resource to be identical or substantially identical to a center frequency of the unit resource.

(43)

The device according to any one of (33) to (42), wherein when the number of subcarriers included in the unit resource in which the non-use domain is set is even, the setting unit sets a center frequency of none of the subcarriers included in the unit resource is identical or substantially identical to a center frequency of the unit resource.

(44)

The device according to any one of (33) to (43), wherein the setting unit sets the non-use frequency domain at both ends of the unit resource in a frequency direction.

(45)

The device according to any one of (33) to (44), wherein the setting unit sets bandwidths of two non-use frequency domains set at both ends of the unit resource in a frequency direction to be the same.

(46)

The device according to any one of (33) to (45), further including, a transmission processing unit configured to include information indicating content of a setting configured by the setting unit in control information and transmit the control information.

(47)

A method, including:

variably setting at least one of an interval between subcarriers and a time length of a subsymbol included in a unit resource constituted by one or more subcarriers or one or more subsymbols; and performing, by a processor, filtering for every predetermined number of subcarriers.

(48)

A program causing a computer to function as:

a setting unit configured to variably set at least one of an interval between subcarriers and a time length of a subsymbol included in a unit resource constituted by one or more subcarriers or one or more subsymbols; and a transmission processing unit configured to perform filtering for every predetermined number of subcarriers.

REFERENCE SIGNS LIST 1 system 1
100 base station
110 antenna unit
120 radio communication unit
130 network communication unit
140 storage unit
150 processing unit
151 setting unit
153 transmission processing unit
200 terminal device
210 antenna unit
220 radio communication unit
230 storage unit
240 processing unit
241 reception processing unit

The invention claimed is:

1. A device, comprising:
   circuitry configured to
      variably set at least one of a subcarrier spacing and a symbol duration included in a unit resource constituted by one or more subcarriers or one or more symbols,
      perform filtering for every predetermined number of the one or more subcarriers,
      apply the filtering in which a filter coefficient with a sharp band limitation characteristic is set for a first subcarrier spacing, and
      apply the filtering in which a filter coefficient with a gentle band limitation characteristic is set for a second subcarrier spacing that is larger than the first subcarrier spacing.

2. The device according to claim 1, wherein the circuitry is further configured to variably set a bandwidth of a filter on the basis of the set subcarrier spacing.

3. The device according to claim 1, wherein the circuitry is further configured to set the subcarrier spacing and the symbol duration to be the same within the unit resource.

4. The device according to claim 1, wherein the circuitry is further configured to add a cyclic prefix of a same time length to one or more unit resources serving as addition targets.

5. The device according to claim 1, wherein values of products of the number of subcarriers and the number of symbols are the same in unit resources that are different from each other.

6. The device according to claim 1, wherein the circuitry is further configured to set an integer multiple of a minimum settable value as the symbol duration.

7. The device according to claim 1, wherein the circuitry is further configured to set a value by which a time length of the unit resource is divisible as the symbol duration.

8. The device according to claim 1, wherein the circuitry is further configured to set an integer multiple of a minimum settable value as the subcarrier spacing.

9. The device according to claim 1, wherein the circuitry is further configured to set a value by which a bandwidth of the unit resource is divisible as the subcarrier spacing.

10. The device according to claim 1, wherein the circuitry is further configured to set at least one of the number of subcarriers and the number of symbols to be odd.

11. The device according to claim 1, wherein the predetermined number is the number of subcarriers included in the unit resource.

12. The device according to claim 1, wherein the circuitry is further configured to set at least one of the subcarrier spacing and the symbol duration in accordance with a moving speed of a reception device.

13. The device according to claim 1, wherein the circuitry is further configured to limit a number of parameter candidates settable by a terminal device in a plurality of the unit resources on a same time resource to a predetermined limit.

14. The device according to claim 13, wherein the plurality of the unit resources are included in a same frequency channel.

15. The device according to claim 13, wherein the plurality of the unit resources are included in a plurality of frequency channels.

16. The device according to claim 13, wherein the number of parameter candidates is limited to the predetermined number in a plurality of frequency channels, and the number of parameter candidates is limited to the predetermined number minus one in one frequency channel.

17. The device according to claim 13, wherein information indicating a set parameter is included in control information and reported to the terminal device.

18. The device according to claim 17, wherein the information indicating the set parameter is included in the control information and reported to the terminal device when the set parameter is different from a default parameter.

19. The device according to claim 18, wherein the default parameter is a parameter that is neither a minimum possible value nor a maximum possible value.

20. The device according to claim 17, wherein the set parameter includes at least one of the subcarrier spacing, the symbol duration, a TTI length, and a CP length.

21. The device according to claim 13, wherein the terminal device transmits information indicating a capability to a base station.

22. A device, comprising:
circuitry configured to set a non-use frequency domain in a unit resource constituted by one or more subcarriers or one or more symbols and variably set at least one of a subcarrier spacing and a symbol duration in use frequency domains other than the non-use frequency domain, wherein
the circuitry applies a filter in which a filter coefficient with a sharp band limitation characteristic is set for a first subcarrier spacing, and applies a filter in which a filter coefficient with a gentle band limitation characteristic is set for a second subcarrier spacing that is larger than the first subcarrier spacing.

23. The device according to claim 22, wherein the circuitry is configured to
variably set at least one of the subcarrier spacing and the symbol duration included in the unit resource, and
switch whether or not to set the non-use frequency domain in accordance with whether or not at least one of subcarrier spacings and symbol durations in a plurality of the unit resources on a same time resource are the same.

24. The device according to claim 23, wherein the circuitry is configured to set the non-use frequency domain when the at least one of the subcarrier spacings and the symbol durations in the plurality of unit resources on the same time resource are different.

25. The device according to claim 23, wherein respective bandwidths of the plurality of unit resources are the same on a same time resource.

26. The device according to claim 22, wherein the circuitry is configured to set a subcarrier spacing included in the unit resource in which the non-use domain is set to be equal to or less than a subcarrier spacing included in the unit resource in which the non-use domain is not set.

27. The device according to claim 22, wherein the circuitry is configured to set the number of subcarriers included in the unit resource in which the non-use domain is set to be equal to or less than the number of subcarriers included in the unit resource in which the non-use domain is not set.

28. The device according to claim 22, wherein when the number of subcarriers included in the unit resource in which the non-use domain is set is odd, the circuitry is configured to set a center frequency of at least one of the subcarriers included in the unit resource to be identical or substantially identical to a center frequency of the unit resource.

29. The device according to claim 22, wherein when the number of subcarriers included in the unit resource in which the non-use domain is set is even, the circuitry is configured to set a center frequency of none of the subcarriers included in the unit resource is identical or substantially identical to a center frequency of the unit resource.

30. The device according to claim 22, wherein the circuitry is configured to set the non-use frequency domain at both ends of the unit resource in a frequency direction.

31. A method, comprising:
variably setting at least one of a subcarrier spacing and a symbol duration included in a unit resource constituted by one or more subcarriers or one or more symbols; and
performing, by a processor, filtering for every predetermined number of subcarriers, the filtering including applying a filter in which a filter coefficient with a sharp band limitation characteristic is set for a first subcarrier spacing, and applying a filter in which a filter coefficient with a gentle band limitation characteristic is set for a second subcarrier spacing that is larger than the first subcarrier spacing.

* * * * *